(12) United States Patent
McCarron et al.

(10) Patent No.: US 11,161,402 B2
(45) Date of Patent: Nov. 2, 2021

(54) ELECTRIC VEHICLE PLATFORM

(71) Applicant: Canoo Technologies Inc., Torrance, CA (US)

(72) Inventors: Daniel George McCarron, Torrance, CA (US); Alexi Charbonneau, Pedondo Beach, CA (US); William J. Rohr, Rancho Palos Verdes, CA (US); Charles Garmel, Torrance, CA (US); Felix Haeusler, Torrance, CA (US); Nathaniel Risler Rosso, Torrance, CA (US); John Mason, Torrance, CA (US); Mayurkumar Ashokbhal Agrawal, Torrance, CA (US); Phillip John Weicker, Los Angeles, CA (US); Sohel Merchant, Rancho Palos Verdes, CA (US); Naesung Lyu, Torrance, CA (US); Chung Shen Ang, Torrance, CA (US); Jeffrey Walsh, Torrance, CA (US)

(73) Assignee: Canoo Technologies Inc., Torrance, CA (US)

(*) Notice: Subject to any disclaimer, the term of this patent is extended or adjusted under 35 U.S.C. 154(b) by 0 days.

(21) Appl. No.: 17/142,889

(22) Filed: Jan. 6, 2021

(65) Prior Publication Data
US 2021/0122223 A1 Apr. 29, 2021

Related U.S. Application Data

(63) Continuation of application No. 16/879,235, filed on May 20, 2020.
(Continued)

(51) Int. Cl.
*B60K 1/04* (2019.01)
*B62D 21/11* (2006.01)
(Continued)

(52) U.S. Cl.
CPC ............. *B60K 1/04* (2013.01); *B60G 11/08* (2013.01); *B60K 17/06* (2013.01); *B62D 21/11* (2013.01);
(Continued)

(58) Field of Classification Search
CPC ............. B60K 1/04; B60K 2001/008; B60K 2001/001; B60K 2001/0438;
(Continued)

(56) References Cited

U.S. PATENT DOCUMENTS

| 1,526,481 | A | * | 2/1925 | Krieger | ............... B60G 11/08 180/362 |
| 2,873,994 | A | | 2/1959 | Ray | |

(Continued)

FOREIGN PATENT DOCUMENTS

| AU | 2002323246 A1 | 3/2003 |
| AU | 2002332561 A1 | 3/2003 |

(Continued)

OTHER PUBLICATIONS

International Search Report and Written Opinion for International Application No. PCT/US2020/033769, Completed Jul. 15, 2020, dated Sep. 2, 2020, 30 Pgs.
(Continued)

*Primary Examiner* — Steve Clemmons

(57) ABSTRACT

Vehicle platforms, and systems, subsystems, and components thereof are described. A self-contained vehicle platform or chassis incorporating substantially all of the functional systems, subsystems and components (e.g., mechanical, electrical, structural, etc.) necessary for an operative vehicle. Functional components may include at least energy storage/conversion, propulsion, suspension and wheels, steering, crash protection, and braking systems. Functional components are standardized such that vehicle (Continued)

platforms may be interconnected with a variety of vehicle body designs (also referred to in the art as "top hats") with minimal or no modification to the functional linkages (e.g., mechanical, structural, electrical, etc.) therebetween. Configurations of functional components are incorporated within the vehicle platform such that there is minimal or no physical overlap between the functional components and the area defined by the vehicle body. Specific functional components of such vehicle platforms, and the relative placement of the various functional components, to allow for implementation of a self-contained vehicle platform are also provided.

20 Claims, 64 Drawing Sheets

Related U.S. Application Data

(60) Provisional application No. 62/903,709, filed on Sep. 20, 2019, provisional application No. 62/897,970, filed on Sep. 9, 2019, provisional application No. 62/869,823, filed on Jul. 2, 2019, provisional application No. 62/850,437, filed on May 20, 2019.

(51) Int. Cl.
*B62D 24/00* (2006.01)
*B60G 11/08* (2006.01)
*B62D 21/15* (2006.01)
*B60K 17/06* (2006.01)
*B60K 1/00* (2006.01)

(52) U.S. Cl.
CPC ............ *B62D 21/152* (2013.01); *B62D 24/00* (2013.01); *B60G 2202/114* (2013.01); *B60K 2001/005* (2013.01); *B60K 2001/008* (2013.01); *B60K 2001/0438* (2013.01)

(58) Field of Classification Search
CPC .. B60G 2202/114; B60G 11/08; B60G 5/053; B62D 63/025; B62D 24/00
See application file for complete search history.

(56) References Cited

U.S. PATENT DOCUMENTS

| | | | |
|---|---|---|---|
| 3,170,682 A | 2/1965 | Eggers | |
| 3,429,566 A * | 2/1969 | Rosendale | B60G 3/28 267/266 |
| 4,148,505 A | 4/1979 | Jensen et al. | |
| 4,307,865 A | 12/1981 | MacCready | |
| 4,460,215 A | 7/1984 | Chamberlain et al. | |
| 4,557,500 A * | 12/1985 | Collard | B60G 3/10 267/149 |
| 4,619,466 A * | 10/1986 | Schaible | B60G 11/08 267/273 |
| 4,779,917 A | 10/1988 | Campbell et al. | |
| 4,887,841 A | 12/1989 | Cowburn et al. | |
| 5,015,545 A | 5/1991 | Brooks | |
| 5,069,306 A | 12/1991 | Inoue et al. | |
| 5,141,209 A | 8/1992 | Sano et al. | |
| 5,501,289 A | 3/1996 | Nishikawa et al. | |
| 5,807,205 A | 9/1998 | Odaka et al. | |
| 5,827,149 A | 10/1998 | Sponable | |
| 6,029,987 A | 2/2000 | Hoffman et al. | |
| 6,512,347 B1 | 1/2003 | Hellmann et al. | |
| 6,688,586 B1 * | 2/2004 | Moore | B60G 3/28 267/230 |
| 6,712,164 B2 | 3/2004 | Chernoff et al. | |
| 6,726,438 B2 | 4/2004 | Chernoff et al. | |
| 6,766,873 B2 | 7/2004 | Chernoff et al. | |
| 6,768,932 B2 | 7/2004 | Claypole et al. | |
| 6,811,169 B2 | 11/2004 | Schroeder et al. | |
| 6,830,117 B2 | 12/2004 | Chernoff et al. | |
| 6,836,943 B2 | 1/2005 | Chernoff et al. | |
| 6,843,336 B2 | 1/2005 | Chernoff et al. | |
| 6,845,839 B2 | 1/2005 | Chernoff et al. | |
| 6,857,498 B2 | 2/2005 | Vitale et al. | |
| 6,880,856 B2 | 4/2005 | Chernoff et al. | |
| 6,889,785 B2 | 5/2005 | Chernoff et al. | |
| 6,899,194 B2 | 5/2005 | Chernoff et al. | |
| 6,905,138 B2 | 6/2005 | Borroni-bird et al. | |
| 6,923,281 B2 | 8/2005 | Chernoff et al. | |
| 6,923,282 B2 | 8/2005 | Chernoff et al. | |
| 6,935,449 B2 | 8/2005 | Chernoff et al. | |
| 6,935,658 B2 | 8/2005 | Chernoff et al. | |
| 6,938,712 B2 | 9/2005 | Chernoff et al. | |
| 6,948,226 B2 | 9/2005 | Chernoff et al. | |
| 6,959,475 B2 | 11/2005 | Chernoff et al. | |
| 6,968,918 B2 | 11/2005 | Chernoff et al. | |
| 6,976,307 B2 | 12/2005 | Chernoff et al. | |
| 6,986,401 B2 | 1/2006 | Chernoff et al. | |
| 6,991,060 B2 | 1/2006 | Chernoff et al. | |
| 7,000,318 B2 | 2/2006 | Chernoff et al. | |
| 7,004,502 B2 | 2/2006 | Borroni-bird et al. | |
| 7,028,791 B2 | 4/2006 | Chernoff et al. | |
| 7,029,017 B2 | 4/2006 | Zandbergen et al. | |
| 7,036,848 B2 | 5/2006 | Chernoff et al. | |
| 7,083,016 B2 | 8/2006 | Chernoff et al. | |
| 7,096,986 B2 | 8/2006 | Borroni-bird et al. | |
| 7,104,581 B2 | 9/2006 | Chernoff et al. | |
| 7,111,900 B2 | 9/2006 | Chernoff et al. | |
| 7,213,673 B2 | 5/2007 | Shabana et al. | |
| 7,275,609 B2 | 10/2007 | Chernoff et al. | |
| 7,281,600 B2 | 10/2007 | Chernoff et al. | |
| 7,292,992 B2 | 11/2007 | Chernoff et al. | |
| 7,303,033 B2 | 12/2007 | Chernoff et al. | |
| 7,303,211 B2 | 12/2007 | Borroni-bird et al. | |
| 7,360,816 B2 | 4/2008 | Chernoff et al. | |
| 7,370,886 B2 | 5/2008 | Luttinen et al. | |
| 7,373,315 B2 | 5/2008 | Chernoff et al. | |
| 7,398,846 B2 | 7/2008 | Young et al. | |
| 7,441,615 B2 | 10/2008 | Borroni-bird et al. | |
| 7,520,355 B2 | 4/2009 | Chaney | |
| 7,597,169 B2 | 10/2009 | Borroni-bird et al. | |
| 7,936,113 B2 | 5/2011 | Namuduri et al. | |
| 8,143,766 B2 | 3/2012 | Namuduri et al. | |
| 8,253,281 B2 | 8/2012 | Namuduri et al. | |
| 8,308,148 B2 | 11/2012 | Shand | |
| 8,448,696 B2 | 5/2013 | Johnston et al. | |
| 8,485,543 B2 | 7/2013 | Richardson et al. | |
| 8,556,282 B2 * | 10/2013 | Pollmeyer | B60G 3/10 280/124.171 |
| 8,640,806 B2 * | 2/2014 | Worup | B60G 11/10 180/209 |
| 8,881,883 B2 | 11/2014 | Barton et al. | |
| 8,936,265 B2 | 1/2015 | Ehrlich et al. | |
| 8,940,425 B2 | 1/2015 | Toepfer | |
| 9,162,546 B2 | 10/2015 | Girelli Consolaro et al. | |
| 9,566,840 B2 * | 2/2017 | Seethaler | B60G 3/28 |
| 9,627,721 B2 | 4/2017 | Kosaki et al. | |
| 10,131,381 B2 | 11/2018 | Ashraf et al. | |
| 10,293,860 B1 | 5/2019 | Cooper et al. | |
| 10,486,513 B2 * | 11/2019 | Battaglia | B60K 1/02 |
| 10,632,857 B2 | 4/2020 | Matecki et al. | |
| 10,741,809 B2 | 8/2020 | Kim et al. | |
| 2002/0149490 A1 | 10/2002 | Butler et al. | |
| 2003/0037427 A1 | 2/2003 | Chernoff et al. | |
| 2003/0037967 A1 | 2/2003 | Chernoff et al. | |
| 2003/0037968 A1 | 2/2003 | Chernoff et al. | |
| 2003/0037970 A1 | 2/2003 | Chernoff et al. | |
| 2003/0037971 A1 | 2/2003 | Chernoff et al. | |
| 2003/0037972 A1 | 2/2003 | Chernoff et al. | |
| 2003/0037973 A1 | 2/2003 | Chernoff et al. | |
| 2003/0037974 A1 | 2/2003 | Chernoff et al. | |
| 2003/0037975 A1 | 2/2003 | Chernoff et al. | |
| 2003/0037982 A1 | 2/2003 | Chernoff et al. | |
| 2003/0037987 A1 | 2/2003 | Chernoff et al. | |
| 2003/0038442 A1 | 2/2003 | Chernoff et al. | |
| 2003/0038467 A1 | 2/2003 | Chernoff et al. | |

(56) References Cited

U.S. PATENT DOCUMENTS

| | | |
|---|---|---|
| 2003/0038468 A1 | 2/2003 | Chernoff et al. |
| 2003/0038469 A1 | 2/2003 | Chernoff et al. |
| 2003/0038470 A1 | 2/2003 | Chernoff et al. |
| 2003/0038509 A1 | 2/2003 | Chernoff et al. |
| 2003/0040827 A1 | 2/2003 | Chernoff et al. |
| 2003/0040828 A1 | 2/2003 | Chernoff et al. |
| 2003/0040933 A1 | 2/2003 | Chernoff et al. |
| 2003/0040977 A1 | 2/2003 | Chernoff et al. |
| 2003/0040979 A1 | 2/2003 | Borroni-bird et al. |
| 2003/0046802 A1 | 3/2003 | Chernoff et al. |
| 2003/0047362 A1 | 3/2003 | Chernoff et al. |
| 2003/0089536 A1 | 5/2003 | Chernoff et al. |
| 2003/0094318 A1 | 5/2003 | Chernoff et al. |
| 2003/0094319 A1 | 5/2003 | Chernoff et al. |
| 2003/0094320 A1 | 5/2003 | Chernoff et al. |
| 2003/0116374 A1 | 6/2003 | Chernoff et al. |
| 2003/0141736 A1 | 7/2003 | Chernoff et al. |
| 2003/0159866 A1 | 8/2003 | Claypole et al. |
| 2003/0164255 A1 | 9/2003 | Borroni-bird et al. |
| 2003/0168267 A1 | 9/2003 | Borroni-bird et al. |
| 2003/0168844 A1 | 9/2003 | Borroni-bird et al. |
| 2004/0060750 A1 | 4/2004 | Chernoff et al. |
| 2004/0066025 A1 | 4/2004 | Borroni-bird et al. |
| 2004/0069545 A1 | 4/2004 | Chernoff et al. |
| 2004/0069556 A1 | 4/2004 | Chernoff et al. |
| 2004/0129487 A1 | 7/2004 | Shabana et al. |
| 2004/0163859 A1 | 8/2004 | Chernoff et al. |
| 2004/0163875 A1 | 8/2004 | Chernoff et al. |
| 2004/0164577 A1 | 8/2004 | Shabana et al. |
| 2004/0189054 A1 | 9/2004 | Chernoff et al. |
| 2004/0194280 A1 | 10/2004 | Borroni-bird et al. |
| 2004/0194313 A1 | 10/2004 | Chernoff et al. |
| 2004/0195014 A1 | 10/2004 | Chernoff et al. |
| 2005/0049944 A1 | 3/2005 | Chernoff et al. |
| 2005/0082872 A1 | 4/2005 | Rich et al. |
| 2005/0161981 A1 | 7/2005 | Chernoff et al. |
| 2005/0168016 A1 | 8/2005 | Svartvatn |
| 2005/0263332 A1 | 12/2005 | Chernoff et al. |
| 2006/0027406 A1 | 2/2006 | Borroni-bird et al. |
| 2006/0048994 A1 | 3/2006 | Young et al. |
| 2006/0061080 A1 | 3/2006 | Luttinen et al. |
| 2006/0102398 A1 | 5/2006 | Mizuno |
| 2007/0222251 A1 | 9/2007 | Abraham |
| 2008/0169671 A1* | 7/2008 | Hedderly ............ B62D 25/082 296/146.11 |
| 2009/0058134 A1 | 3/2009 | Hiraishi et al. |
| 2009/0236877 A1 | 9/2009 | Peschansky et al. |
| 2010/0219720 A1 | 9/2010 | Namuduri et al. |
| 2010/0219721 A1 | 9/2010 | Namuduri et al. |
| 2010/0219798 A1 | 9/2010 | Namuduri et al. |
| 2010/0273411 A1 | 10/2010 | Kakizaki et al. |
| 2011/0212355 A1 | 9/2011 | Essinger et al. |
| 2011/0259657 A1* | 10/2011 | Fuechtner ............ B60K 7/0007 180/65.21 |
| 2013/0088045 A1 | 4/2013 | Charbonneau et al. |
| 2013/0300138 A1 | 11/2013 | Banasiak et al. |
| 2013/0341882 A1 | 12/2013 | Ehrlich et al. |
| 2014/0308551 A1 | 10/2014 | Schroeder et al. |
| 2014/0353937 A1 | 12/2014 | Girelli Consolaro et al. |
| 2015/0142245 A1 | 5/2015 | Cuddihy et al. |
| 2016/0164055 A1 | 6/2016 | Saitou |
| 2016/0318409 A1 | 11/2016 | Rawlinson |
| 2017/0001507 A1 | 1/2017 | Ashraf et al. |
| 2017/0001667 A1 | 1/2017 | Ashraf et al. |
| 2017/0057546 A1 | 3/2017 | Dressel et al. |
| 2017/0225588 A1 | 8/2017 | Newman |
| 2017/0225714 A1 | 8/2017 | Ito |
| 2017/0305248 A1 | 10/2017 | Hara et al. |
| 2017/0369112 A1 | 12/2017 | Ashraf et al. |
| 2018/0050606 A1* | 2/2018 | Sugitate ............ H01M 10/6563 |
| 2018/0065678 A1 | 3/2018 | Tutzer |
| 2018/0072131 A1 | 3/2018 | Lee et al. |
| 2018/0097265 A1 | 4/2018 | Tarlau et al. |
| 2018/0108891 A1* | 4/2018 | Fees ...................... H01M 50/24 |
| 2018/0215245 A1 | 8/2018 | Sudhindra et al. |
| 2018/0229628 A1 | 8/2018 | Minato et al. |
| 2018/0261899 A1 | 9/2018 | Milton et al. |
| 2018/0337378 A1 | 11/2018 | Stephens et al. |
| 2018/0361819 A1 | 12/2018 | Ryu et al. |
| 2019/0092113 A1* | 3/2019 | Girelli Consolaro .... B60G 3/20 |
| 2019/0131602 A1* | 5/2019 | Hilfrich ................ H01M 50/20 |
| 2019/0135065 A1* | 5/2019 | Wolf-Monheim ...... B60B 35/14 |
| 2019/0210470 A1 | 7/2019 | Thomas et al. |
| 2020/0156486 A1 | 5/2020 | Howard et al. |
| 2020/0369140 A1 | 11/2020 | McCarron et al. |
| 2020/0398732 A1* | 12/2020 | Glatfelter .................. B60P 1/64 |
| 2021/0001924 A1 | 1/2021 | Charbonneau et al. |

FOREIGN PATENT DOCUMENTS

| | | | |
|---|---|---|---|
| CN | 1695050 A | 11/2005 | |
| CN | 1791519 A | 6/2006 | |
| CN | 100379612 C | 4/2008 | |
| CN | 103183053 B | 6/2016 | |
| DE | 10154353 A1 | 5/2002 | |
| DE | 10297137 T5 | 8/2004 | |
| DE | 10297133.1 B4 | 5/2013 | |
| DE | 102020101867 A1 * | 7/2020 | ............ B60L 50/64 |
| EP | 0770517 A1 | 5/1997 | |
| EP | 0857590 A1 * | 8/1998 | ............ B60G 99/00 |
| EP | 1245436 A1 | 10/2002 | |
| EP | 1446645 A2 | 8/2004 | |
| EP | 1448969 A1 | 8/2004 | |
| FR | 2821046 A1 * | 8/2002 | ............ B62D 27/00 |
| JP | 2005500940 A | 1/2005 | |
| JP | 2017001441 A | 1/2017 | |
| WO | 03018337 A2 | 3/2003 | |
| WO | 03018358 A2 | 3/2003 | |
| WO | 03018359 A2 | 3/2003 | |
| WO | 03018373 A1 | 3/2003 | |
| WO | 03019309 A1 | 3/2003 | |
| WO | 03050498 A1 | 6/2003 | |
| WO | 03054500 A2 | 7/2003 | |
| WO | 2006029415 A2 | 3/2006 | |
| WO | 2015151064 A1 | 10/2015 | |
| WO | 2017207125 A1 | 12/2017 | |
| WO | 2020236913 A1 | 11/2020 | |

OTHER PUBLICATIONS

International Search Report and Written Opinion for International Application No. PCT/US2020/040788, Search completed Nov. 19, 2020, dated Dec. 22, 2020, 21 Pgs.

International Search Report and Written Opinion for International Application No. PCT/US2020/050013, Search completed Nov. 4, 2020, dated Nov. 30, 2020, 14 Pgs.

International Search Report and Written Opinion for International Application No. PCT/US2020/051879, Search completed Nov. 24, 2020, dated Dec. 14, 2020, 14 Pgs.

Invitation to Pay Additional Fees and Partial Search Report Received for International Application PCT/US2020/040788, dated Oct. 2, 2020, 2 Pages.

Invitation to Pay Additional Fees and Partial Search Report Received for International Application PCT/US2020/051505, dated Nov. 23, 2020, 2 Pages.

Invitation to Pay Additional Fees and Partial Search Report Received for International Application PCT/US2020/051870, dated Nov. 23, 2020, 2 Pages.

International Search Report and Written Opinion for International Application No. PCT/US2020/051505, completed Jan. 12, 2021, dated Feb. 5, 2021, 17 pgs.

International Search Report and Written Opinion for International Application No. PCT/US2020/051870, Search completed Jan. 6, 2021, dated Feb. 4, 2021, 17 Pgs.

Cropley, Steve, "Williams reveals electric vehicle skateboard chassis," Autocar Industry News, Haymarket Media Group, Sep. 6, 2017, 5 pages.

(56) References Cited

OTHER PUBLICATIONS

Non-Final Office Action for U.S. Appl. No. 17/027,626, dated Jul. 20, 2021, 20 pages.

* cited by examiner

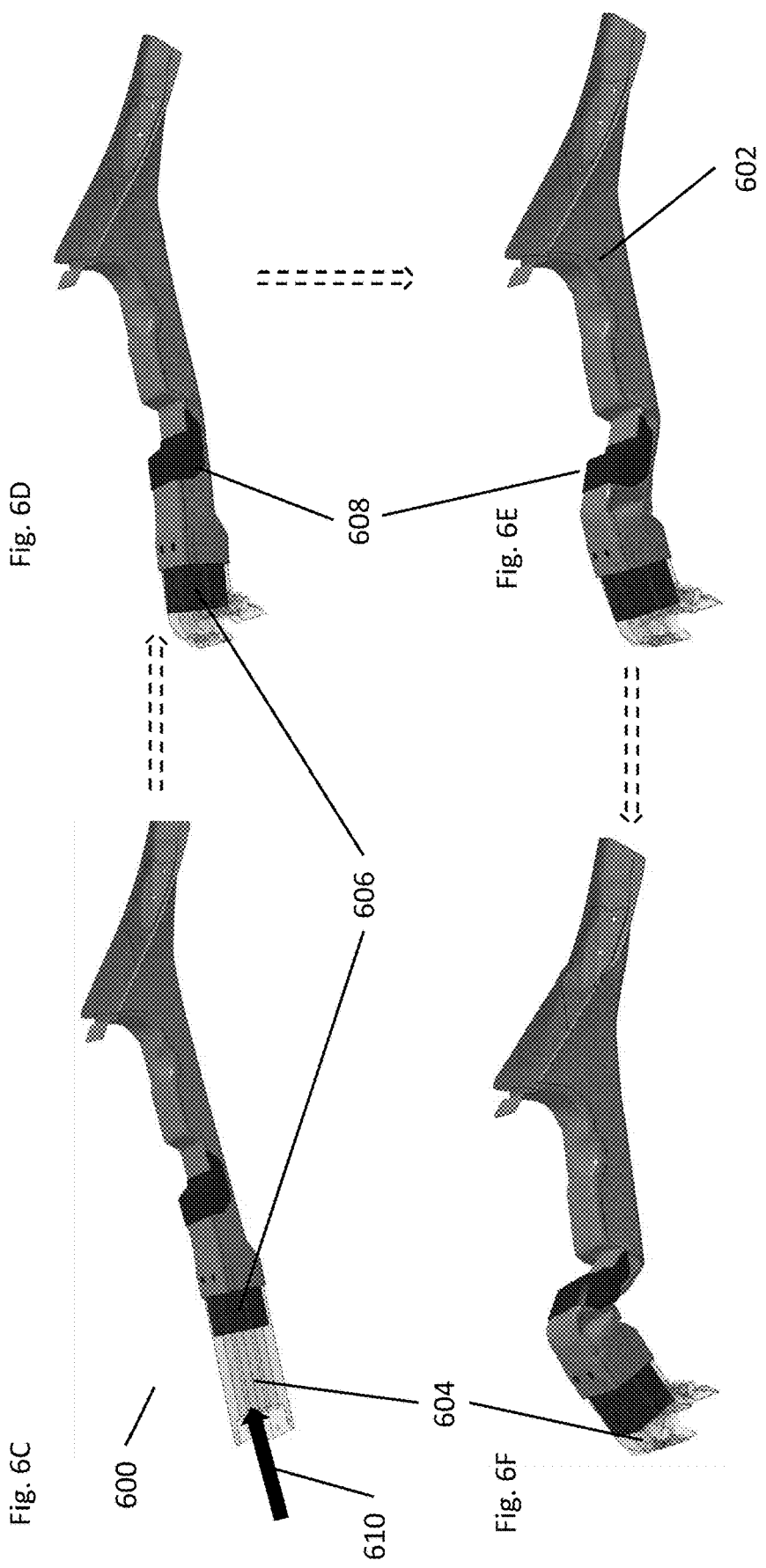

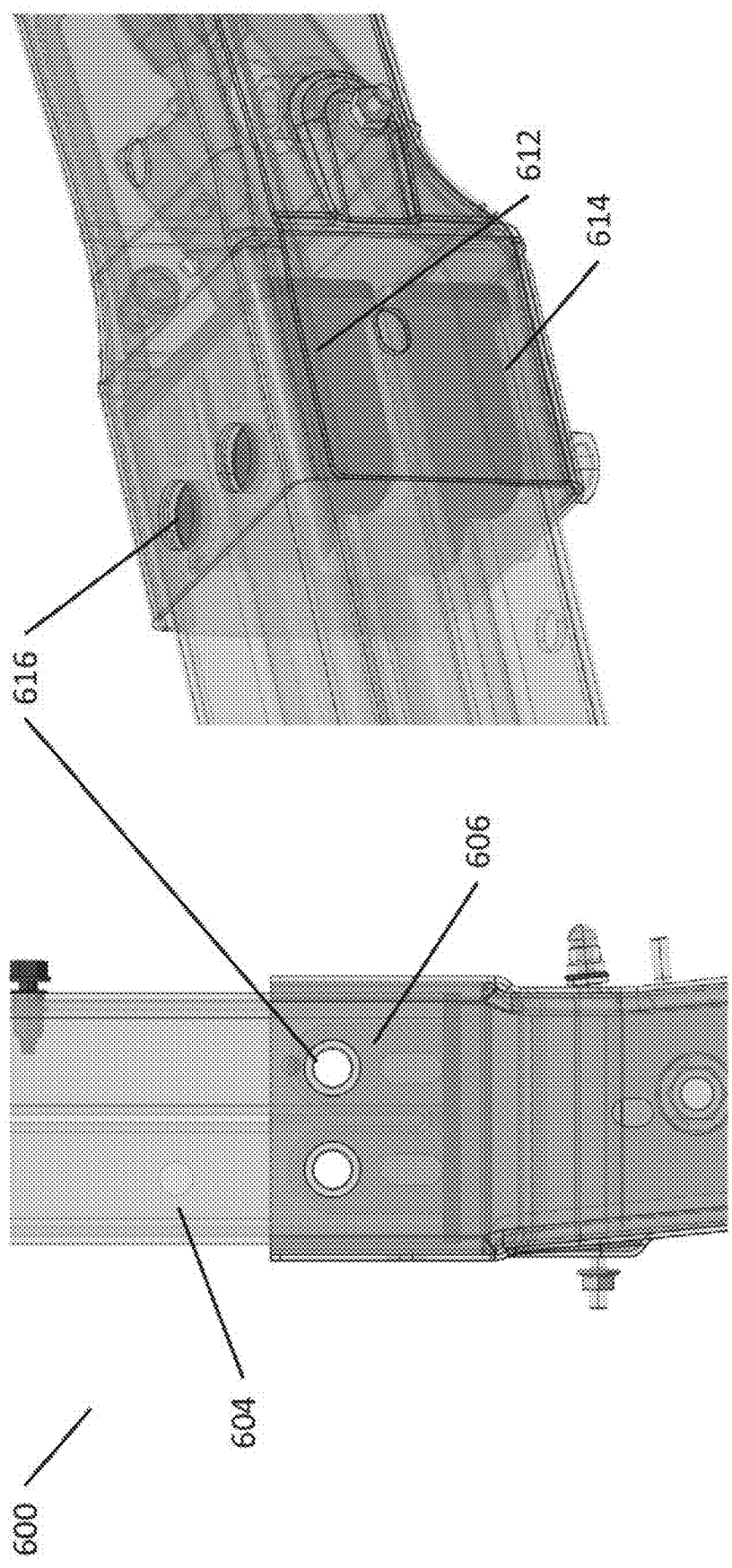

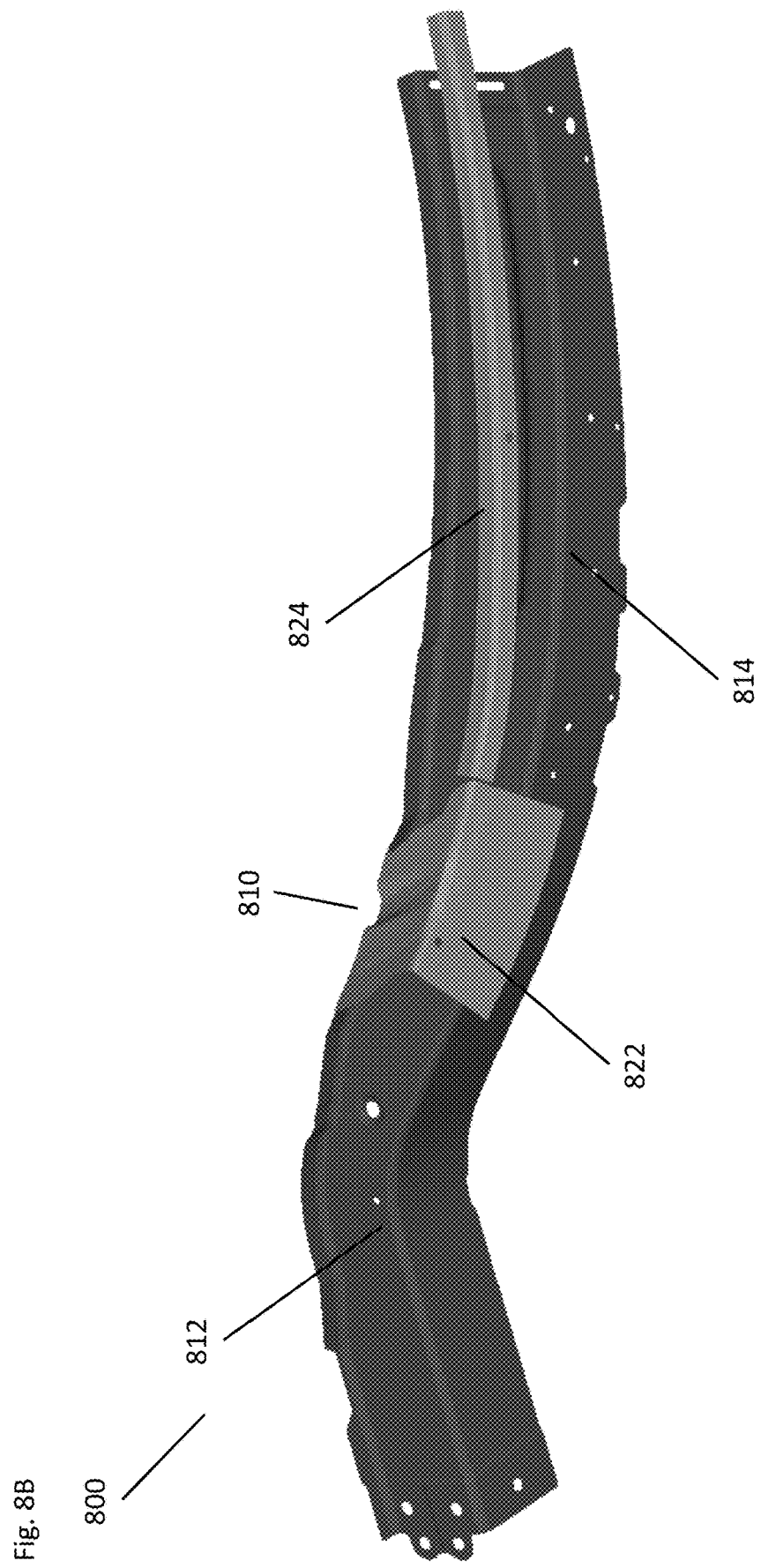

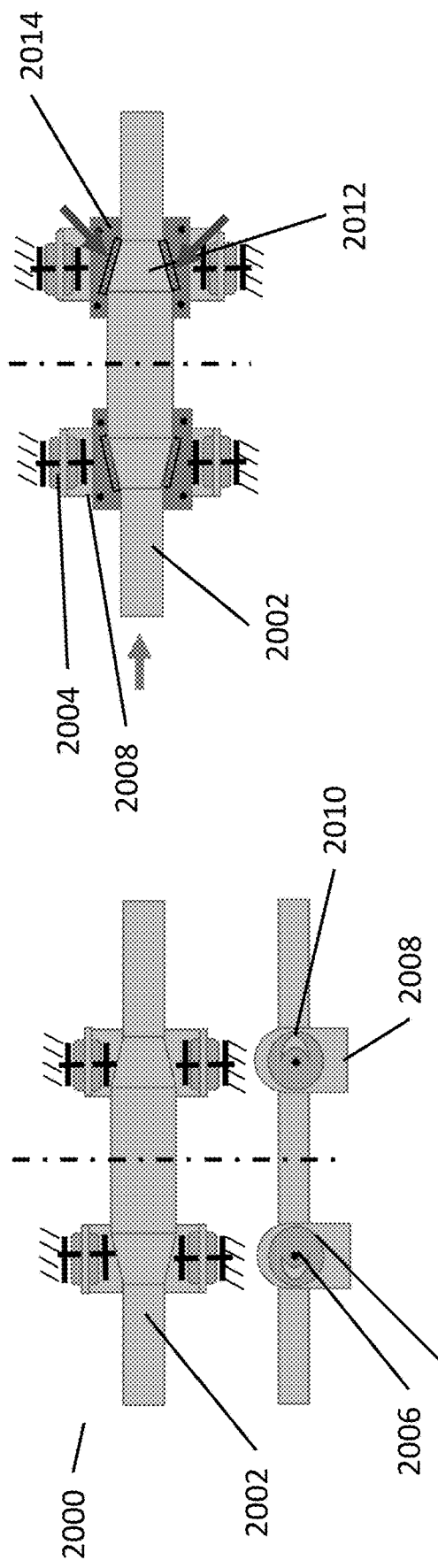

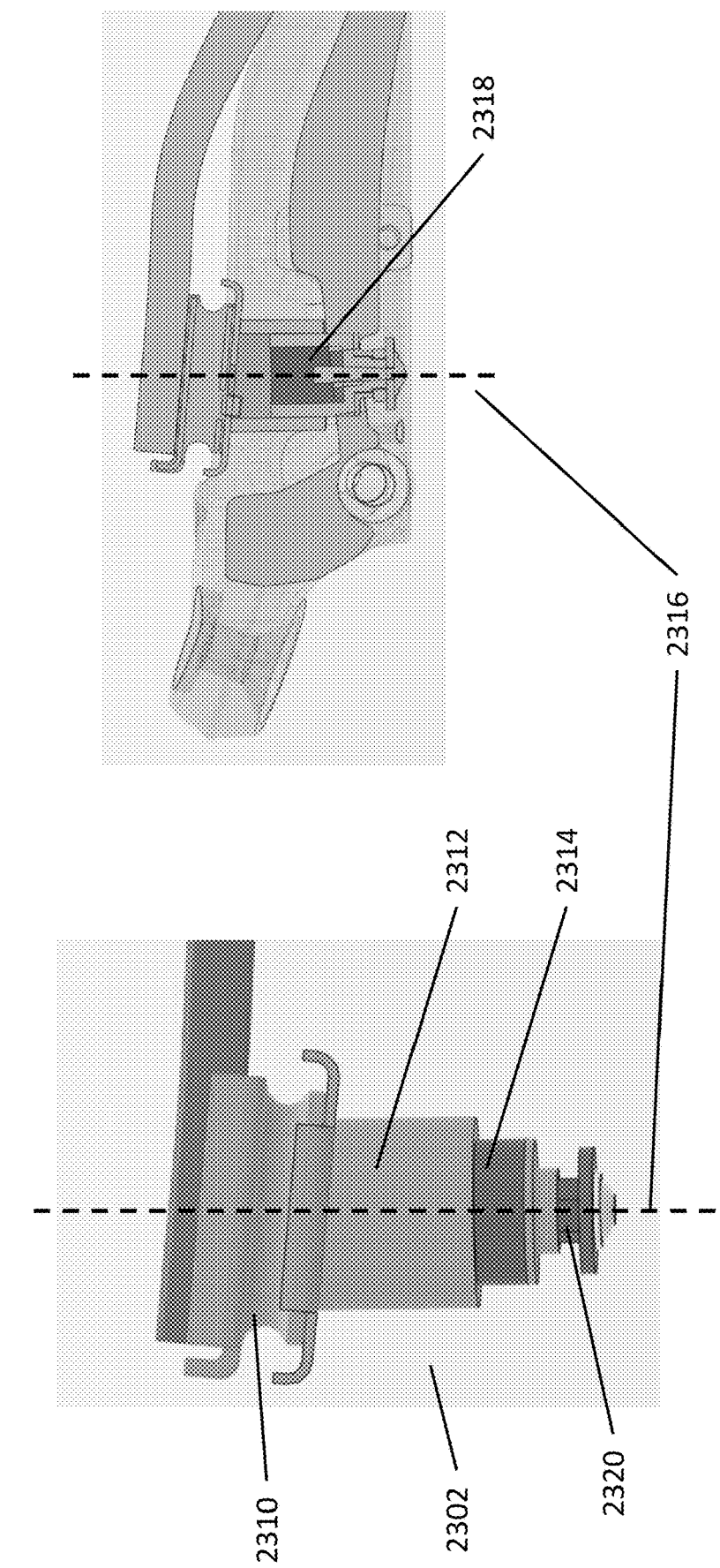

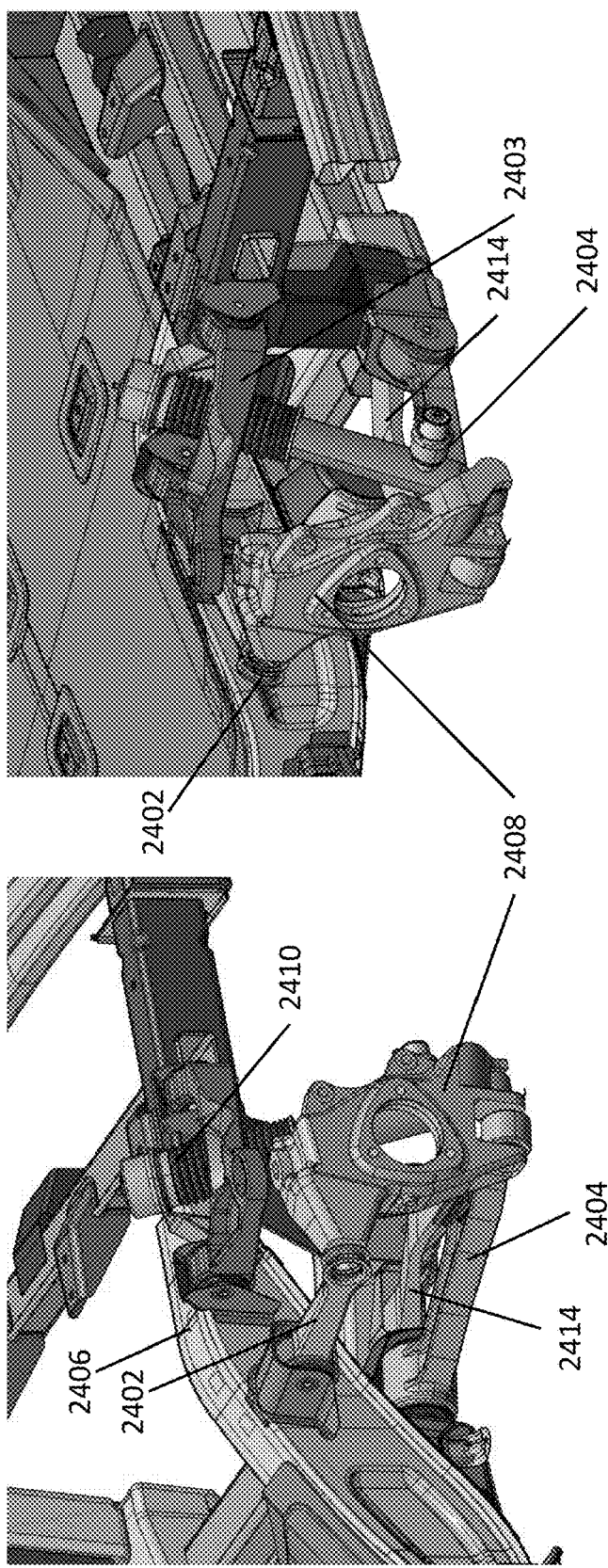

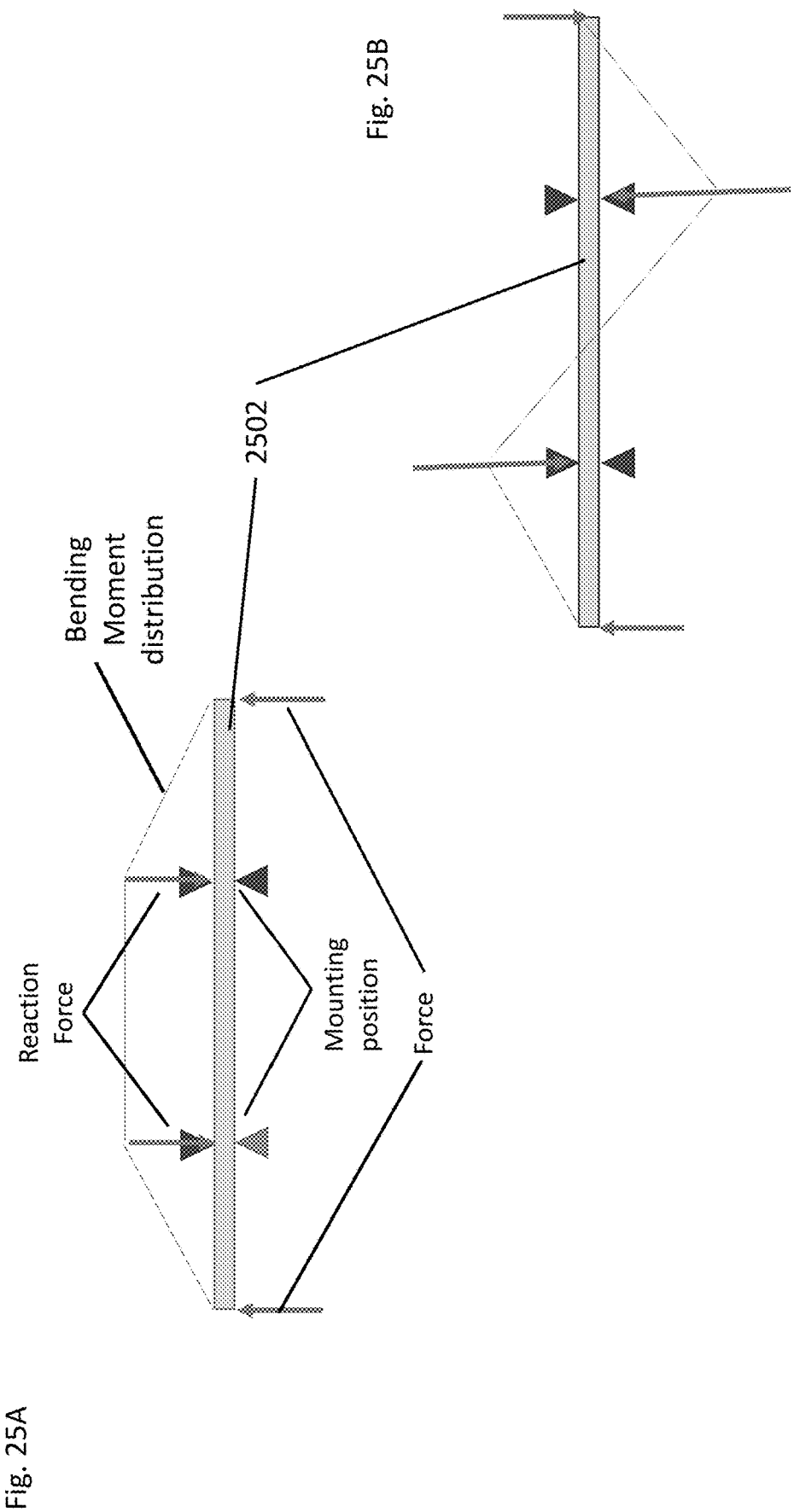

ELECTRIC VEHICLE PLATFORM

CROSS-REFERENCED APPLICATIONS

This application is a continuation of U.S. patent application Ser. No. 16/879,235 filed on May 20, 2020, which application claims priority to U.S. Provisional Patent Applications 62/850,437 filed on May 20, 2019, U.S. 62/869,823 filed on Jul. 2, 2019, U.S. 62/897,970 filed on Sep. 9, 2019, and U.S. 62/903,709 filed on Sep. 20, 2019. The disclosures of which are included herein by reference in their entirety.

FIELD OF THE INVENTION

The present invention relates generally to electric vehicle platforms, their design, methods of manufacture, component systems, and materials.

BACKGROUND OF THE INVENTION

Automobile vehicles may generally be described in relation to a body or cabin, which are designed to enclose the passengers, and the various electrical, mechanical and structural systems, subsystems, and components that allow the vehicle to operate. In traditional automobile design, the body and various functional systems and components are inextricably intertwined. For example, mechanical linkages directly interconnect the steering and brake systems between the wheels and the passenger, and elements such as the motor and heating and cooling systems are disposed in a front compartment that extends upward into the body of the vehicle.

The numerous interconnections between the body and the functional components of a vehicle create a number of manufacturing and design inefficiencies. For example, a change in the motor may necessitate a change in the dimensions of the body. Similarly, altering the passenger compartment to include newly desired features, such as, for example, altering the vehicle profile or passenger seating position, may require a redesign of one or all of the functional systems of the vehicle. Accordingly, a great deal of effort has been made to design generic functional vehicle platforms (also referred to in the art as "skateboards") onto which numerous vehicle bodies may be easily attached without requiring any alteration to the components of the vehicle platform itself.

To accomplish this, vehicle platform designers endeavor to locate as many of the functional components of the vehicle into the vehicle platform as possible so that the number of interconnections between the vehicle body and vehicle platform can be reduced. Unfortunately, due to the size requirements of many of the mechanical systems of conventional internal combustion vehicles (e.g., motor, transmission, cooling system, etc.) the ability to reduce the footprint of the functional components of a vehicle to a stand-alone vehicle platform that is truly independent of the design of the vehicle body has been limited.

Recent advances in electric motor and battery technologies have made electric vehicles practical to manufacture. Electric vehicles have a number of advantages over conventional internal combustion vehicles, including the dramatically reduced footprint of the drive train components. Further advancements in signal processing and drive-by-wire technologies means that it is now possible to produce vehicle platforms containing all the necessary functional components of a vehicle. However, despite the potential these advancements represent most electric vehicle platforms being produced today continue to incorporate designs that require functional elements to extend into and interconnect with the body of the vehicle. The result is that most current electric vehicles still include design elements, such as hoods and trunks, that are relics of the internal combustion engine.

SUMMARY OF THE INVENTION

Many embodiments are directed to electric vehicle platforms, their design, methods of manufacture, component systems, and materials.

Various embodiments are directed to self-contained vehicle platforms including:
- a frame structure having a variety of interconnected structural components each having a body with a top, a bottom, and side elements that, when interconnected, make up a generally flat planar structure having a front portion, a rear portion, and a center portion, and further comprising a top and a bottom portion corresponding to the top and bottom elements respectively;
- a propulsion system having a drive motor disposed in at least one of the front and rear portions of the frame and connected to at least one of the interconnected structural components and further being interconnected to a transmission system, wherein the transmission system is connected to at least one set of drive wheels;
- a plurality of suspension systems disposed within front and rear portions of the frame each having a set of control arm assemblies each having proximal and distal ends where the proximal end of each is connected to the frame and the distal end is connected to a wheel in the set of drive wheels;
- an energy storage system disposed within the center portion of the frame structure comprising a plurality of independent battery modules electronically connected to an inverter system electronically connected to the propulsion system; and
- wherein the component systems of the vehicle platform are disposed within the boundaries of the generally flat planar structure defined by the frame structure of the vehicle platform such that no substantial part of the component systems extends in substantial part above the drive wheels.

In still various other embodiments, the drive suspension system further comprises a transverse leaf spring connected to each of the control arm assemblies and the framework structure through a plurality of connection points and wherein the leaf spring is disposed beneath the drive motor.

In yet various other embodiments, the transverse leaf spring is contoured in a vertically downward direction relative to the drive motor sufficiently such that deformation of the leaf spring does not interfere with the propulsion system.

In still yet various other embodiments, one or more spacers are disposed between the transverse leaf spring and the framework structure.

In still yet various other embodiments, the center portion of the framework structure is subdivided by one or more structural support elements into a plurality of isolated compartments, and wherein the vehicle batteries comprise of a plurality of modular elements distributed in a multiplicity of the isolated compartment.

In still yet various other embodiments, wherein the structural support elements are connected to the independent battery modules.

In still yet various other embodiments, a plurality of lateral and/or longitudinal structural support elements disposed in the center portion of the framework structure having an elongated body with an upper portion and a lower portion being planar with the top and bottom portion of the framework respectively and a first and a second end.

In still yet various other embodiments, a plurality of mounting points disposed on the top element of the framework structure in association with one or more structural support elements, wherein the mounting points correspond to cooperating mounting apertures on at least one upper body component.

In still yet various other embodiments, the top element of the framework structure further comprises a plurality of mounting orifices corresponding to each of the plurality of mounting points, wherein each of the mounting orifices surrounds the corresponding mounting point.

In still yet various other embodiments, the platform also includes a plurality of seal caps each having a contoured body with an outside surface and an inside surface such that the inside surface cooperatively engages with a corresponding mounting point, and wherein the contoured body further comprises a flange portion extending outward from the body near a bottom portion of the body by a dimension such that the dimension of the flange exceeds that of the corresponding orifice.

In still yet various other embodiments, the platform also includes a front and a rear crumple zone, wherein the interconnected structural components of the front and rear portions of the frame structure absorb energy from a directional impact and prevent the transmission of said energy to additional portions of the framework structure.

In still yet various other embodiments, the platform also includes a plurality of lateral energy absorption units, wherein the energy absorption units are disposed along outer side of the center portion of the frame structure such that the lateral energy absorption units absorb energy from a lateral impact and prevent damage to the center portion of the framework structure.

In still yet various other embodiments, the lateral energy absorption units are disposed to prevent damage to the battery modules disposed within the central portion of the framework structure.

In still yet various other embodiments, the battery modules further comprise a plurality of rigid planar heating and cooling elements disposed in association with the battery cells.

In still yet various other embodiments, the battery modules are arranged within the center portion of the framework structure such that the rigid planar heating and cooling elements are arranged both laterally and longitudinally relative to the frame structure.

In still yet various other embodiments, the drive motor is disposed within a motor housing, and wherein the motor housing has a contoured outer perimeter wherein at least a portion of the lower face of said contoured outer perimeter is configured to correspond to at least one portion of the outer contour of a plurality of gears of the transmission system, such that an indented portion of the motor housing is formed, and wherein the transverse leaf spring is disposed such that it is positioned beneath and in-line with this indented portion.

In still yet various other embodiments, the plurality of gears have an outer perimeter of the plurality of gears defines a figure eight, and wherein the motor housing is arranged such that the figure eight is tilted relative to a vertical axis, and wherein the center portion of the transverse leaf spring is disposed beneath the uppermost portion of the tilted figure eight perimeter of the motor housing.

In still yet various other embodiments, the lowest portion of the motor housing is spatially offset from the center point of the transverse leaf spring.

In still yet various other embodiments, front and rear portions of the framework structure are vertically elevated relative to the center portion of the framework structure such that the generally flat planar structure has a undulating contour.

In still yet various other embodiments, a plurality of anchor points disposed on the frame structure and cooperative to hard mount the vehicle body thereto.

In still yet various other embodiments, the battery modules and inverter system are enclosed within the top and bottom portion of the framework structure by a top and a bottom seal plate connected to the framework.

In still yet various other embodiments, the transverse leaf spring is configured to operate as both a ride spring and an anti-roll support element replacing or at least supplementing an anti-roll bar.

In still yet various other embodiments, the tension on the transverse leaf spring is adjustable to accommodate vehicle bodies having different weights and ride characteristics.

In still yet various other embodiments, the mounting points are configured to at least partially secure a passenger seat directly to the vehicle platform.

In other embodiments, the propulsion system further comprises a transmission lock device disposed within the drive motor and engages with at least one gear within the motor such that the activation of the transmission lock prevents the at least one gear from engaging in such a manner so as to cause the vehicle platform to move and wherein the transmission lock has a disengaged setting such that it can disengage from the at least one gear thereby allowing the gear to subsequently engage so as to cause the vehicle platform to move.

In still other embodiments, the vehicle platform has a plurality of interconnection elements that cooperatively engage with opposing interconnects on an opposing body structure.

Many other embodiments the interconnection elements are mechanical elements.

In various embodiments, the interconnection elements correspond to functional elements of the opposing body structure are selected from a group consisting of steering elements, braking elements, electronic control elements, and electronic display elements.

Many embodiments include a vehicle platform with a frame structure having a plurality of interconnected structural elements forming a generally planar structure having a first lower frontal impact energy absorption unit, wherein the lower energy absorption unit comprises an elongated body having a first end and a second end, wherein the second end is connected to the frame structure, and wherein the lower energy absorption unit is disposed along a lower load path of the frame structure, further comprising a first energy absorption zone and a section energy absorption zone.

In many such embodiments, the first energy absorption zone is located near the first end of the lower energy absorption unit further having a predetermined crush distance such that upon impact the first zone will crush the predetermined distance while absorbing energy from the impact. The second energy absorption zone is located near the connection with the frame structure and is configured to bend and deflect subsequent energy not absorbed from the first energy absorption zone.

Other embodiments include a vehicle platform with a frame structure having a plurality of interconnected structural elements forming a generally planar structure having a front end and a rear end, wherein the front end further comprises an upper and lower progressive deflector unit attached to the front end.

In many such embodiments, the upper deflector unit has an elongated body having a first end and a second end such that the first end is connected to the frame structure and the body extends outward from the frame structure to the second end, and wherein the upper deflector comprises a flange attached to the second end thereof and a body having an angled portion extending away from the body of the upper deflector.

In many other such embodiments, the lower deflector has an angular body with an inboard side and an outboard side wherein the inboard side extends parallel and rearward along a portion of the frame structure and the outboard side extends outward and rearward from the front end of the framework at an angle such that it progressively diverges from the frame structure.

In still many other such embodiments, a secondary attachment mechanism is provided with a first and a second attachment end wherein the first attachment end is attached to the lower deflector at a furthest point from the diverging outer side and the second attachment end is attached to the frame structure.

Many embodiments are directed to a battery enclosure for use in an electric vehicle platform. Many embodiments include a battery enclosure that has multiple structural elements forming a basic framework of the enclosure including:

A pair of longitudinal side rails each with an elongated body with a forward end and a rear end and with external and internal sides;

A forward and a rear support element each with an elongated body with opposing ends and disposed laterally between each of the side rails and connected to each of the two side rails where each of the opposing ends connects to a respective internal side of the side rails, and wherein the forward support element is disposed at the forward end and the rear support element is disposed at the rear end thereby creating a space therebetween; and A plurality of lateral support structures having elongated bodies with opposing ends and disposed between the side rails in a longitudinal direction such that the space is divided by the lateral support structures and wherein each of the side rails, forward and rear support elements, and lateral structures serve to provide strength to the battery enclosure as well as act as support features for a plurality of internal battery components disposed within the divided space.

Other embodiments include one or more longitudinal support members each having an elongated body with a first end and a second end, wherein the first end is connected to a center portion of one of the forward support element or the rear support element and wherein the second end is connected to a center portion of a lateral support structure.

Still other embodiments include a top plate and a bottom plate wherein the top plate is secured to a top portion of each of the side rails, the forward and rear support elements, and each of the plurality of lateral support structures, and wherein the bottom plate is secured to a bottom portion of each of the side rails, the forward and rear support elements, and each of the plurality of lateral support structures.

Various other embodiments are directed to vehicle suspension systems including:

a frame structure of a vehicle platform having a variety of interconnected structural components each having a body with a top, a bottom and side elements that, when interconnected, make up a generally flat planar structure having a front portion, a rear portion, and a center portion, and further comprising a top and a bottom portion corresponding to the top and bottom elements respectively, a left and right control arm assembly, each having an upper and a lower control arm and a wheel mount structure wherein each of the upper and lower control arms have a first end and a second end where the first end is pivotably connected to the frame structure and the second end is rotatably connected to a wheel mount structure, a load dampening device having an elongated body that is compressible between an upper and lower component wherein the upper component is connected to the frame structure and the lower component is connected to the lower control arm, and a transverse leaf spring having an elongated body with a center portion and two outer portions and an upper surface and a lower surface and two side surfaces extending between a left and a right outer end, wherein the elongated body extends between the left and the right control arm assemblies and wherein the left and right ends are connected to the left and right control arm assemblies respectively through a mounting bracket attached at each of the outer ends, and wherein the transverse leaf spring also has at least two inner mounting brackets located at a distance between a center of the transverse leaf spring and the outer ends.

In other embodiments, the suspension system further comprises a mounting bracket cover having a contoured body that is contoured to cover an inner mounting bracket and is connected to the frame structure with at least two attachment points.

In still other embodiments, the transverse leaf spring has a contoured elongated body such that a center portion of the elongated body deviates from a straight line in a downward direction such that the contoured portion extends below an electric drive system that is disposed within an internal space between the rails of the frame structure and wherein the electric drive system is attached to the frame structure.

In yet other embodiments, the first end of the upper control arm further comprises a forward and a rearward attachment point that connects to the rails of the frame structure via an opening in the rails of the frame structure such that at least a portion of the forward and rearward attachment points sit within the rails of the framework structure.

In yet still other embodiments, the inner mounting brackets are each moveable along the length of the transverse leaf spring wherein the position of the inner mounting brackets effects a movement envelope of the leaf spring.

In yet other embodiments, the suspension system further comprises second upper control arm, wherein the second upper control arm is pivotably connected to the rails of the frame work structure and rotatably connected to the wheel mount structure.

In still other embodiments, the suspension system further comprises at least a second lower control arm, wherein the at least second lower control arm is pivotably connected to the rails of the framework structure and rotatably connected to the wheel mount structure.

In yet still other embodiments, the transverse leaf spring has a rectangular cross section throughout the elongated body.

In other embodiments, the width of the middle portion is wider than the width of the outer portions.

In yet other embodiments, the height of the outer portions is higher than the height of the middle portion.

In still other embodiments, the width of the middle portion is 1.7 times greater than the width of the outer portions.

In yet still other embodiments, the height of the outer portions is 1.5 times greater than the height of the middle portion.

In other embodiments, the suspension system further comprises a body spacer, wherein the body spacer is disposed beneath the outer ends of the transverse leaf spring such that it is positioned between the leaf spring mounting point and the lower control arm.

In many embodiments, the spacer may be adjustable by a mechanical adjustment device.

In yet other embodiments, the body spacer may have a maximum height of 50 mm.

In still other embodiments, the body spacer may have a minimum height of 1 mm.

In yet still other embodiments, the upper surface of the leaf spring is 50 mm away from an electric drive system housing disposed within the frame structure.

Other embodiments include a transverse leaf spring comprising an elongated body with a center portion and two outer portions and an upper surface and a lower surface and two side surfaces extending between a left and a right outer end, wherein the upper surface of the left and right outer ends is positioned in a first plane and wherein the upper surface of the center portion is positioned in a second plane located below the first plane.

In other embodiments, the upper surface of the center portion of the transverse leaf spring is positioned in a second plane located 50 mm below the first plane.

In still other embodiments, the elongated body of the transverse leaf spring has a rectangular cross section.

In yet other embodiments, the width of the middle portion of the transverse leaf spring is wider than the width of the outer portions.

In yet still other embodiments, the height of the outer portions are higher than the height of the middle portion.

In still other embodiments, the width of the middle portion is 1.7 times greater than the width of the outer portions.

In yet still other embodiments, the height of the outer portions is 1.5 times greater than the height of the middle portion.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein:

FIGS. 6A through 6F illustrate a front compaction zone in accordance with embodiments of the invention.

FIG. 6G illustrates a compaction control component in accordance with embodiments of the invention.

FIGS. 8A and 8B illustrate a cross sectional view of an impact absorption element of the platform in accordance with embodiments of the invention.

FIGS. 20A through 20C illustrate leaf spring attachment points in accordance with embodiments of the invention.

FIGS. 23B through 23F illustrate an adjustable suspension spacer in accordance with embodiments of the invention.

FIGS. 24A to 24C illustrate a vehicle platform rear suspension system with a leaf spring in accordance with embodiments of the invention.

FIGS. 25A and 25B illustrate a load diagram of a suspension system.

DETAILED DESCRIPTION OF THE INVENTION

Figure 1:
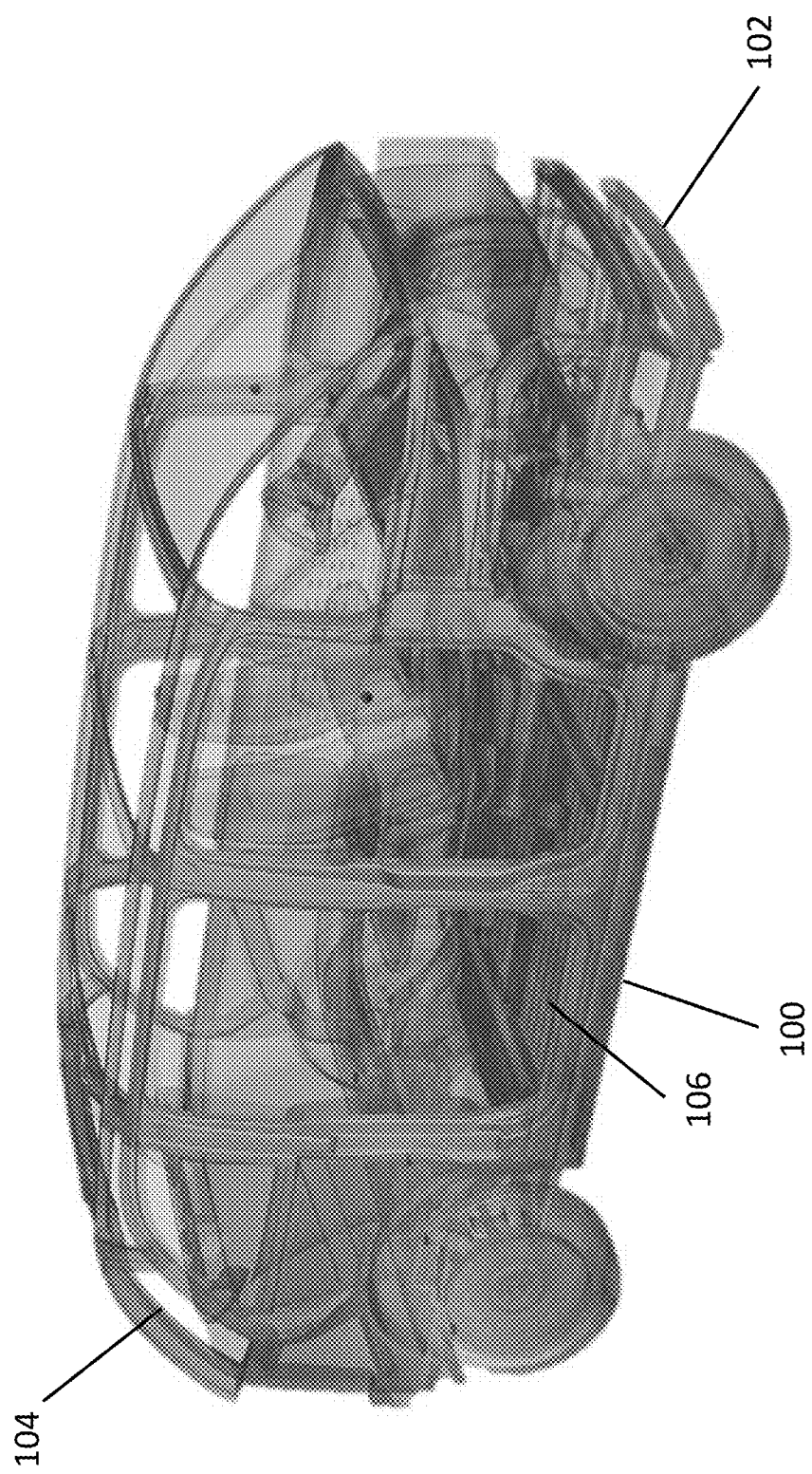
FIG. 1 illustrates a vehicle in accordance with embodiments of the invention.

Turning now to the drawings, vehicle platforms, and systems, subsystems, and components thereof are described. Many embodiments are directed to a self-contained vehicle platform or chassis incorporating substantially all of the functional systems, subsystems and components (e.g., mechanical, electrical, structural, etc.) necessary for an operative vehicle. Functional components, according to embodiments, may include at least energy storage/conversion, propulsion, suspension and wheels, steering, crash protection, and braking systems. Various embodiments are configured such that the functional components are standardized such that vehicle platforms may be interconnected with a variety of vehicle body designs with minimal or no modification to the functional linkages (e.g., mechanical, structural, electrical, etc.) therebetween. Several embodiments also incorporate configurations of functional components within the vehicle platform such that there is minimal or no physical overlap between the functional components and the area defined by the vehicle body. Embodiments are also directed to specific functional components of such vehicle platforms, and the relative placement of the various functional components, to allow for implementation of a self-contained vehicle platform.

Specific functional components and systems in accordance with many embodiments may include the vehicle platform frame, the frame's configuration, manufacture and components. Various embodiments of vehicle platform frames may include the specific arrangement of structural elements and the disposition of other functional components in, on, and between such structural elements. Vehicle platform frames in accordance with embodiments may also include crash protection elements, including, but not limited to, crumple or deflection zones, crash cans, etc. In some embodiments, the vehicle platform frame structure may also be configured with a variety of safety features and subsystems that are designed to minimize damage to other components as well as reduce injury to an end user of the product. Embodiments of such safety features may be configured to allow for the placement of passengers in non-traditional locations within the vehicle body cabin.

Functional components of vehicle platforms in accordance with various embodiments may also include suspension systems, their configuration, construction and components. Several embodiments incorporate suspension systems that may comprise front and rear transverse leaf spring suspension elements disposed within the horizontal plane of the vehicle platform. Various embodiments of drive train systems may comprise one or more motor and interrelated transmission components disposed within the horizontal plane of the vehicle platform in operative relationship with one or both the front and/or rear wheels.

Functional components may also include embodiments of energy storage systems (e.g., vehicle battery modules) within the vehicle platform frame. In various embodiments, energy storage systems are configured to use the vehicle frame as the sealed energy storage system compartment. Many embodiments of energy storage systems comprise a plurality of modular energy storage elements that are independently orientable relative to the vehicle platform frame.

The described apparatuses, systems, and methods should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatuses can be used in conjunction with other systems, methods, and apparatus.

Discussion of Vehicle Platforms

Many electric vehicles operate on an underlying vehicle platform or what is commonly referred to as a skateboard. As shown schematically in FIG. 1, the vehicle platform 100 provides the necessary functional framework (e.g., mechanical, electrical, etc. components) allowing for vehicle operation as well as a frame structure 102 on which may be mounted the various functional systems, subsystems and components of the vehicle such as the motors, suspension, wheels, and passenger compartments, and the vehicle body 104 itself. In alternative fuel vehicles the vehicle platform is also typically where the energy storage elements 106 (e.g., batteries for electric vehicles or fuel containment areas for fuel cell vehicles) are located. One of the primary goals in building such vehicle platforms is to keep their construction as simple and flexible as possible so that many vehicles can be designed and built on the same vehicle platform. To accomplish this design goal it is important to minimize the number of vehicle components that span between the vehicle platform and the vehicle body. In an idealized vehicle platform, all functional components not specifically requiring user interaction would be located within a vehicle platform that would define a horizontal upper platform face such that any suitably sized body having any desired body geometry or configuration could be mounted thereto without requiring rearrangement of any of the underlying functional elements. This was the original vision of the GM AUTOnomy and Hy-wire concept vehicles. (See, e.g., U.S. Pat. Nos. 7,281,600, 7,441,615, 6,899,194, 6,923,282, 6,935,658 and 6,986,401, the disclosures of which are incorporated herein by reference.) However, these concept vehicles used prototype technologies such as fuel cells and in wheel motors that have not proven to be practical for production vehicles. Accordingly, despite the importance of vehicle platform design, and the long desire for vehicle platforms that are self-contained (i.e., that do not have one or more components that extend into the body of the vehicle) and that provide maximum design flexibility (i.e., that do not constrain the types of bodies that can be attached), such self-contained vehicle platforms have not been fully realized in production vehicles.

For example, although many electric vehicles implement a skateboard or vehicle platform to support some of the features listed above, many such platforms still follow the design traditions of conventional vehicles. For example, many vehicles include elements, such as, for example, suspension systems, steering linkages and other components that extend above the plane of the vehicle platform. The presence of these functional components in areas beyond the confines of the vehicle platform limits the design possibilities of the vehicle bodies attached to such platforms and often requires the introduction of conventional design elements into the final vehicle body configuration, such as, for example, hoods, and trunks, or otherwise limits design flexibility. While the use of these traditional designs may help simplify some elements of vehicle design, including, for example, the use of traditional suspension systems or the integration of conventional safety systems, the vehicles configured for use with these more conventionally designed vehicle platforms are unable to take advantage of the full potential of the implementation of alternative fuel technologies.

The various embodiments described herein illustrate a vehicle platform that dramatically increases design flexibility while maintaining essential comfort and safety requirements. Embodiments also illustrate the adaptability of the skateboard to a variety of body configurations for use in a variety of operational environments. While the current disclosure may divide many of the functional elements of vehicle platforms into individual sections for clarity, it will be understood that vehicle platforms according to embodiments may combine, include or omit any of the described functional elements as desired by a specific vehicle design.

Embodiments Implementing Vehicle Platforms

Figure 2:
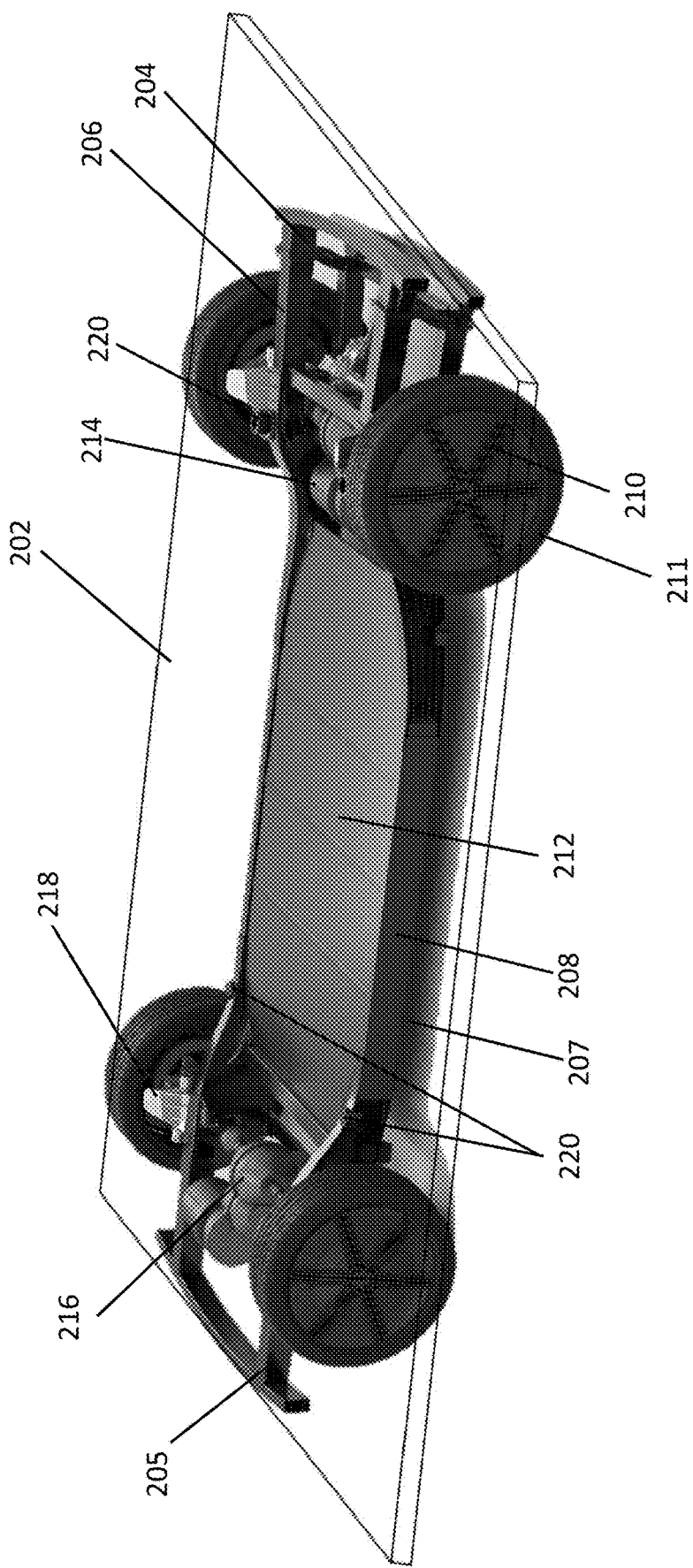
FIG. 2 illustrates an electric vehicle platform in accordance with embodiments of the invention.

Turning now to the drawings, self-contained vehicle platforms in accordance with embodiments of the invention are illustrated in FIG. 2. It will be understood that the term self-contained in this context is not meant to imply that all functions of a vehicle are contained within the vehicle platform, rather the term self-contained refers to the inclusion within the core vehicle platform structure of such vehicle platform embodiments certain key functional systems, sub-systems and components, including those needed to generate propulsion and maintain the control and stability of the vehicle. In other words, embodiments described herein illustrate a skateboard platform that may be adaptable to a variety of vehicle bodies that may be integrated therewith without requiring the rearrangement or redesign of the functional systems and components comprised within the vehicle platform. Moreover, although many embodiments exhibit vehicle platforms incorporating all the functional elements described in the application, it will be understood that various combinations of functional elements, such as, suspension systems, impact features, batteries, etc., may be included or omitted as required by the specific vehicle design.

FIG. 2 illustrates the overall layout of a vehicle platform 200 in accordance with many embodiments that integrates one or more functional systems including energy storage, drive train, suspension, steering, braking, and safety systems, sub-systems and components substantially within the boundaries of the vehicle platform. As used herein, the boundaries of the vehicle platform will be taken to comprise a generally horizontal vehicle platform plane 202 extending the width of the vehicle platform and from the top face 204 of the uppermost frame structure 206 to the bottom face 207 of the frame structure 208. In various other embodiments the boundaries of the vehicle platform may also comprise areas positioned anywhere within the upper and lower dimensions of the wheels 210 and/or tires 211 of the vehicle. With respect to the platform plane, it should be noted that, as shown in FIG. 2, many embodiments of the vehicle platform may comprise a frame having portions disposed at different heights relative to each other (e.g., having front and rear portions elevated relative to a central portion as illustrate in FIG. 2), in such embodiments it will be understood that the platform plane 202 may be described as an undulating plane such that in some embodiments functional components are defined as not extending above an undulating plane defined by an upper face of the subject portion of the vehicle platform frame. Regardless of the specific boundaries of the vehicle platform, it will be understood that functional components within this platform plane are disposed such that they do not extend within the inner volume defined by a vehicle body when secured atop the vehicle platform. Further it shall be understood that the principal functional systems described above and throughout are not inclusive of the various wires and/or other busses and connectors that might enable the connection of embodiments of the vehicle platform to a vehicle body portion.

Vehicle platforms capable of allowing for such self-contained layouts in accordance with embodiments may be described in reference to various internal vehicle platform portions: a central portion generally disposed between the wheels, and front and rear portions extending from the end of the central portion to the front and rear ends of the vehicle. Descriptions of the specific frame elements will be more fully described later, however, as shown in FIG. 2, these portions are subdivided and the systems, subsystems and components are configured within such that a self-contained vehicle platform is realized.

The embodiment shown in FIG. 2 comprises an exemplary functional layout suitable for an electric vehicle, including an energy storage system (e.g., battery pack(s)) 212), front 214 and rear 216 drive trains (e.g. electric motors and associated power electronics, transmissions, etc.), and control systems, such as suspension, steering and braking 218. As can also be illustrated in the embodiment of FIG. 2, the drive train elements (e.g., motors, transmissions, etc.)

may be positioned in-line with the wheel and close to the front and/or rear; portions of the vehicle platform frame 206 thereby allowing for increased passenger space within the vehicle cabin. In addition to the propulsion systems and suspension systems that may be incorporated into the vehicle platform 200, many embodiments may incorporate a variety of other components such as control systems designed to operate a variety of other systems (e.g., brakes, steering, cooling, etc.). In many embodiments, the frame 206 of the vehicle platform 200 also comprises a variety of suspension systems 218 to connect the vehicle platform to the wheels of the vehicle, provide road-holding, handling, and ride quality functions. For example, the suspension systems may be independent or dependent, and may include struts, springs, control arms, torsion bars, etc. In various embodiments, the vehicle platform 200 incorporates a suspension system layout that confines the suspension components within the horizontal plane of the vehicle platform. Such suspension systems, in some embodiments, may allow for the direct or hard mounting of the cabin to the vehicle platform to avoid the need for bulky interconnection bushings to simplify the interconnection between cabin and vehicle platform. Many such vehicle platform embodiments may also include comfort control systems including HVAC components (e.g., compressors, mixing systems, ductwork, etc.).

The disposition of these functional systems and components within the horizontal platform plane 202 allows for any vehicle body design of suitable width and length to be integrated with the vehicle platform by interconnection at certain fixed attachment points 220 positioned along the vehicle platform frame as long as the design accounts for suitable mechanical (if any) or electrical interconnections to allow for user control of the vehicle platform from within the vehicle body.

Figure 3A:
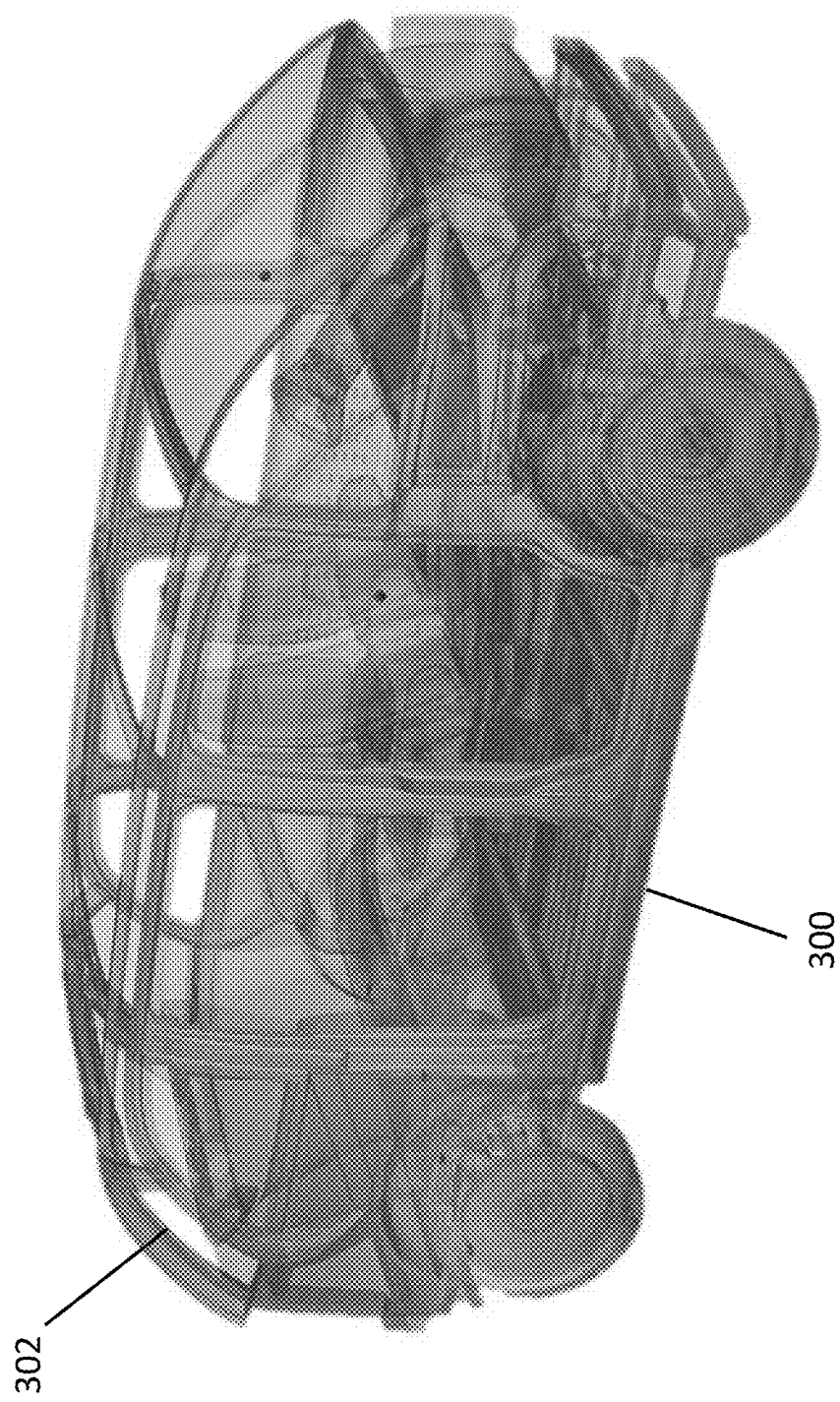
FIGS. 3A to 3C illustrate an electric vehicle platform integrated with various vehicle bodies in accordance with embodiments of the invention.
Figure 3B:
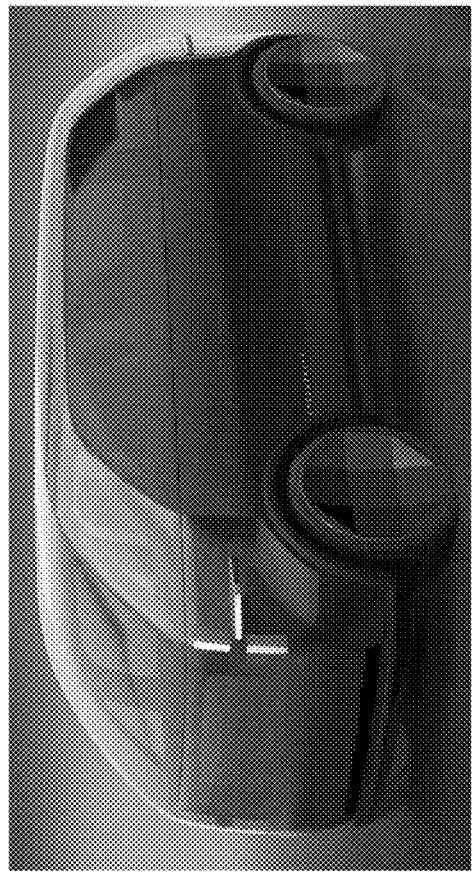
Figure 3C:
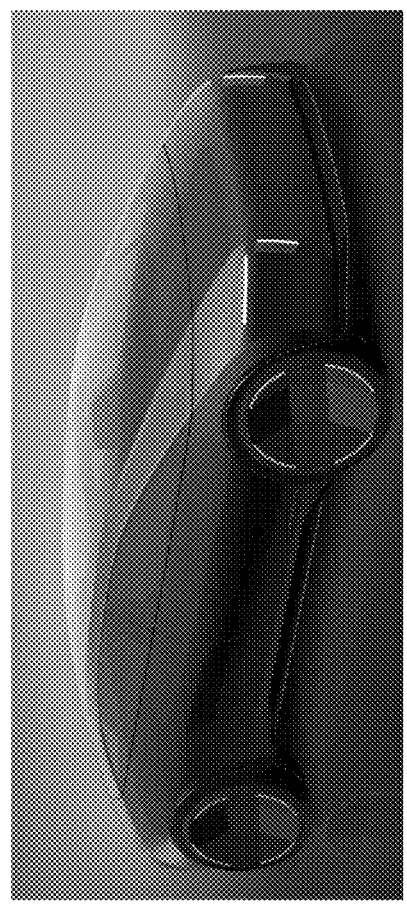

As shown schematically in FIGS. 3A to 3C, vehicle platforms 300, according to embodiments, allow for a wide range of vehicle bodies 302 to be attached thereto through attachment points whereby the vehicle bodies may connect to the underlying vehicle platform frame. For example, FIG. 3B illustrates embodiments in which the body structure disposed on top of the vehicle platform takes the form of a van, while FIG. 3C illustrates a more traditional sedan-type cabin disposed on top of the same vehicle platform.

Figure 4:
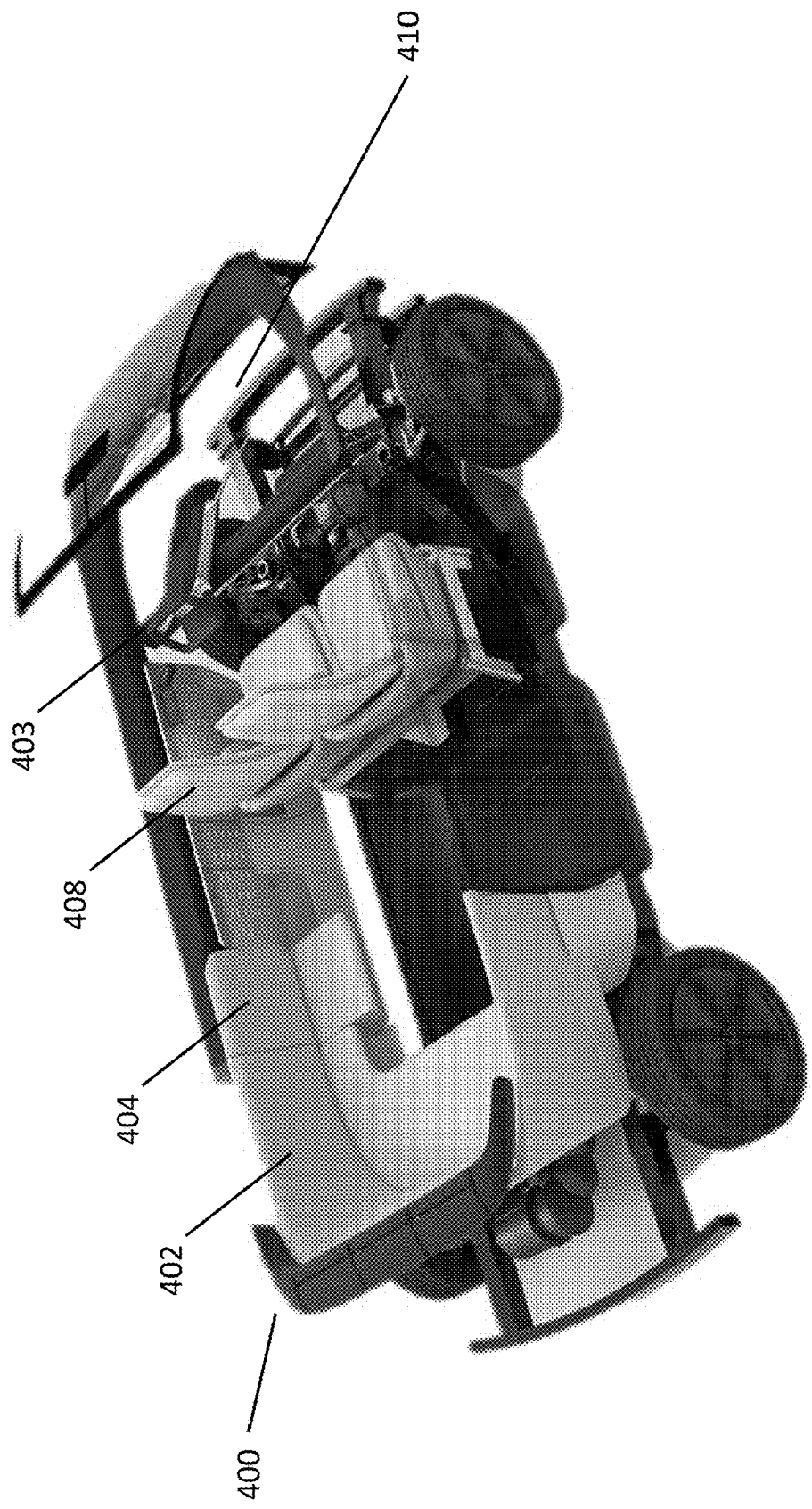
FIG. 4 illustrates an electric vehicle platform having an embodiment of a vehicle cabin configuration integrated therewith in accordance with embodiments of the invention.

The layout of the vehicle platform according to embodiments, and particularly the self-contained nature of the vehicle platform in which a substantially horizontal platform having no significant elements intruding above the upper face of the platform is provided for vehicle body mounting, allows for the integration of vehicle bodies that can take advantage of the full wheelbase of the vehicle platform (e.g., moving passenger position as far forward and rearward as possible) without significant constraint as to the uses for which the interior space thus provided may be put. This combination allows for creation of truly novel vehicle interior designs. For example, as illustrated in FIG. 4, interior seating 400 may include any desired arrangements (e.g., front 402, side 404 and/or back-facing seats). The open floor space afforded by the vehicle platform designs also allows for furniture elements, such as tables or credenzas to be included in such arrangements. While the vehicle body shown in FIG. 4 still includes a traditional set of seats 408 for a driver and front passenger, it will be understood that embodiments contemplate control systems that may be designed to be completely autonomous thus negating the need to have a set of forward facing seats. In such embodiments, seats could be reconfigured to take any desired arrangement. Even where a traditional driving configuration is present, as shown in FIG. 4, the absence of functional elements disposed above the platform frame in the front section 410 of the vehicle removes the need for a traditional dash or engine compartment allowing for novel control placement and window arrangements.

Essentially, the unique vehicle platform configuration of the various embodiments may allow for vehicle body designs where the entire passenger cabin may be reconfigured for desired purposes such as passenger transport or other forms of transportation. Additionally, such embodiments may allow the vehicle to be used for public type transportation similar to a taxi but would allow multiple passengers to ride comfortably while also providing adequate space for any luggage or belongings. Although not shown in the figures, some embodiments of the vehicle platform may also be modified to accommodate additional cabins such as a pickup truck, sport utility vehicle, etc.

The above-discussion has focused on highlighting the characteristic features of embodiments of self-contained vehicle platforms suitable for use as functional platforms for a wide-variety of vehicle designs. In the sections that follow, focus will be placed on embodiments of specific configurations of functional components that may be implemented separately and in combination to achieve the desired vehicle platform functionality.

Embodiments Implementing Vehicle Platform Frames

Figure 5:
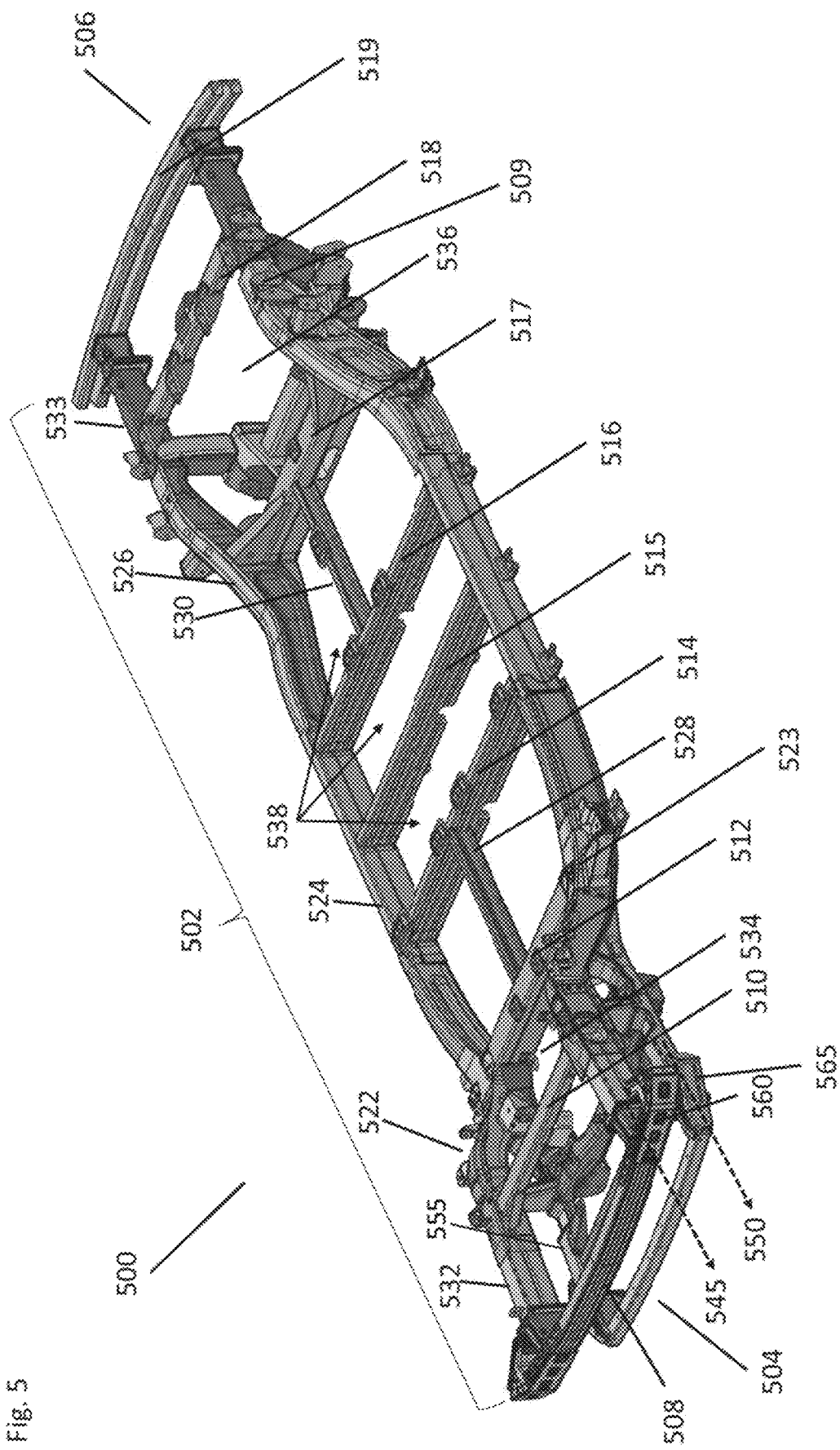
FIG. 5 illustrates a vehicle platform frame structure in accordance with embodiments of the invention.

Referring to FIG. 5, a vehicle structural frame 500 in accordance with various embodiments is provided. As shown, the structural frame 500 generally comprises a series of interconnected structural elements configured to support the vehicle as well as the necessary components to allow the vehicle to function, and define one or more interior frame spaces adaptable to accommodate functional systems, subsystems and components of the vehicle platform. Generally these structural elements can be divided between left and right frame rails 502 that extend from the front 504 to the rear 506 of the vehicle and define the length of the vehicle, and a plurality of lateral structural cross member elements (e.g., 508, 510, 512, 514, 515, 516, 517, 518, 519) that extend between the frame rails and define the interior width of the vehicle. Although these frame rails and lateral structural elements are described collectively, it will be understood that in accordance with many embodiments they may and are often formed of multiple interconnected structural elements.

In various embodiments, as shown in FIG. 5, the frame rails 502 may be divided into a number of either unitary or separate and interconnected structural members that extend longitudinally between the front and rear ends of the car. Starting at the front 504 of the vehicle platform, left and right front frame rails 522 may extend backward from the vicinity of the front motor support cross member 510. Rearward of the front motor support cross members 510, the front frame rails angle outward and extend rearward, passing through the front torque box 523 to meet the left and right mid-body side rails 524. Rearward of the mid-body side rails, left and right rear frame rails 526 (which are either extensions of or joined together with the mid-body side rails) angle inward and extend to the vicinity of the rear motor support cross member 518. For added strength and rigidity, a number of laterally disposed cross member structural elements 512, 514, 515, 516 and 517 may extend between the mid-body side and front/rear frame rails (e.g., 522, 524, 526). Although a specific number of lateral cross member structural elements are shown spanning the mid-body side rails in FIG. 5, it will be understood that embodiments may incorporate any number of such cross member structural elements suitable to provide sufficient lateral support to the vehicle platform frame. In addition, further inner longitudinal structural members 528 and 530 may be provided to further strengthen the inner spaces of the midbody from collapse in case of front or rear impact. In various embodiments, rails and structural members may be formed of a common structural member such that the tooling required for manufacture of the various structural members may be reduced.

Additionally, in order to provide adequate safety of the passengers, embodiments of the vehicle platform frame 500 may incorporate a variety of front/rear and side impact crumple zones. For example, frame rails in the front 532 and rear 533 in conjunction with front 508 and rear 519 crossmember may work in concert as impact absorption/deflection zones to absorb or redirect an impact that occurs on either the front or rear of the vehicle. The impact absorption/deflection zones may incorporate a variety of features that are known in the art including, but not limited to, being made of an energy absorbing material, or being otherwise configured to crumple or deform when subject to an impact. Various materials may be used in the manufacture of the vehicle platform frame 500 including, for example, steel, aluminum, titanium, metal alloys, composite material, plastics, carbon fiber, and various combinations thereof. Many embodiments may utilize a variety of bonding techniques to connect the various components, such as, for example, welding and/or bolting. Additionally, some components may be manufactured in any manner suitable to produce a portion of the framework that meets the desired outcome in terms of strength, function, and/or appearance.

Although specific arrangements structural members, materials and methods of manufacture are described above, it will be understood that many possible arrangements of structural members may be implemented that result in the creation of a plurality of inner frame volumes. Specifically, as shown in FIG. 5, lateral structural elements 508 to 512 extending between right and left front frame rail elements 522 define a front body space 534 in and around the front axle of the vehicle platform. Likewise, lateral structural elements 517 to 519 extending between left and right rear frame rail elements 526 define a rear body space 536 in and around the rear axle of the vehicle platform. Between the front and rear body space lateral elements 512 to 517 extending between side rails 522 to 526 define a mid-body space 538, which itself in many embodiments may be formed of a plurality of separate volumes by internal lateral and longitudinal structural elements (as shown by elements 528 and 538 in the embodiment illustrated in FIG. 5). In various embodiments, portions of the front 522 and rear 526 rail elements and respective front 534 and rear 536 body spaces may be elevated relative to the rest of the vehicle frame to accommodate functional drive train components, and the frame may include other elements to surround and protect an energy conversion system. Where portions of the vehicle platform frame are disposed at different elevations relative to each other, it will be understood that the horizontal platform plane may take on an undulating conformation, as previously discussed.

Although many embodiments are described, it will be recognized that the vehicle platform frame can take many different forms, in addition to the cage-like structure of the embodiment depicted in FIG. 5. In various embodiments, the vehicle platform frame may generally comprises any arrangement of two or more longitudinal structural members spaced a distance apart from each other, with two or more transverse structural members spaced apart from each other and attached to both longitudinal structural members at their ends such that interior spaces sufficient to dispose the functional components of the vehicle platform are formed. Alternatively, the vehicle platform frame may also be formed of integrated rails and cross members formed in sheets of metal or other suitable material, again such that the arrangement is suitable to accommodate various functional components. In addition, frame structures according to embodiments may be configured to incorporate one or more of the functional elements described in one or more of the preceding and following sections of this disclosure.

Embodiments Implementing Impact control Features

As discussed above, with respect to the various features and characteristics that can be integrated into embodiments of the vehicle platform, vehicle platform frames may also include crash protection elements, including, but not limited to, crumple or deflection zones, crash cans, etc. FIG. 5 in conjunction with FIGS. 6A through 10 illustrate various embodiments of impact features that may be implemented within the framework of various vehicle platforms.

Referring to FIG. 5, many embodiments of the vehicle platform may have a variety of safety features and/or elements incorporated into the front 504 and rear 506 spaces of the framework. For example, the front space 504 may have an upper load path 545 and a lower load path 550 each of which will take on a different load in the event of a vehicle impact. The load paths as described herein refer to the path in which energy is directed during an impact event. As a vehicle can be exposed to any number of impact types, the different load paths can be designed to operate in a variety of manners to help absorb and deflect the energy of the impact. For example, the Insurance Institute of Highway Safety (IIHS), as well as the National Highway Traffic Safety Administration (NHTSA), routinely performs a number of vehicle impact tests to evaluate the safety features on vehicles. A zero degree full frontal impact test as well as partial overlap tests are generally performed on the front passenger and driver sides of the vehicle. The IIHS evaluates, among other things, the amount of passenger compartment penetration in such tests and looks at the various structural elements that helped prevent or failed to prevent such penetration. Additionally, the IIHS performs similar side impact tests looking at similar penetration aspects.

The many frontal impact tests illustrate that the front portion of a vehicle can experience high-energy absorption and thus many embodiments may require higher energy absorption over a short distance due to the reduced size of the front engine compartment. Thus, many embodiments may implement a rigid barrier such as the upper rail elements 532 to perform the high-energy absorption early on in a frontal impact. However, it is undesirable for the load path to experience stack-up that results in bottom-out of the energy absorption elements throughout the event. Accordingly, many embodiments may utilize a lower load path structural element 555 configured to engage in the beginning of the impact up to a desired point and then disengage from the impact direction. The disengagement can aid in removing the vehicle from the direction of the impact, for example, by deflection of the impact. The lower load path element 555 in accordance with many embodiments may not perform like a typical break away feature because they can maintain the overall connection and integrity with the frame during frontal impacts as well as offset or partial offset impacts. Such features can help to prevent or reduce the penetration into the passenger compartment.

Figure 6A:
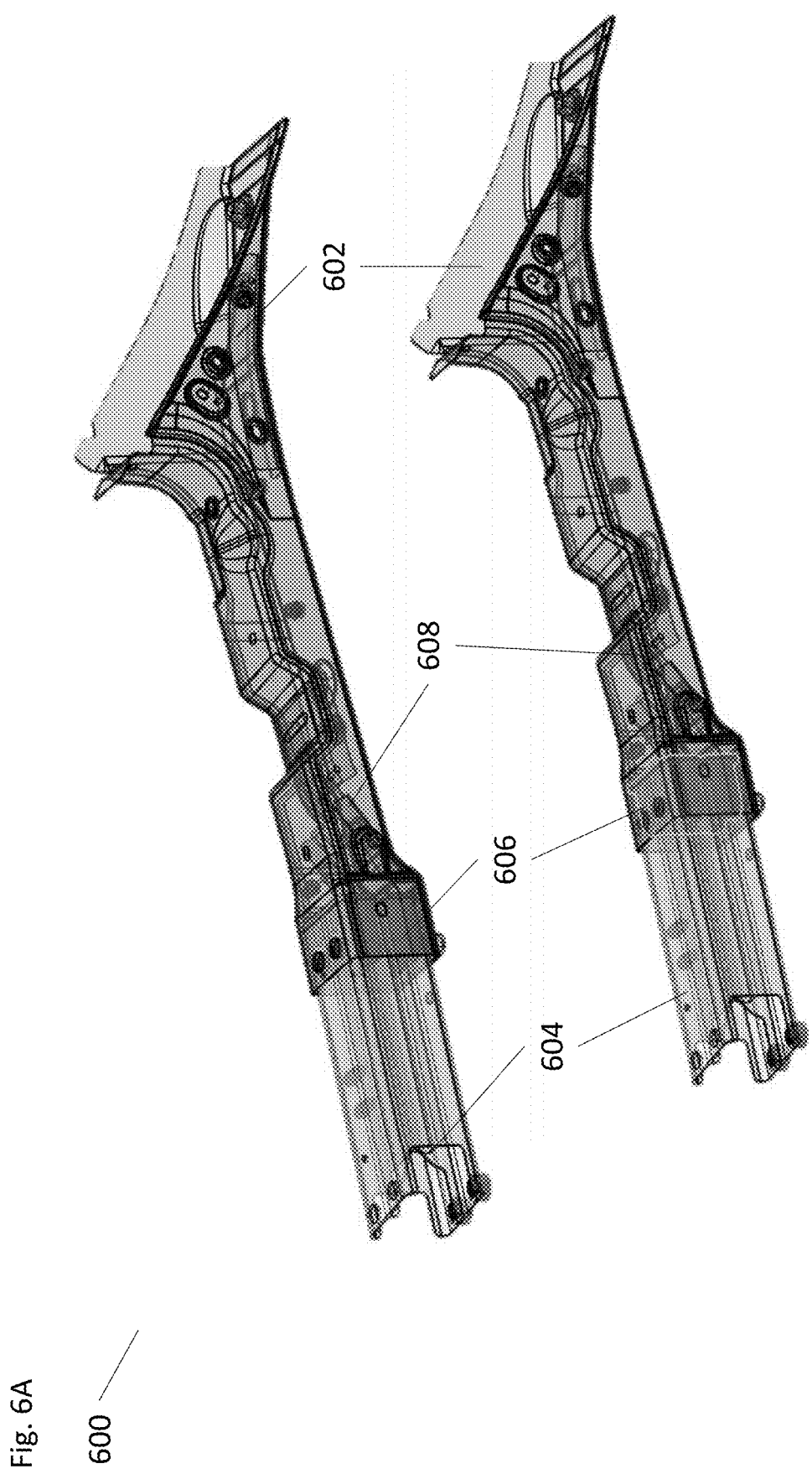
Figure 6B:
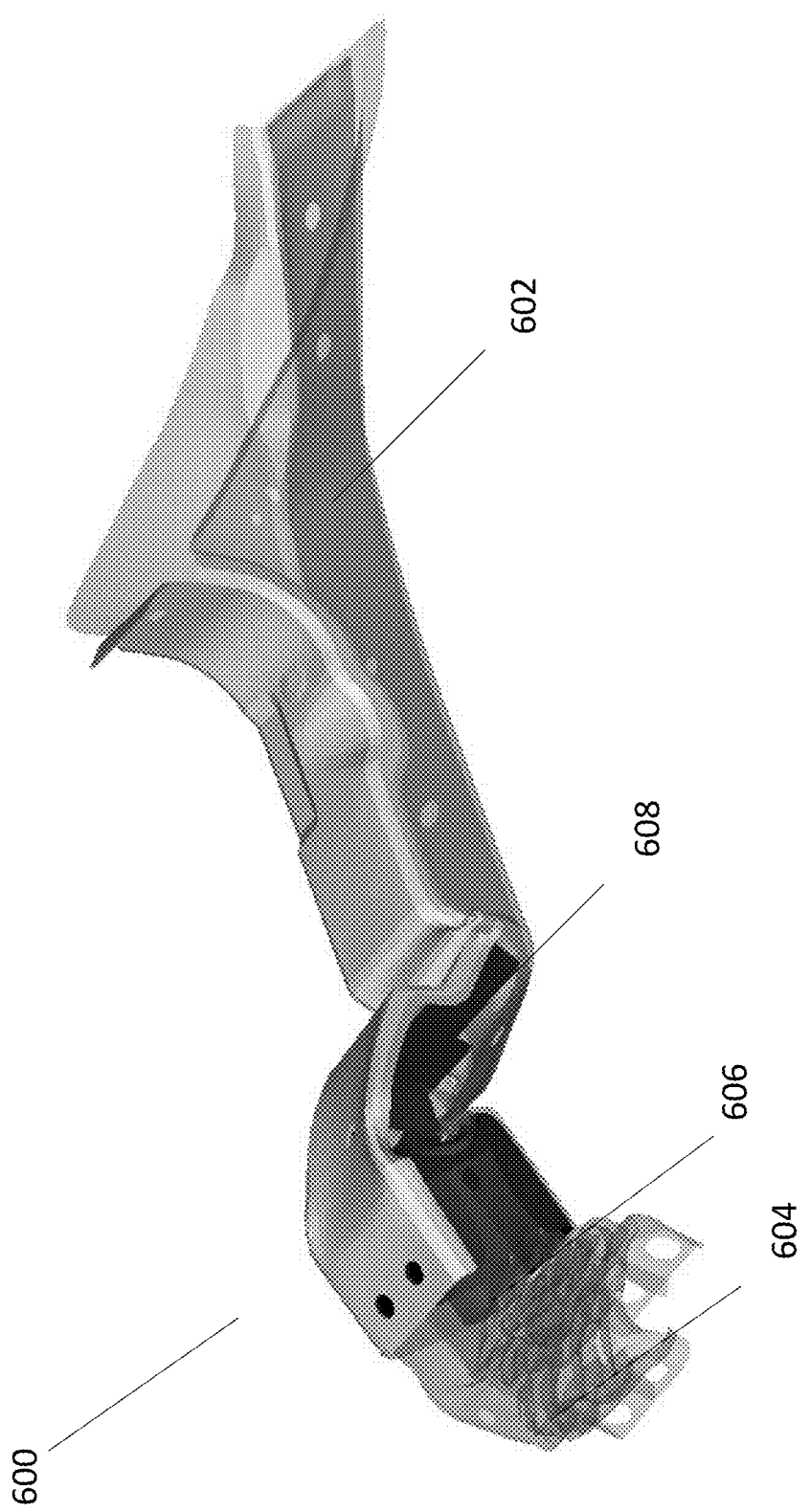

Referring now to FIGS. 6A and 6B, an embodiment of a lower load path element 600 is presented. In many embodiments, the lower load path element 600 may be connected to a portion of the frame 602 that has a fixed length and may have multiple key elements designed to absorb the energy from an impact in different ways. For example, the front portion of the lower load path may be configured with a lower load path crush zone 604 that is designed to crush during an impact. The crush zone 604 may have a controlled deformation similar to a traditional crumple zone; however, the crushing may only occur over a desired range or distance. In accordance to many embodiments, the desired crush distance can be controlled by various elements such as a crush control element 606. The crush control element 606, in accordance with many embodiments, is designed to keep the crushing within the desired crush zone 604 before transmitting the impact forces into any additional element. This can help to prevent the undesirable stack up that can often occur in a typical crumple zone. Once the lower load path crush zone 604 has reached the desired crush distance a bending element 608 is then designed to bend the lower load path element 600 in a direction that can help move or adjust the vehicle away from the direction of impact. Furthermore, such elements help to reduce or eliminate the impact on the frame structure 602 thereby allowing for increased safety. In accordance with many embodiments, the length of the crush zone 604 and control element 606 can be adjusted to account for the change in forces that may vary with the number of top hat configurations that the vehicle may assume. FIG. 6B illustrates a lower load path element 600 after it has undergone an impact. It can be seen the crush zone 604 is compacted and the bending element 608 has been deformed in such a way to minimize damage to the vehicle.

FIGS. 6C-6F provide an illustration of a sequence of impact energy absorption that may occur in accordance with many embodiments. For example, FIG. 6C illustrates a lower load path 600 prior to the introduction of impact energy and an arrow 610 that indicates the direction of the impact energy. FIG. 6D illustrates an embodiment of the initial crumpling that may occur in the crush zone 604 and how the control element 606 can limit the amount of crumpling that can occur before the energy is transferred into the bending element 608. FIG. 6E further illustrates the bending element 608 allowing for bending to occur over a desired range such that the impact energy does not adversely affect the portion of the frame structure 602, Finally, FIG. 6F illustrates an embodiment of a final state of the lower load path after the absorption of the impact energy 610.

The lower load path element as illustrated in FIGS. 6A-6F can help to take advantage of many things found in an electric vehicle and/or an electric vehicle platform as described in the many embodiments illustrated herein. For example, as illustrated in some embodiments the upper body can be expanded to the near extremes of the platform and increase the volume of space within the passenger compartment. The lower load path element, in many embodiments, can help to prevent passenger compartment penetration over a shortened distance from a shorter motor compartment. This can allow for a smaller overall footprint of a vehicle yet capitalize on the available space within that footprint and drastically improve the design capabilities of a body for the platform.

Turning now to FIG. 6G embodiments of a crush control element 606 can be seen within a lower load path. As described above, the crush control element 606 may be positioned within the lower load path 600 such that it aids in reducing the amount of compaction that the portions of the vehicle frame will ultimately see during impact. Additionally, as previously discussed the crush control element 606 can be adjustable to account for the variety of different vehicle configurations. For example, in some embodiments, the crush control element may be comprised of an upper 612 and a lower 614 component. Each of the upper 612 and lower 614 components can be configured have a variety of designs that allow for reduced weight and improved strength in accordance with many embodiments. Additionally, many embodiments may incorporate one or more mounting holes 616 that run through the crush control elements such that the crush control element 606 can aid in securing the crush zone portion 604 to portions of the vehicle frame along the lower load path. In some embodiments, the crush control element 606 can be secured with bushings or bolts or any number of securing elements sufficient for the desired operation of the crush zone.

Referring back to FIG. 5, many embodiments of the front zone of the frame 504 may, as previously described, have a variety of crash features or impact protection features. For example, the upper load path 545 may have crumple zone or crush components built into the various structural elements such as the upper front frame rails 532. Such elements can be essential to a frontal impact and having multiple crush elements can help to quickly absorb the energy from a frontal impact. However, as mentioned some impacts can occur at an offset to the front of the vehicle. As such, the IIHS performs offset crash tests to evaluate the impact on the passenger compartment. Accordingly, many embodiments may incorporate deflector elements (560 and 565) into the upper and lower load path components. The deflectors, according to many embodiments can absorb a portion of the impact along the load path but then act primarily to deflect the vehicle away from the primary direction of the impact. It is more desirable to limit the interaction with a shallow offset rigid barrier and disengage the vehicle from the barrier as quickly as possible. Therefore, many embodiments may implement a deflector system.

Figure 7:
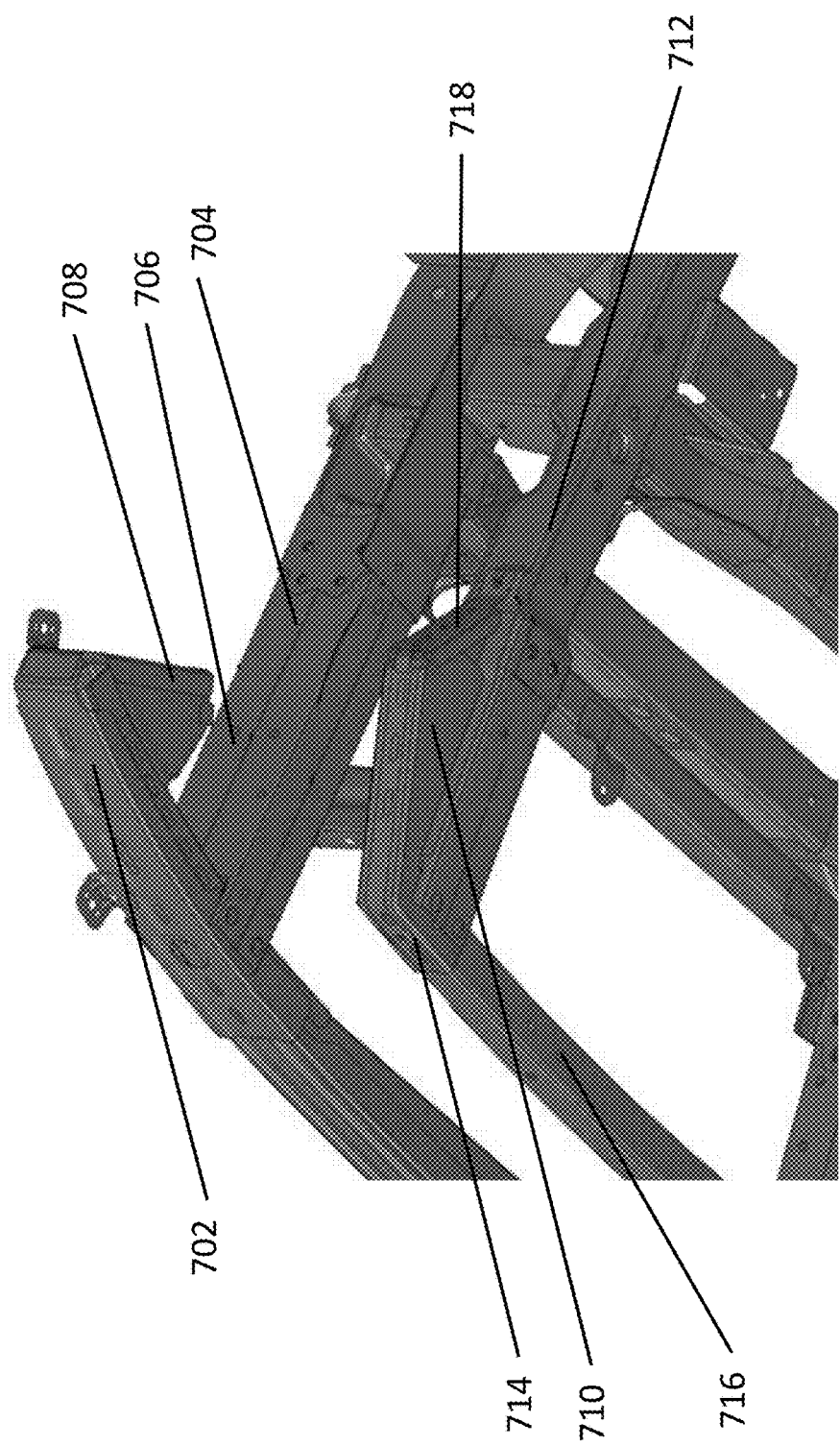
FIG. 7 illustrates a front portion of the vehicle platform designed for impact absorption in accordance with embodiments of the invention.

Referring now to FIG. 7, embodiments of a front portion of a framework for an electric vehicle platform can be seen. FIG. 7 illustrates a closer view of an embodiment of an upper and lower load path deflector is presented. The upper deflector 702 in many embodiments may be attached to and extend outward from the upper impact beams 704 or away from the centerline of the vehicle. In many embodiments, the upper deflector 702 can be contoured to match the body of the vehicle. As shown in FIG. 7 many embodiments may keep a space 706 between the outer portion of the upper deflector 702 and the upper impact beams 704. In some embodiments, this space 706 may be reduced by way of a spacer element 708. The spacer element 708 in many embodiments may be a rigid element that may be formed or attached to the upper deflector 702. The spacer 708 may take on any number of desired shapes; however, some embodiments may incorporate a triangular shape. The intent of the spacer is to allow for the impact energy from an offset impact to instigate a bending moment on the upper deflector to the point where the spacer influences the upper impact beams. Having absorbed some energy the impact between the spacer 708 and the upper impact beams 704 can then act to redirect the energy from the overall impact to deflect or push the vehicle away from the source of the impact such as a rigid barrier.

The upper deflector 702 in some embodiments may be designed to act in conjunction with the lower deflector 710. The lower deflector 710 in many embodiments may be a rigid element that is attached to the lower load path impact beams 712. In many embodiments, the lower deflector 710 may have a pre-shaped portion 714 that engages with the front portion of the lower load path impact beam 712, may be connected with a front crossbeam 716, and may extend rearward and outward at an angle away from the front of the vehicle. In some embodiments, the lower deflector 710 may be attached to the lower load path impact beam 712 by way of a connection bracket 718. Many embodiments of the lower deflector may be designed to redirect the energy from an offset impact to push the vehicle off the impact source as quickly as possible. In many embodiments, the angle of the lower deflector may be parallel to the angle of the bent upper deflector. In other words, when the upper deflector 702 has been deformed or bent to the point in which the spacer 708 affects the upper impact beam, the brunt of any remaining impact force can then be directed to the lower deflector 710 and lower impact beam. Pairing the angles of the upper and lower deflectors can help to quickly push the vehicle away from the source of impact and ultimately help to reduce the potential penetration into the passenger compartment. Although, a specific embodiment of deflectors is shown, it should be understood that the deflectors could be tuned to accommodate any number of impact loads that may be seen in accordance with any number of upper body component used. Additionally, in accordance with many embodiments, the impact components such as the spacer 708 and other deflector elements can be manufactured from any number of materials including metal, composite, carbon fiber, etc. Moreover, in many embodiments may have elements manufactured of materials similar to other portions of the framework. It should be appreciated that many embodiments of an electrical vehicle platform may incorporate one or more impact features described in relation to the front impact zone.

Figure 8A:
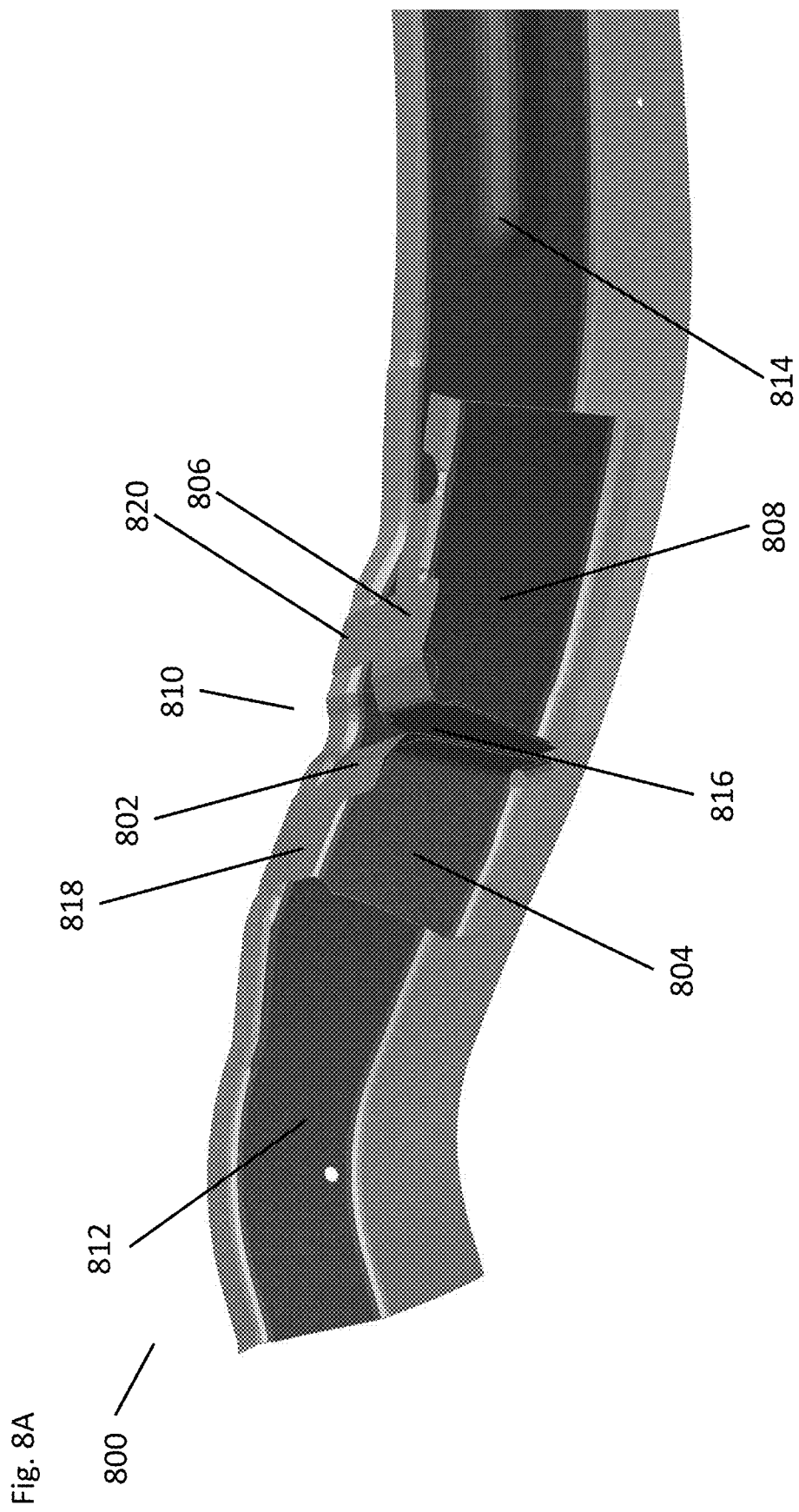

Referring back to FIG. 5, some embodiments may also incorporate additional crash or impact protection elements that may be incorporated into the rear and/or front frame rails (526 and 522, respectively). For example, referring now to FIGS. 8A and 8B, cross sectional views of embodiments of a front rail 800 are presented. Such embodiments as illustrated in FIGS. 8A and 8B may include a number of bulkhead elements (802, 804, 806, & 808) that are positioned central to the rail elements near a transition point 810 between the upper rail 812 and a mid-body rail 814. The bulkhead elements (802, 804, 806, & 808) may be positioned such that there is a space 816 between the central face 810 of each of the bulkheads. The bulkheads, in accordance with many embodiments, can act as a stopping mechanism that reduces the bending or crumpling from an impact. For example, a frontal impact may cause a bending or crumpling to occur along the length of the rails. The bulkheads in many embodiments can add strength and stiffness to the rails and, during the impact, the front and rear bulkhead can be designed to impact and thus stop or reduce the effects of the impact. Essentially, the bulkheads can help to control and reduce the intrusion into the passenger compartment. Although a certain spacing between the front and rear bulkhead elements is shown, it should be recognized that the spacing might be adjusted by any number of methods to accommodate a variety of impact loads. Accordingly, as the body of the vehicle changes, the space as well can be adjusted.

As illustrated in FIG. 8A, the bulkheads may be comprised of multiple components. The front bulkhead may have two parts (802, 804) that are designed to cooperatively engage one with the other yet in the event of an impact the front two bulk head elements (802, 804) may barely contact or not contact at all. In other embodiments, the two bulkhead components may be bonded together in such a manner that they remain in contact with each other before and during the impact. In some embodiments, the two front bulkhead components may have one or more flanges (818, 820) designed to overlap various interconnection points between the two components. For example, one or both may have a flange portion that overlaps a portion of the rail such that it may form a connection point between the bulkhead elements and the rails. Such attachment flanges may be present on both the front and the rear bulkhead elements. Although a specific design of the front and rear bulkhead elements is illustrated, it should be understood that the design, overlap, layout, connections, and/or material used for the bulkheads could vary in accordance with the safety requirements. Similar to the other frontal impact elements, the use of bulkhead elements within the rails can help maintain desired safety requirements while taking advantage of the many characteristics of electric vehicles including maximizing the use of space in the passenger compartment.

Other embodiments may implement additional or modified bulkhead elements within the rails. For example, FIG. 8B illustrates a cross sectional view of rail elements with modified bulkhead components 822. Some embodiments may incorporate the transition point 810 or a bending point within the modified bulkhead. In various embodiments, the modified bulkhead can extend between the upper and mid-body rails (812 & 814) thereby acting as a connection element that can serve as both a strengthening component as well as an impact absorption device within the rails. Some embodiments may also use a longitudinal bulkhead 824 that runs along a longitudinal axis of the rail. In other embodiments, the longitudinal bulkhead 824 may be placed in any one of the rails where a potential impact may occur. Moreover, although many embodiments exhibit vehicle impact features that may be included or omitted in vehicle platforms as described in the application, it will be understood that various combinations of such features may be used in any number of vehicle designs.

Embodiments Implementing Rear Impact Zones

Referring back to FIG. 5 in relation to the overall frame an embodiment of a vehicle platform, many embodiments have rear crush rails 533 and left and right rear frame rails 526 that are designed to absorb and/or deflect the energy from a rear impact. A rear impact can come from any number of events, including an oncoming vehicle while one is moving or stopped or the rearward movement into another moving or stationary object. Accordingly protecting the passenger compartment from rearward penetration can be just as important as the front. This is especially true under the context of many embodiments of the vehicle platform that maximizes the occupant space. As previously mentioned, the maximization of space creates shorter front and rear drive train compartments that present unique challenges in designing adequate safety features. The forward and the rearward portions 504, 506 may in some embodiments be strengthened to provide increase safety but without the added weight that can dramatically affect the efficiency of the vehicle operation.

Figures 9A, 9B:
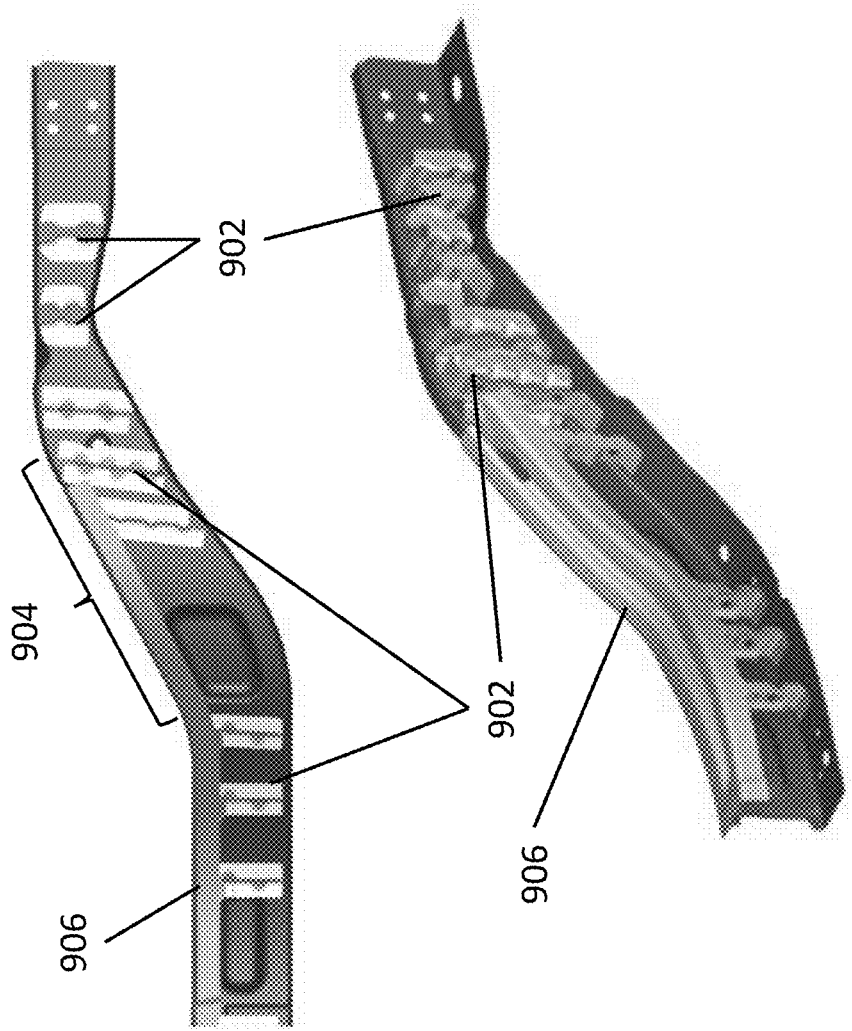
FIGS. 9A and 9B illustrate a cross sectional view of an impact absorption element of the platform in accordance with embodiments of the invention.
Figure 10:
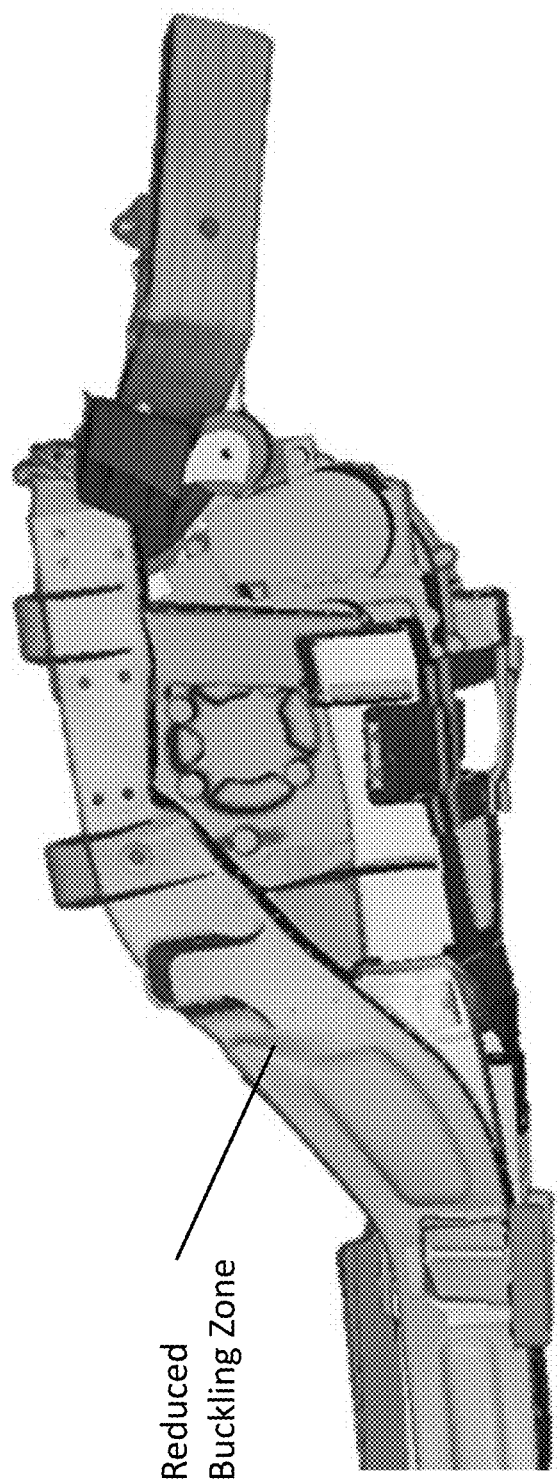
FIG. 10 illustrates a side view of a rear portion of a platform that has been impacted in accordance with embodiments of the invention.

Referring now to FIGS. 9A and 9B, an embodiment of the rear frame rails is illustrated in several cross sectional views. In some embodiments, it may be desirable to reduce the overall weight of the vehicle platform while maintaining the necessary strength to functional components of the overall vehicle. Some embodiments may incorporate multiple reinforcement bulkheads 902 along the length of the inner portion of the rear frame rails 900. The reinforcement bulkheads 902 according to embodiments can help to strengthen and stiffen the frame rails 900 in two different scenarios. First, the bulkheads 902 that may be positioned near the rear of the vehicle can be positioned such that they provide added stiffness and strength to the rails 900 to support the rear suspension system. Additionally, the rear most bulkheads can add stiffening material to help absorb impact energy from a rear impact. Likewise, the other bulkheads 902 that run forward along the length of the rear frame rail 900 may be positioned at various intervals to add strength and stiffness to the rear frame rail 900. The additional bulkheads, in accordance with many embodiments, can add additional strength and stiffness to the rear rails to minimize bending and compaction along the length of the rails during a rear impact. It can be appreciated from FIGS. 9A and 9B that the reinforcement bulkheads 902 may be positioned along the centerline of the rail 900 and may be sandwiched between an outer wall and an inner wall. Although a specific arrangement of bulkheads is illustrated, it can be appreciated that any configuration of bulkheads within the rear frame rail 900 may be used to strengthen and stiffen the rails without dramatically increasing the weight of the vehicle. In many embodiments, the bulkheads may be manufactured by a variety of methods including stamping, molding, casting, and/or forming both cold and hot. Likewise, the bulkheads may be made from any number of materials including metallic, carbon fiber, composite, etc.

The impact energy can be absorbed in any number of ways and through a variety of components during an impact. Therefore, as has been emphasized throughout, the protection of the passenger compartment is a key element in the safety features of a vehicle. Illustrated in FIGS. 9A and 9B, the rear frame rails have an offset undulation 904 along the length of the rail 900. This can also be true for embodiments of the front portion of the vehicle as shown in FIG. 5. The undulation 904, in accordance with various embodiments, can help to increase the space in the passenger compartment while providing adequate space in the vehicle platform to support addition functional elements. However, the undulation 904 can create a stress point along the length of the frame rails 900 and may require additional stiffness. While traditional vehicles may add thickness to the rails, many embodiments of the platform may incorporate an overlapping reinforcement patch 906. The reinforcement patch can act as a stiffener to the rail 900 in the event of a rear impact. The added stiffness, in many embodiments, can help prevent the rear drive train and other functional components from bending up and into the passenger compartment. Likewise, such patches can help to reduce the buckling seen by the rails in a rear crash. In accordance with many embodiments, the success of a reinforcement patch can be illustrated by FIG. 10. As shown, a small buckling zone or minimized buckling is illustrated in the undulation of the frame after a simulated rear impact. Such reduction in buckling is highly desirable with respect to prevention of damage to the passenger compartment. Many embodiments function to improve impact energy absorption and thus reduce the effect of the impact on the passenger compartment. This helps to ensure a safer vehicle for the passengers. Moreover, although many embodiments exhibit vehicle impact features for the rear of the vehicle, it will be understood that various combinations of such features may be included or omitted as required by the specific vehicle design.

Embodiments Implementing Compartmentalized Energy Storage Systems

Figure 11A:
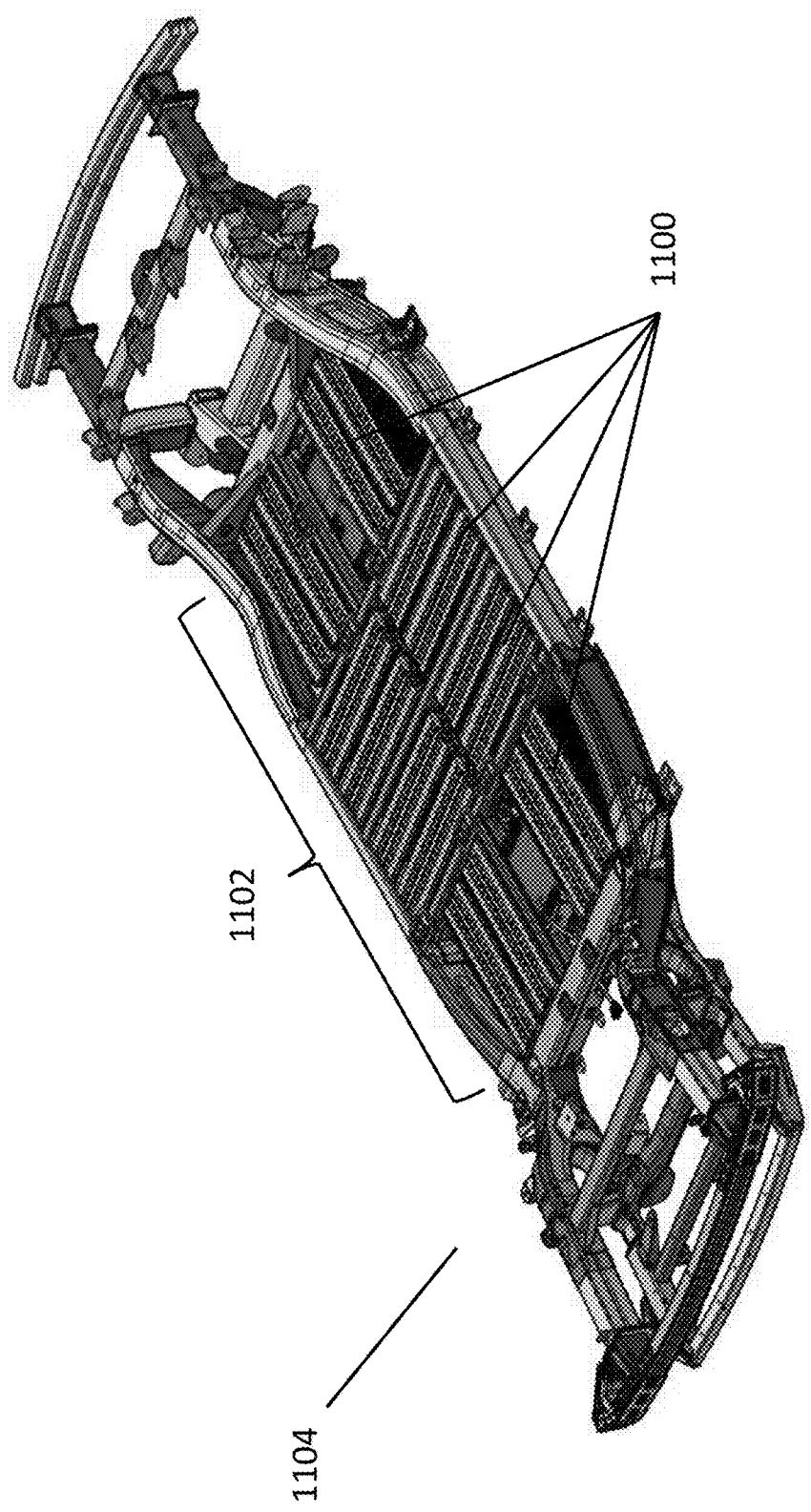
FIGS. 11A and 11B illustrate a vehicle platform portion for housing functional systems in accordance with embodiments of the invention.
Figure 11B:
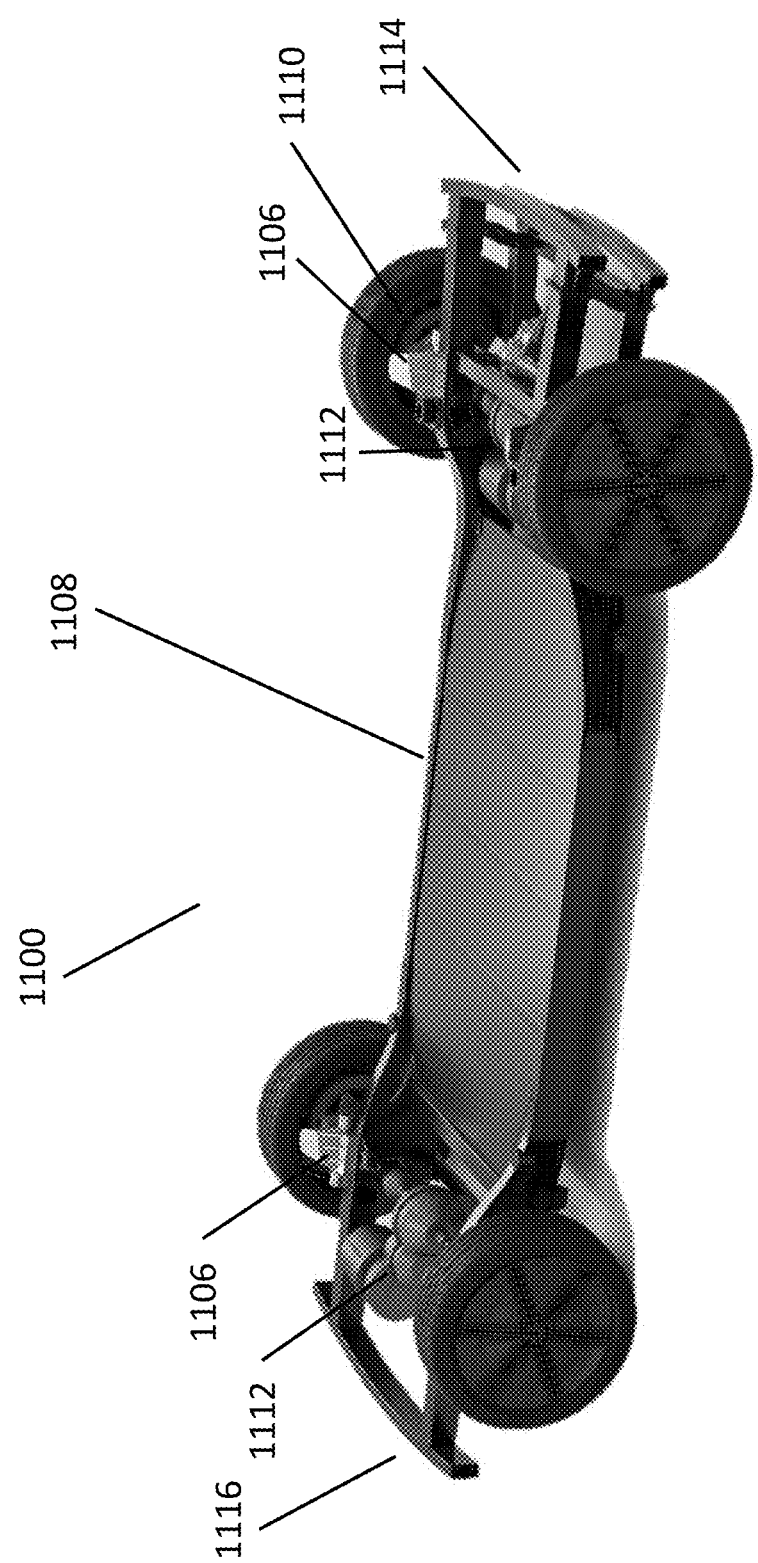

Regardless of the specific arrangement of structural elements and or impact features that may be implemented in the many embodiments of a vehicle platform, the vehicle platform may also provide a rigid structure to support all of the necessary functional systems and components, such as, for example, drive train components, energy storage system, suspension system with wheels (each wheel having a tire), steering system, and braking system are mounted. Again, to achieve a substantially horizontal upper vehicle platform face, many embodiments distribute these functional systems throughout the open spaces of the vehicle platform and configured such components and systems such that they do not extend or protrude substantially higher than the highest point of the vehicle platform frame, as shown in FIGS. 11A and 11B. Substantially higher can be defined as an amount greater than the top of any of the wheels and/or tires of the vehicle. Where the wheel is defined by the size of the rim and wheel hub, and the tire as being disposed around the periphery of the wheel.

Specifically, FIG. 11A illustrates embodiments of an energy storage system 1100 (e.g., a compartmentalized battery pack) disposed within the interior spaces of the mid-body space 1102 of the vehicle platform 1100. FIG. 11B illustrates embodiments of front and rear suspension systems 1106 disposed within the platform plane of the vehicle platform 1100. As implemented, embodiments of suspension systems 1106 allow for the packaging of all functional components within the frame 1108 of the vehicle platform or within the profile of the wheel 1110 of the vehicle body. Similarly, as shown in FIG. 11B all drive train elements including front and rear motors and transmissions 1112 are configured such that they are confined within the raised portions of the platform plane at the front 1114 and rear 1116 of the vehicle platform 1100. Note that although a dual drive train system is shown in the illustrations, embodiments contemplate implementations of vehicle platforms having single (front or rear) drive trains. As previously discussed, such a substantially horizontal upper vehicle platform enables the attached vehicle body to incorporate a passenger area within the body that extends the length of the vehicle platform without the need for sealed off mechanical, electrical, etc. compartments, such as the engine and trunk compartments typically found in internal combustion engines.

Many embodiments of vehicle platforms may implement energy storage systems similar to those illustrated in FIGS. 11A through 12F. Various embodiments may position the energy storage systems within a mid-body interior space 1102 of the vehicle platform frame 1108 as can be seen in FIG. 11A. Such placement, on the mid-point of the vehicle and at the vehicle's lowest point is advantageous for a number of reasons. The energy storage system for most alternative fuel vehicles (whether pure electric or fuel cell) typically comprises a large proportion of the weight of the vehicle. By placing this heavy component mid-vehicle and as close to the ground as possible, the center of gravity of the vehicle is shifted closer to the road. This low center of gravity tends to improve the handling characteristics of the vehicle. However, placing the energy storage system this close to the ground creates potential hazards. In both fuel cell and battery electric vehicles, the energy storage components can combust if they are damaged, either during a collision or through impact resulting from a road hazard, such as penetration of an object into the containment vessel. To address this issue, many electric vehicle manufacturers design energy storage systems as a monolithic pre-sealed unit, which is inserted into and separately sealed within a mid-body interior space of the frame. While this double hull construction does increase the force required to penetrate the battery compartment, and the frame of the energy storage system vessel may serve as a rigid lateral stabilizing element within the large open frame, the drawback is that inclusion of such a vessel into the vehicle adds greatly to the weight of the energy storage system, which ultimately can have a negative impact on vehicle range with minimal improvement to vehicle safety.

Figure 12A:
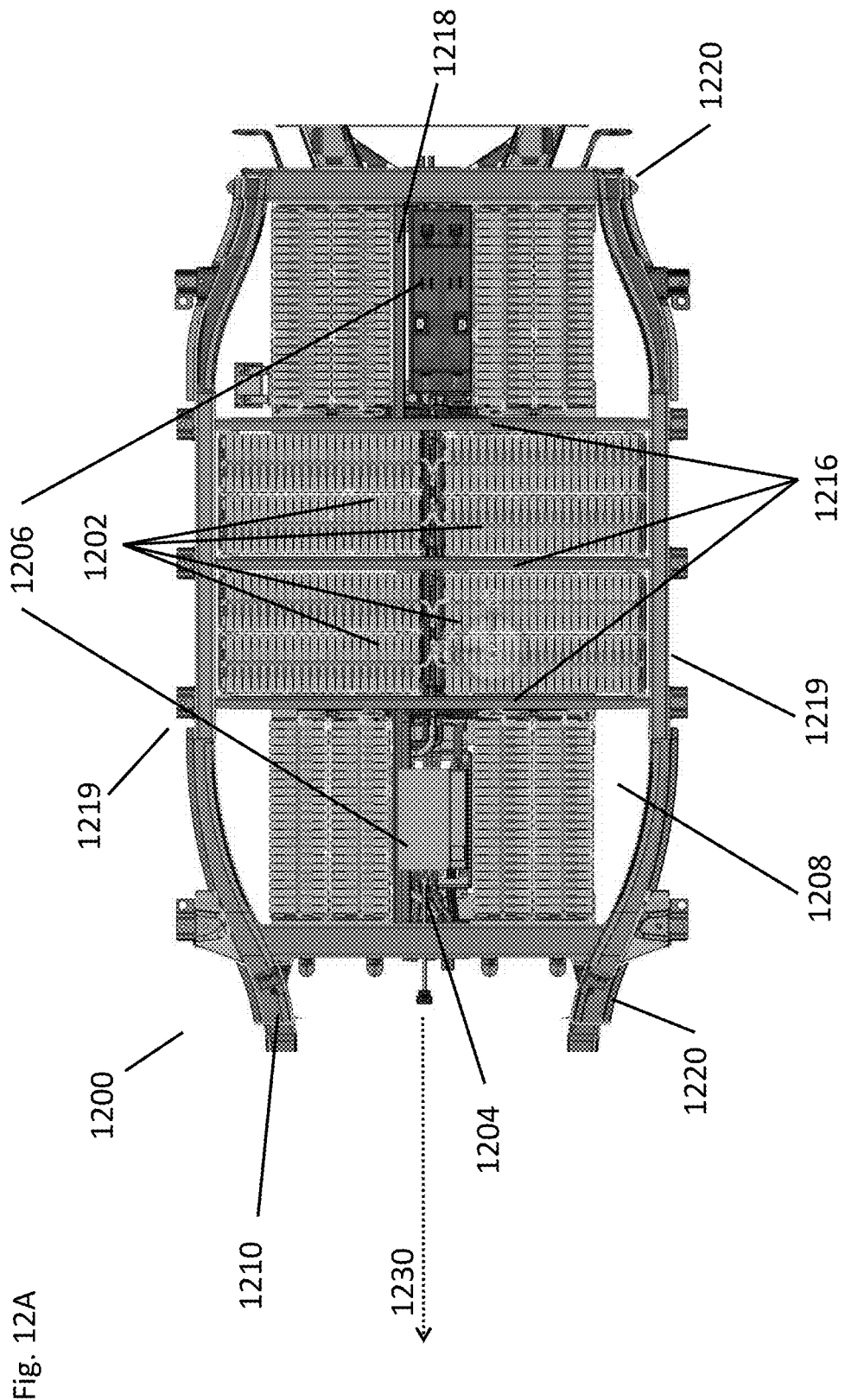
FIG. 12A illustrates a central portion of a vehicle platform frame for housing an energy storage system in accordance with embodiments of the invention.

Energy storage systems in accordance with many embodiments of the vehicle platform are designed with various structural and functional features to aid in the simplicity of design and use, and overall adaptability of the electric vehicle and vehicle platform to a variety of configurations. In various embodiments, as shown in FIG. 12A, the vehicle platform 1200 incorporates a vehicle battery system energy storage system comprised of a number of separate modular vehicle battery elements 1202 interconnected together and with the other elements of the drive train through a suitable configuration of wires and/or buses 1204, and battery support systems 1206 (e.g., cooling, battery disconnects, and power management components). These modular vehicle battery elements 1202 are disposed within the mid-body space 1208 of the vehicle platform frame 1210 such that the structural elements of the frame 1210 and top and bottom (1212/1214 in FIG. 12B) cover plates of the vehicle frame combine to directly form the sealed battery containment vessel for the vehicle battery elements. By using elements of the frame 1210 as the containment vessel for the energy storage system, in accordance with embodiments, substantial weight savings can be realized.

As previously discussed, one of the reasons conventional electric vehicles utilize an energy storage system disposed within a rigid vessel is to provide additional structural stability to the vehicle platform frame, which would otherwise have a large open middle section. Embodiments address the loss of such a rigid vessel body by integrating into the frame 1210 a variety of cross member structural elements, which subdivide the interior space of the mid-body of the vehicle platform into a number of separated interior spaces. It should be noted that cross member structural elements in this context might include both lateral cross members 1216 and longitudinal members 1218. Although certain configurations of structural elements are shown, it should be understood that any number and arrangement of such structural members might be implemented such that sufficient frame stability is created. In addition to conferring additional stability to the vehicle platform, such interior structural members also provide support elements for one or more of the battery elements 1202 and/or support components 1206 disposed within the frame battery compartment, and for vehicle body elements mounted to the vehicle platform, as will be discussed in detail in the sections to follow.

In addition to the internal support members, the vehicle platform may incorporate a variety of other features to aid in ensuring the protection of the energy storage system from external damage as well as serve as structural support for the electric vehicle. For example, some embodiments may incorporate the use of additional impact absorption components arranged on the side rails 1219 of the vehicle frame (e.g., crash cans, not shown) to absorb or redirect the energy resulting from an impact. Front and rear structural members 1220 may also be configured to deform, similar embodiments described above, thus reducing affect damage to the energy storage system during a front and/or rear collision.

Figure 12B:
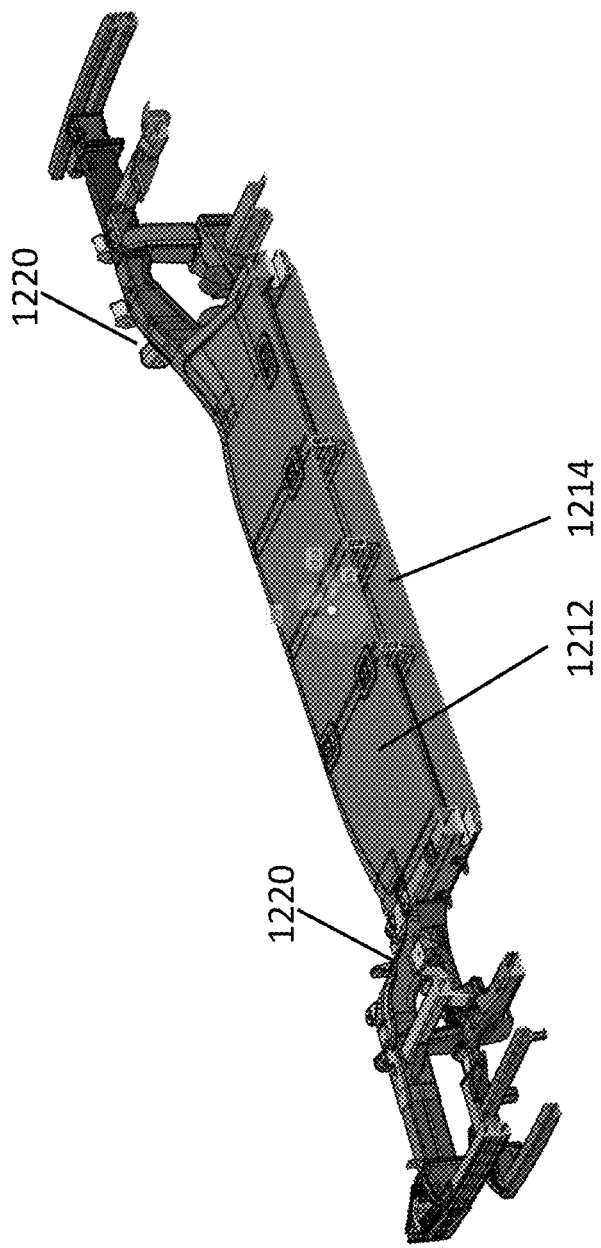
FIG. 12B illustrates a vehicle platform frame structure incorporating a top seal plate in accordance with embodiments of the invention.
Figure 12C:
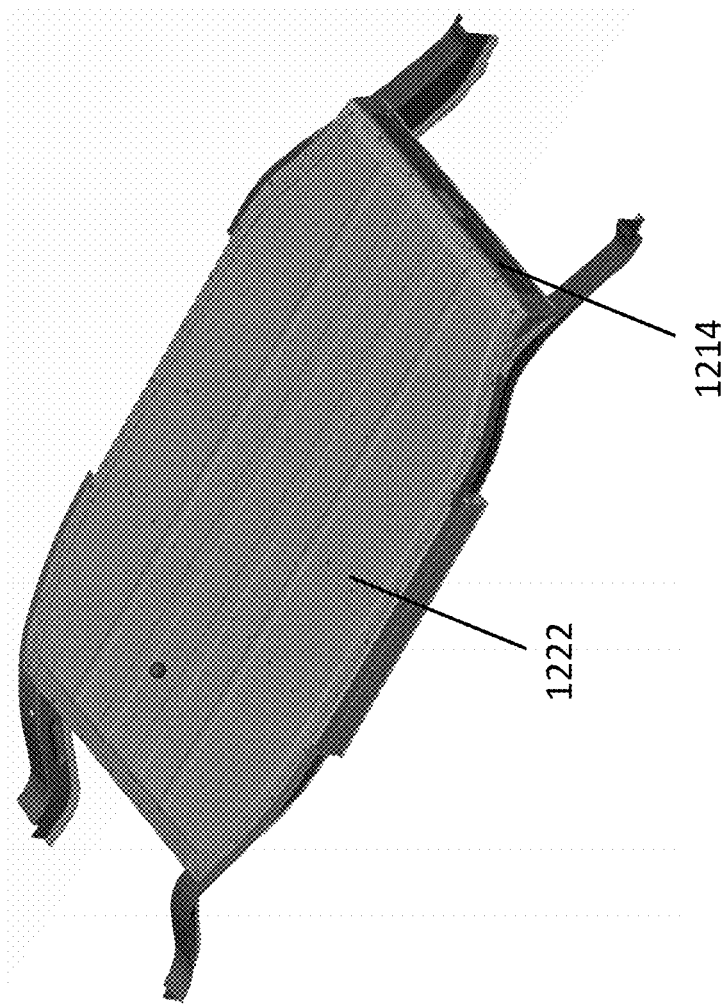
FIG. 12C illustrates a central bottom portion of a vehicle platform frame for housing an energy storage system in accordance with embodiments of the invention.

Additionally, many embodiments may use a bottom cover plate 1214 similar to that illustrated in FIG. 12B to protect the energy storage compartment from objects below the vehicle platform. Some embodiments may incorporate additional safety measures and/or devices to prevent unwanted intrusion into the battery storage compartment. For example, the conventional approach might be to install a bottom cover plate that is sufficiently thick to absorb the energy of an impact completely, however, this solution results in high mass penalties. Accordingly, many embodiments employ a sacrificial shear panel/layer 1222 attached under the energy storage system compartment that is configured to shear off when the bottom cover plate 1214 is impacted, as illustrated in FIG. 12C.

The modularity of the vehicle battery elements in accordance with embodiments confers other advantages over conventional monolithic batteries. Implementations of such modular batteries allows for facile adjustment to their configuration during either manufacture or maintenance. Specifically, the modularity allows energy storage to be adjusted depending on the size and quantity of electric storage required for the function of the vehicle. For example, various embodiments may allow for the creation of different-range versions of vehicles simply by varying the number of battery modules inserted into the energy storage system. Other embodiments may allow additional battery modules to be used with larger top-hat configurations that may require additional energy for adequate functionality. Additionally, the modularity of the energy storage system in many embodiments, allows the ability to replace individual elements that may fail without the need to remove the entire energy storage system thereby reducing the cost of battery replacement throughout the life of the vehicle.

Figure 12D:
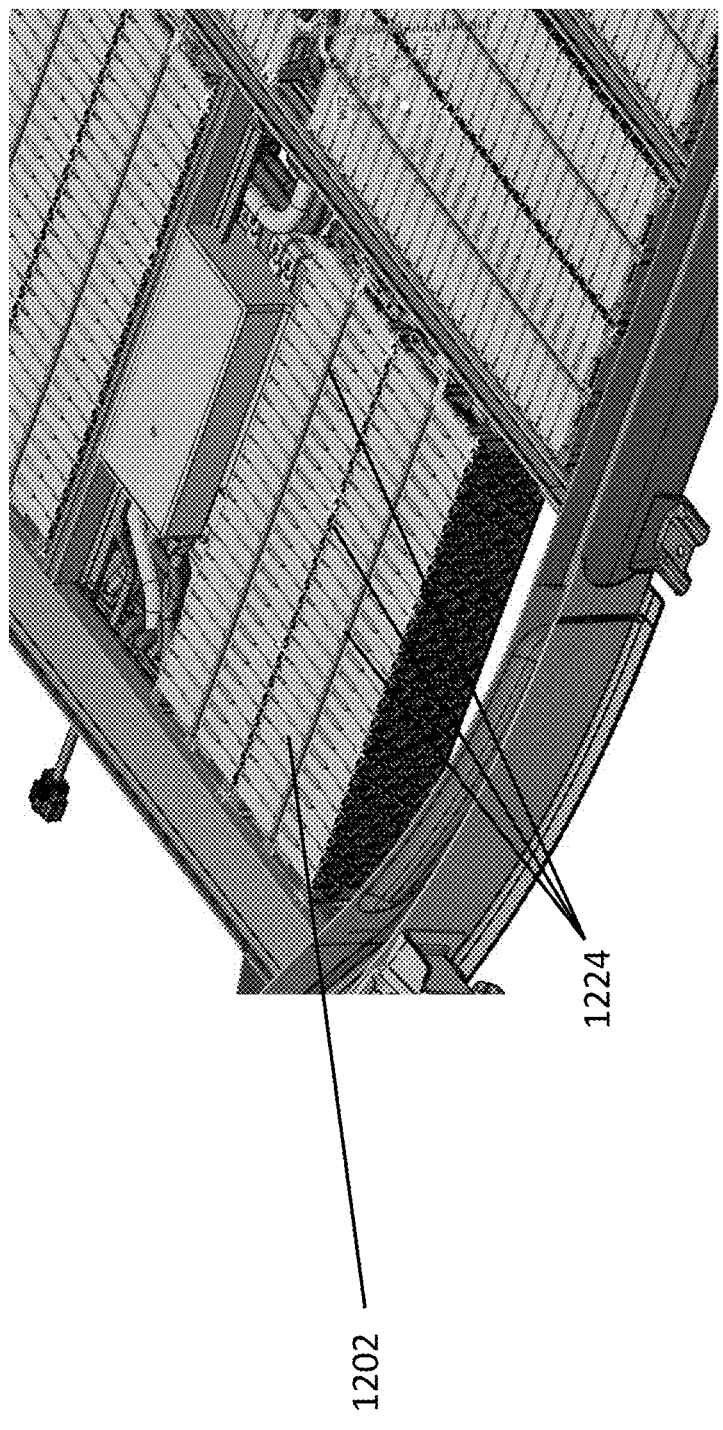
FIGS. 12D and 12E illustrate close-up and cross-sectional views of battery modules in accordance with embodiments of the invention.
Figure 12E:
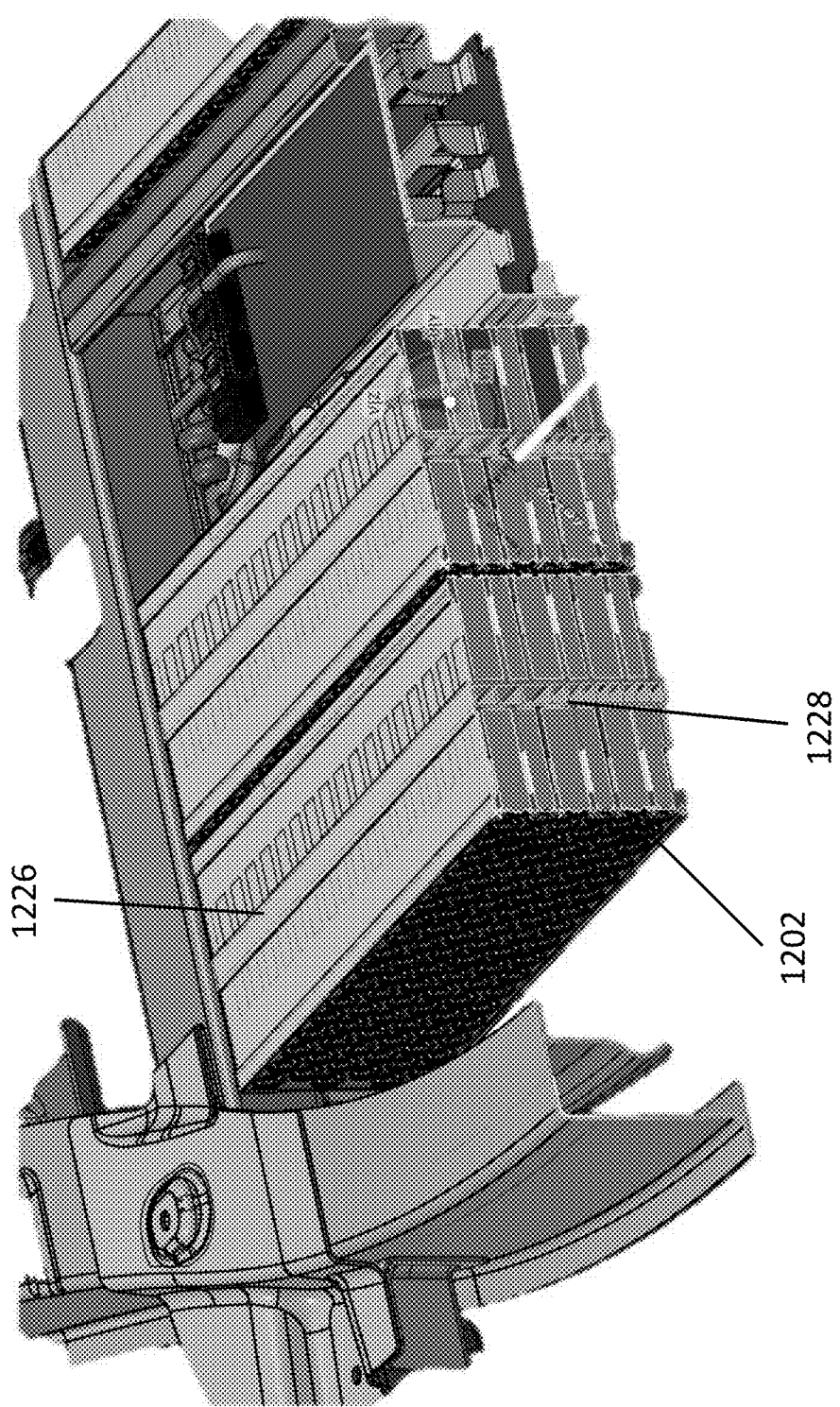

Another advantage of the battery modularity implemented according to embodiments is the ability to orient the individual modular battery components as desired. Accordingly, many embodiments can allow for the improved battery efficiency as well as improved or more efficient packaging of the battery modules within the vehicle platform. As shown in FIGS. 12D and 12E, battery modules 1202, according to many embodiments, can be packaged with one or more integrated cooling elements 1224. While the primary function of the embodiments of the cooling elements is to maintain the temperature of the batteries and serve as a heat transfer tool to transfer and reuse the heat from the battery elements to other systems of the vehicle platform or more broadly vehicle, in various embodiments of the vehicle platform they may serve as a secondary structural component.

Specifically, according to many embodiments, cooling elements 1224 comprise elongated rigid bodies 1226 having a variety of channels and heat plates 1228 disposed therein that may be used to aid in cooling and/or running other heat transfer elements. These heat transfer elements and battery support plates are extremely rigid and typically made from a metal to encourage heat transfer. Accordingly, in various embodiments, as shown for example in FIG. 12A, battery modules 1202 may be oriented in a varying geometry such that these rigid cooling elements 1224 may serve as secondary structural elements. Specifically, as shown in FIG. 12A battery modules in the front and rear of the energy storage system are disposed geometrically parallel to the longitudinal axis 1230 of the vehicle platform such that they serve as structural elements against deformation of the frame 1210 into the energy storage system from potential front or rear impacts. In contrast, battery modules 1202 disposed within the central portion of the energy storage system are disposed geometrically transverse to the longitudinal axis 1230 of the vehicle thus allowing the battery modules to serve as a further lateral structural support for the vehicle platform frame in the case of side impacts. In some embodiments, sufficient additional stability may be provided by arranging such battery modules to allow for the removal of the interior structural frame elements 1216/1218 thus further reducing vehicle weight and increasing the number of battery modules that can be positioned within the vehicle platform frame.

Figure 12F:
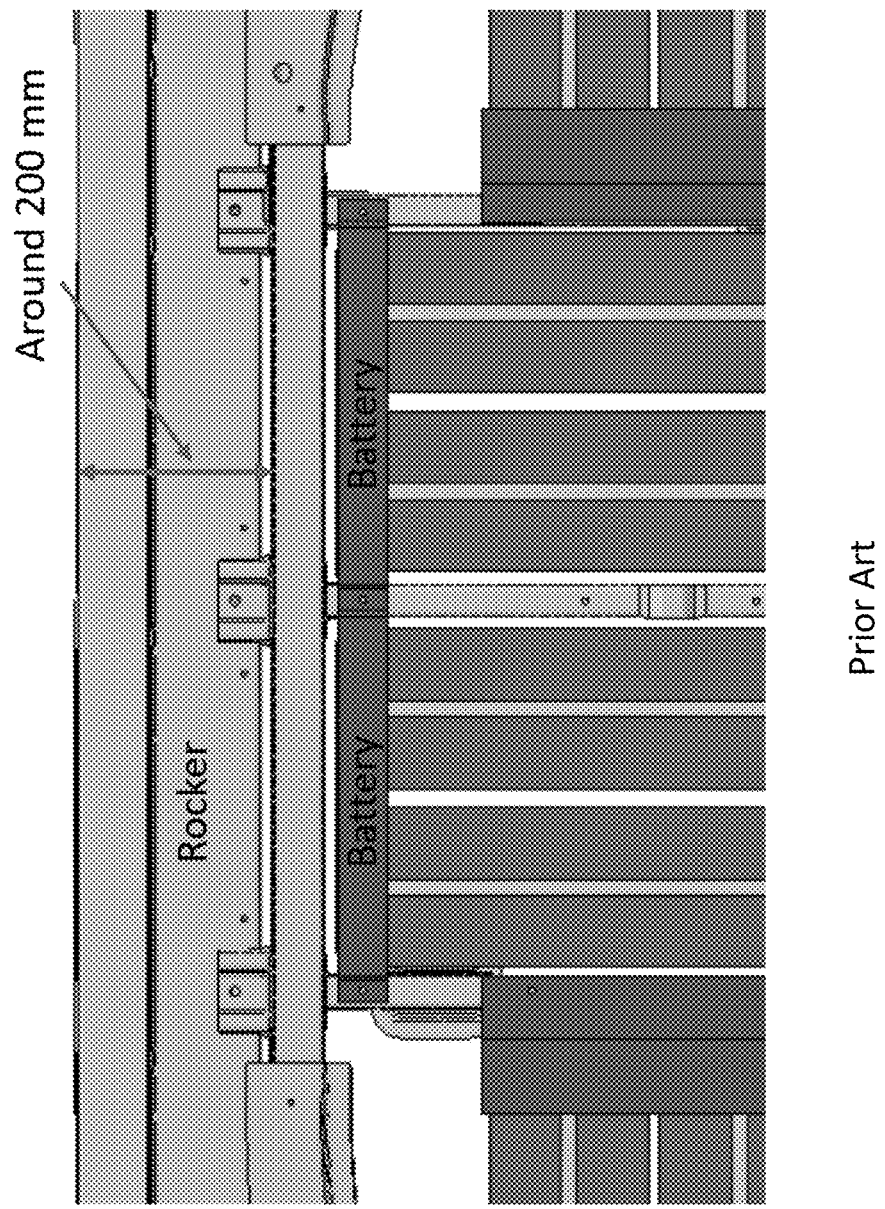
FIG. 12F illustrates a rocker panel enclosing a battery module in accordance with the prior art.

FIG. 12F illustrates a view of a conventional battery compartment and the adjacent framework of a vehicle body. It can be seen that traditionally additional side impact absorption devices are not incorporated. For electric vehicles, protecting the battery in side crash events (especially the pole impact) is challenging given the available crush space. Moreover, having an efficient lightweight solution is even more challenging. For example, many vehicle companies address this by incorporating rockers having very heavy longitudinal beams to absorb the impact energy. These beams are expensive, heavy and produce very high decelerations.

In accordance with many embodiments, a variety of safety features may also be designed to integrate with the vehicle platform on attachment with the vehicle body, such as, for example, side impact energy absorption devices. In such embodiments, the side impact absorption devices may be arranged such that they are between an inner wall of the vehicle body and the outer wall of the vehicle platform frame. Embodiments of the side impact absorption devices are designed to protect the battery compartment from damage in the event of a side impact.

Turning to the construction of the battery elements themselves, battery elements according to the embodiments may consist in a variety of forms (e.g., lead-acid, nickel metal hydride (NiMH), Zebra (hot salt), lithium-ion and lithium polymer), etc. It will be understood that the battery selection can vary based on the desired use of the electric vehicle as well as the potential environmental risks. Moreover, although many embodiments exhibit energy storage systems within embodiments of vehicle platforms i, it will be understood that various combinations of such systems and their structural and functional components may be included or omitted in any number of designs included the many embodiments of vehicle platforms.

Embodiments Implementing Vehicle Body Couplings

Figure 13A:
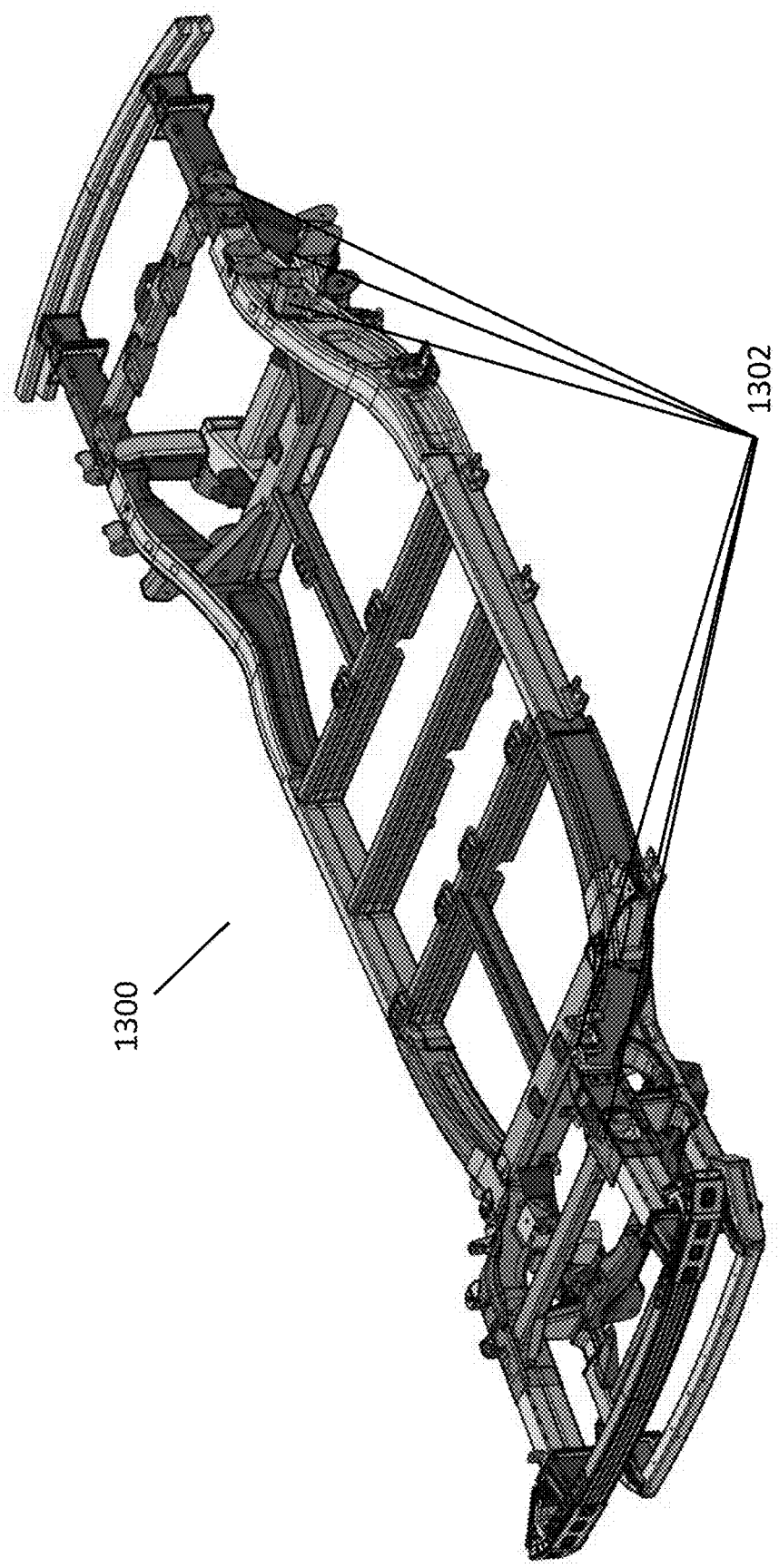
FIG. 13A illustrates a vehicle platform frame structure in accordance with embodiments of the invention.
Figure 13B:
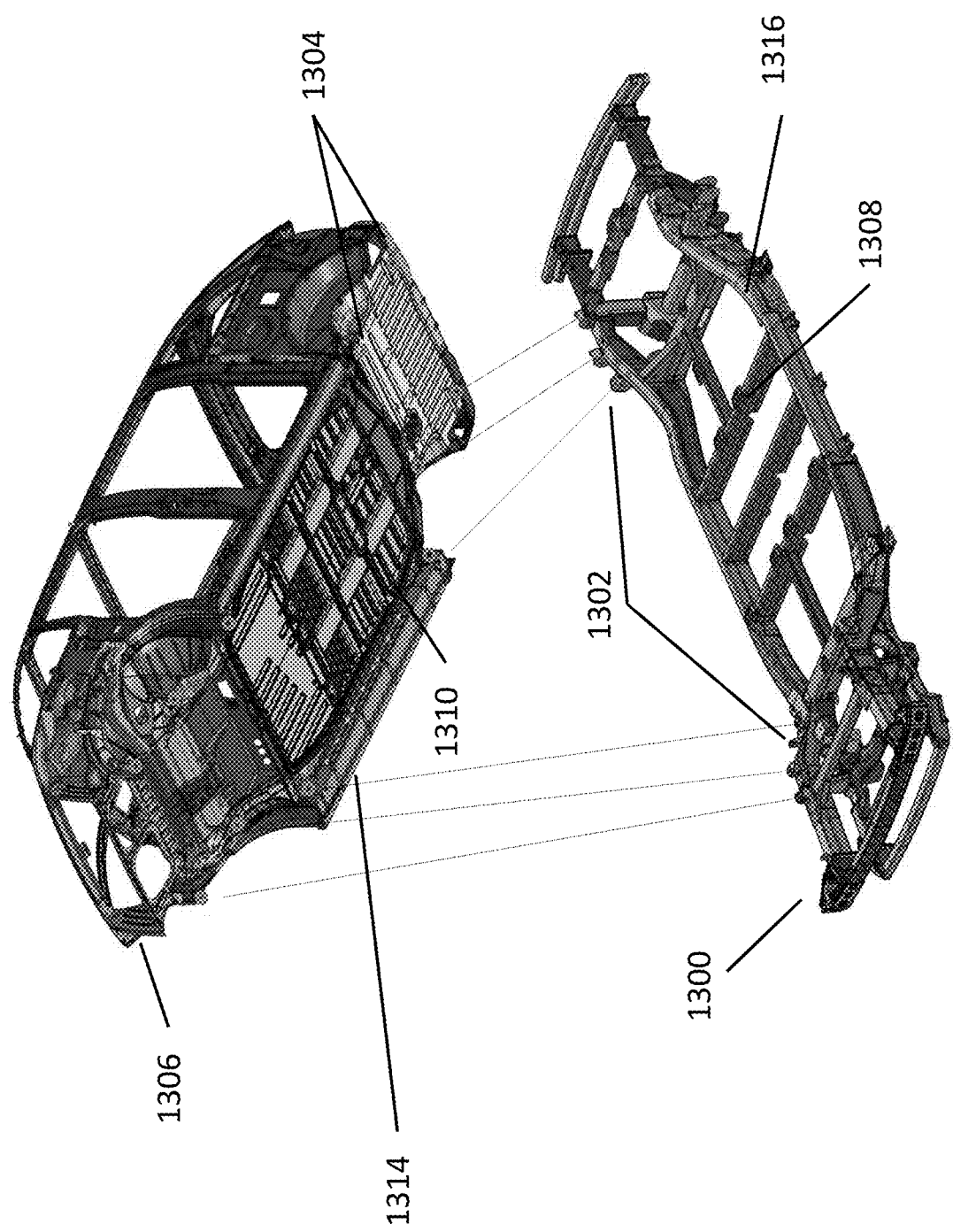
FIG. 13B illustrates vehicle platform attachment points on both vehicle platform and vehicle bodies in accordance with embodiments of the invention.
Figure 13D:
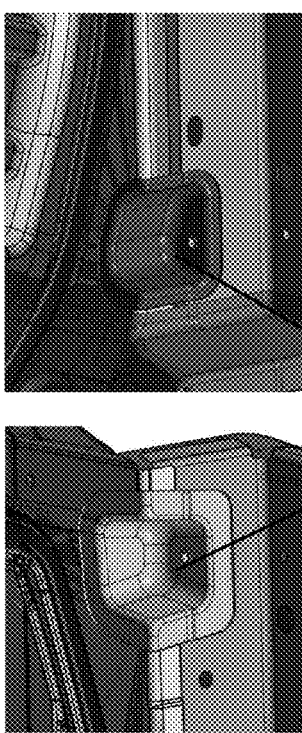
FIGS. 13C and 13D illustrate vehicle body coupling elements in accordance with embodiments of the invention.
Figure 13C:

In embodiments, the vehicle frame may be further configured to support an attached body, as shown in FIGS. 13A and 13B. Embodiments of a vehicle body may be soft or hard mounted to the vehicle platform frame 1300 through a plurality of interconnective load-bearing couplings 1302 as shown in FIG. 13B. As shown in FIG. 13B, the vehicle frame couplings 1302 are cooperative with couplings 1304 on a vehicle body 1306 and together function to physically interconnect the vehicle body to the vehicle platform. Embodiments of suitable couplings may take any form, including, for example, releasable couplings such as bolts, screws, latches, etc., and non-releasable couplings such as weld flanges or riveting surfaces. In various embodiments, the couplings comprise cooperative brackets with associated boltholes. FIGS. 13C and 13D illustrate various embodiments of vehicle body coupling hardware. As shown, couplings may consist of one or more bracket designs 1308 configured to complementarily engage corresponding couplings on the vehicle platform. In other embodiments, the coupling may also incorporate one or more coupling caps 1312 to cover the associated attachment brackets.

Referring again to the discussion of FIGS. 11A and 11B, above, the functional systems and components (e.g., drive train, energy storage, steering, braking system, etc.) are configured and positioned within the frame of the vehicle platform to minimize the overall vertical height of the vehicle platform and to maintain a substantially horizontal upper vehicle platform face (e.g., a face that follows the contours of the upwardly facing contours of the vehicle platform frame and the functional systems and components disposed therein). As shown in FIGS. 13A and 13B, vehicle bodies, according to embodiments have a corresponding lower body face 1314 that is configured to substantially follow the exposed contours of the upward facing vehicle platform contour 1316.

Although not shown, it will be understood that embodiments of vehicle platforms and matable vehicle bodies also include complementary functional connectors (e.g., mechanical, electrical, fluid, etc.) necessary to allow for the control and functioning of the various systems and components of the vehicle platform. Such connectors, according to various embodiments, are configured to disconnect between the base or platform and the vehicle body. In other words, the connections for things such as braking and steering may be mechanically disconnected between the two vehicle components. In various embodiments one or more electrical connectors may function as power connectors (e.g., to transmit power between the vehicle platform and the vehicle body) and signal conduits (e.g., to transmit control or informational signals between functional systems in the vehicle platform and the vehicle body). Embodiments of such electrical connectors may include any device suitable to connect one or more electrical wires with other electrical wires. In various embodiments, one or more fluid connectors or vents may be disposed between the vehicle platform and the vehicle body to allow the flow of liquids or gases therebetween. Many embodiments may also include one or linkages that are more mechanical configured to transmit physical controls between vehicle platform and vehicle body. In many embodiments, the vehicle body and platform are configured such that no mechanical control linkages are used. In certain embodiments, "control-by-wire" connections can be utilized (e.g., steer-by-wire, brake-by-wire, etc.), further reducing or eliminating the need for mechanical control linkages. A by-wire system is characterized by control signal transmission, and includes systems configured to receive and respond to control signals in electronic form via a control signal between the vehicle platform and vehicle body. Many suitable by-wire systems, as will be known in the art may be used with such embodiments.

Figure 14A:
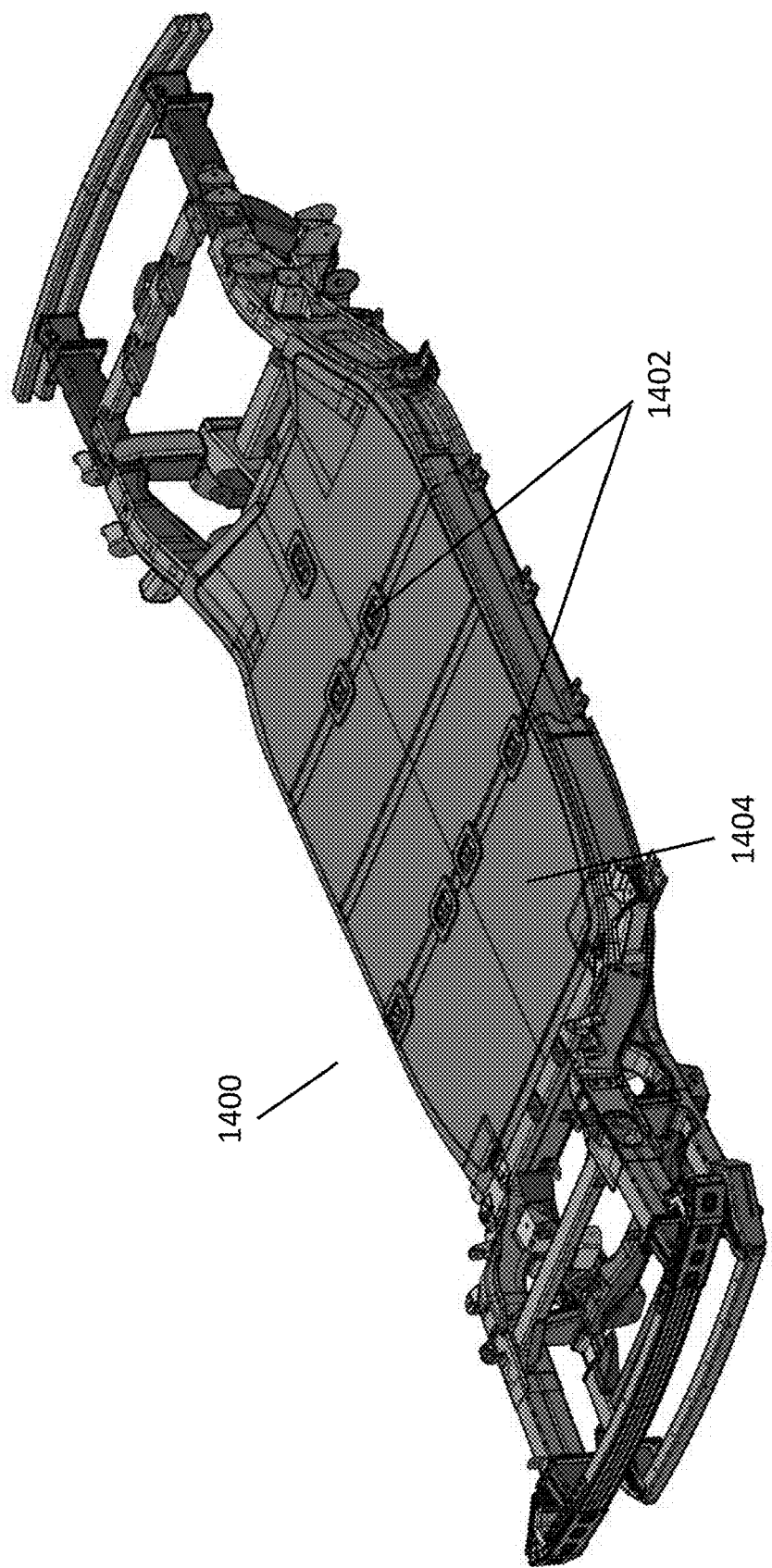
FIG. 14A illustrates a vehicle platform incorporating attachment points in accordance with embodiments of the invention.
Figure 14B:
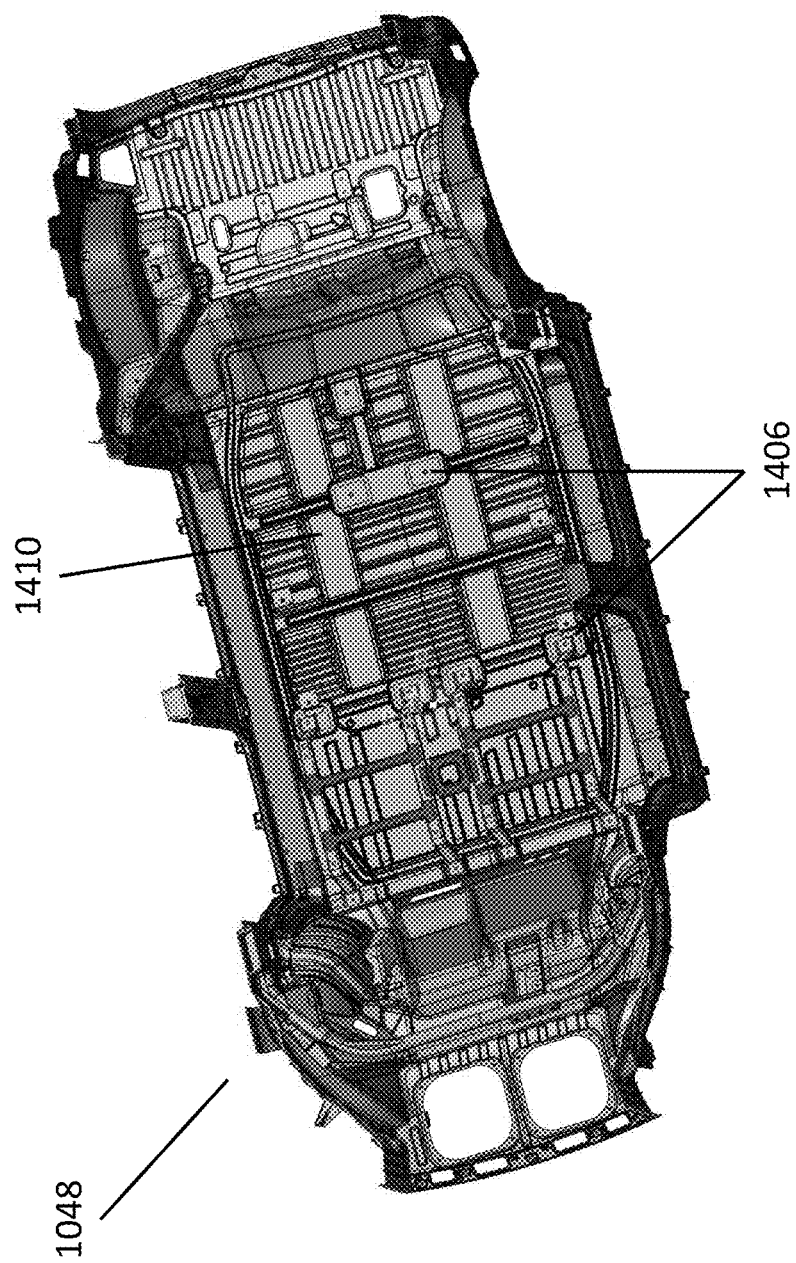
FIG. 14B illustrates a vehicle body incorporating attachment points in accordance with embodiments of the invention.

In various embodiments, in addition to the platform/body couplings and any necessary functional system couplings, embodiments implement anchor points for interconnecting elements within the vehicle body (e.g., passenger seats or other interior elements) directly onto the upper face of the vehicle platform frame. Embodiments of such interconnections are illustrated in FIGS. 14A and 14B. As shown, in various embodiments the vehicle platform frame 1400 can incorporate attachment points 1402 disposed on underlying structural member. In various embodiments these attachment points pass through openings formed in the top cover plate 1404 of the vehicle platform frame such that they may cooperatively engage elements located within the vehicle body. In such embodiments, either the top cover plate 1404 of the vehicle platform also serves as the floor or bottom of the vehicle body, or where the vehicle body has a separate floor, as shown in FIG. 14B cooperative attachment points 1406 are disposed on the vehicle body 1408 that pass through the bottom floor 1410 of the vehicle body to allow for direct engagement of elements (e.g., seats, consoles, etc.) within the vehicle body interior to the vehicle platform. The attachment point itself can take any form suitable to provide a secure mounting point for vehicle body element, including, for example, brackets with associated bolt holes, weld flanges, rivet plates, etc.

Although such embodiments allow for a simplified and universally adaptable vehicle platform that can greatly reduce the weight and complexity of the vehicle body by integrating such attachment points within the vehicle platform itself, the attachment points must be specially engineered to prevent potentially hazardous conditions. Referring back to the discussion of the energy storage system (see, e.g., FIGS. 12A to 12F), as discussed, the compartment containing the energy storage system generally should be sealed from the external environment. Conventional electric vehicle designs address this issue by using an independently sealed battery vessel that provides a layer of protection regardless of what components may penetrate into the interior space of the frame into which the vessel is disposed. However, many embodiments of the present invention are configured such that the structural elements and top and bottom cover plates of the frame operate as the sole vessel for sealing the energy storage system from the external environment. Accordingly, having attachment points that penetrate through the top cover plate into this energy storage system compartment can be problematic. As will be discussed in relation to FIGS. 15A and 15B, many embodiments incorporate frame attachment points 1500 that also serve as sealing elements.

Figure 15A:
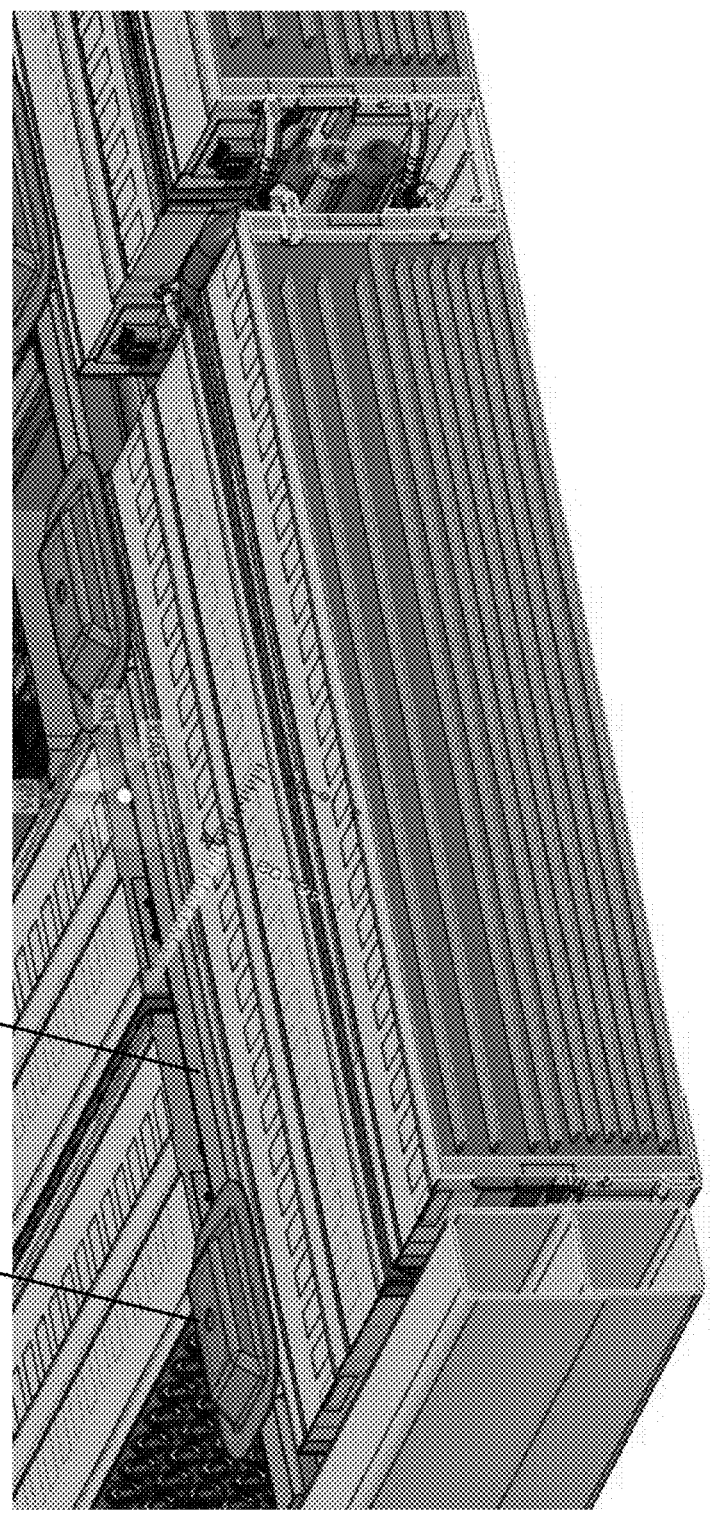
FIGS. 15A through 15D illustrate attachment point elements in accordance with embodiments.

As shown in FIG. 15A, various embodiments of attachment points 1500 are configured to be attached to an underlying structural support 1502 of the vehicle frame. As previously shown in FIG. 14A, these attachment points then extend upward through cooperative holes disposed in the top cover plate 1404 of the frame. To prevent exposure of the energy storage system compartment to the environment through these holes, the attachment point is configured such that the combination of the top cover plate and the attachment points seal the energy storage system compartment.

Figure 15B:
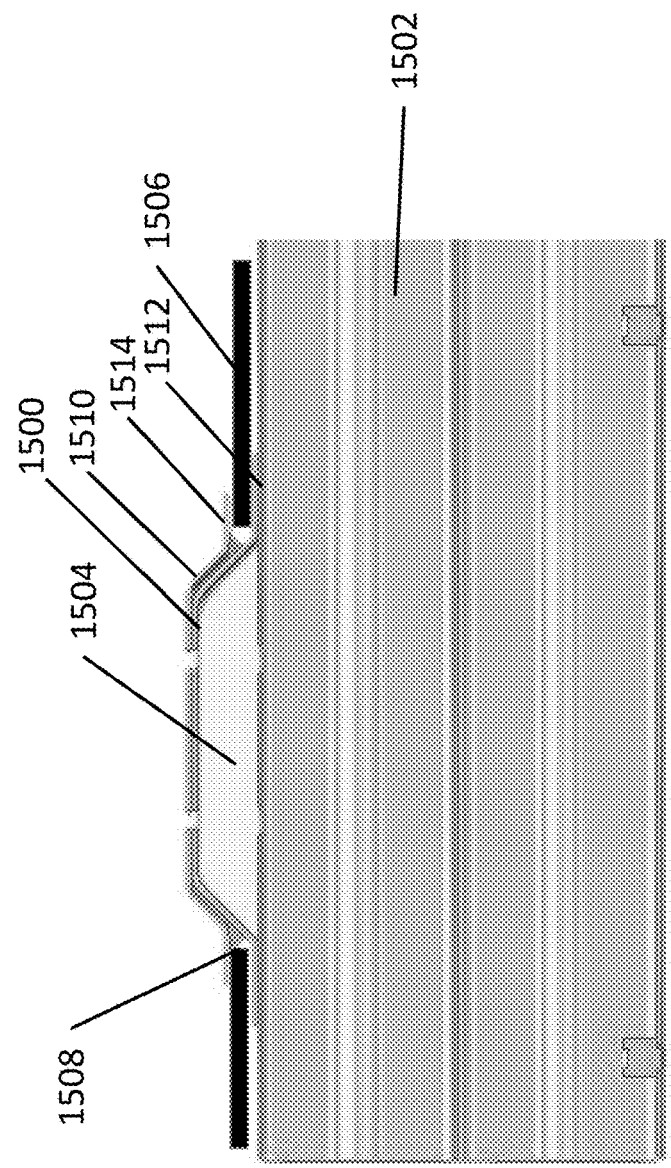

FIG. 15B illustrates an embodiment of a sealable attachment point in accordance with many embodiments. As shown, in various embodiments an attachment point 1500 is interconnected with the structural member 1502 of the vehicle frame and extends upward through a hole 1504 in the top cover plate 1506 of the frame such that the perimeter edges 1508 of the top cover plate are disposed adjacent to the sides of the attachment point. Once the elements of the vehicle platform are disposed in this configuration, a sealing cap 1510 configured to cooperatively engage the outer contour of the attachment point 1500 is disposed such that the sealing cap covers the attachment point 1500 and overlaps the perimeter edges 1508 of the top cover plate 1506. When thus fixed into position, the layering of attachment point, top cover plate and sealing cap function to seal the energy storage compartment form the environment. It will be understood that embodiments of the attachment point and sealing cap may have integrated flanges (1512 and 1514, respectively) that run circumferentially around the entirety elements and serve to fix and seal the perimeter edges 1508 of the cover plate hole 1504. The seal cap 1510, in accordance with various embodiments may be a single element that is bonded separately to the attachment point. Any number of methods including welding or using of an additional bonding material may be used to achieve the bonding. In some embodiments, the seal cap may be co-formed with the attachment point and top cover plate such that they are one piece secured to the structural supports of the frame.

Figure 15C:
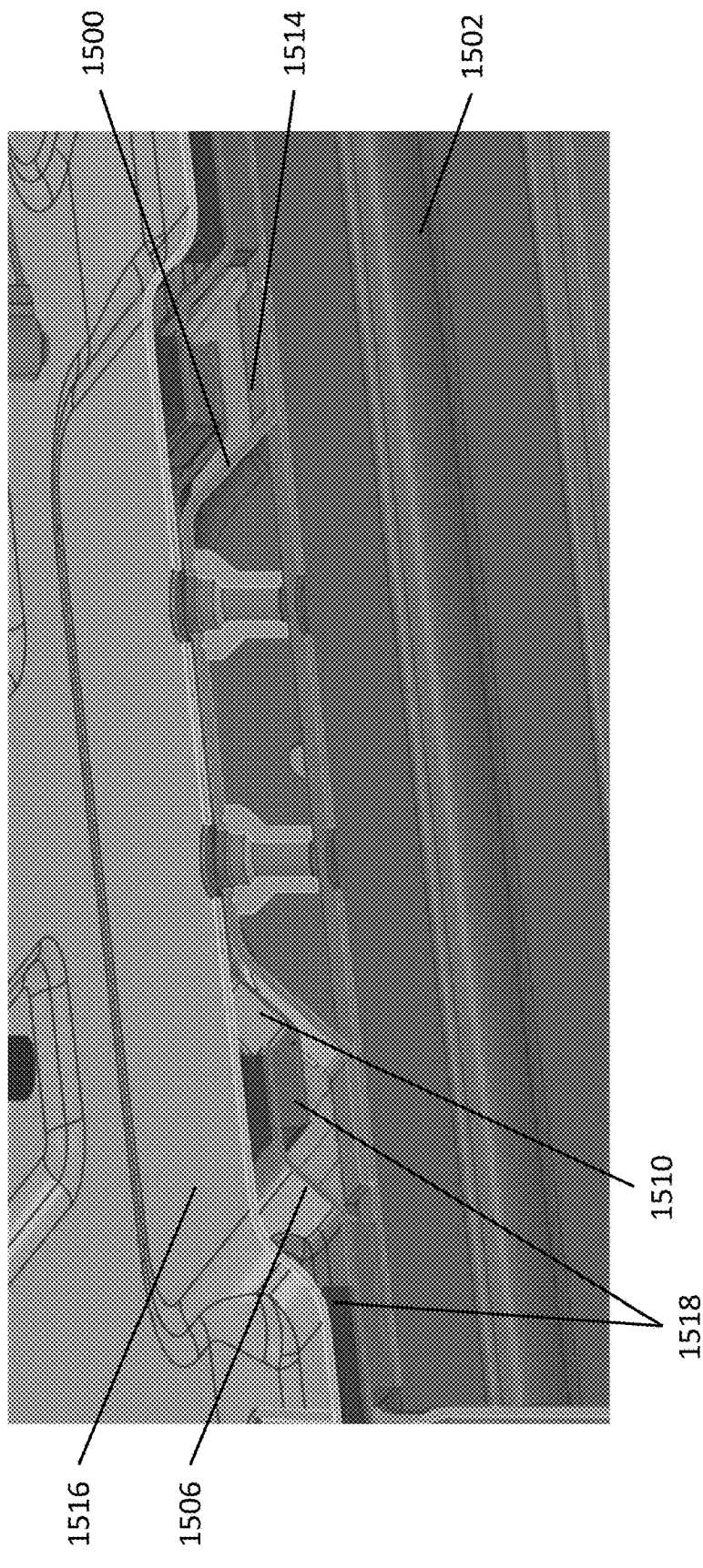
Figure 15D:
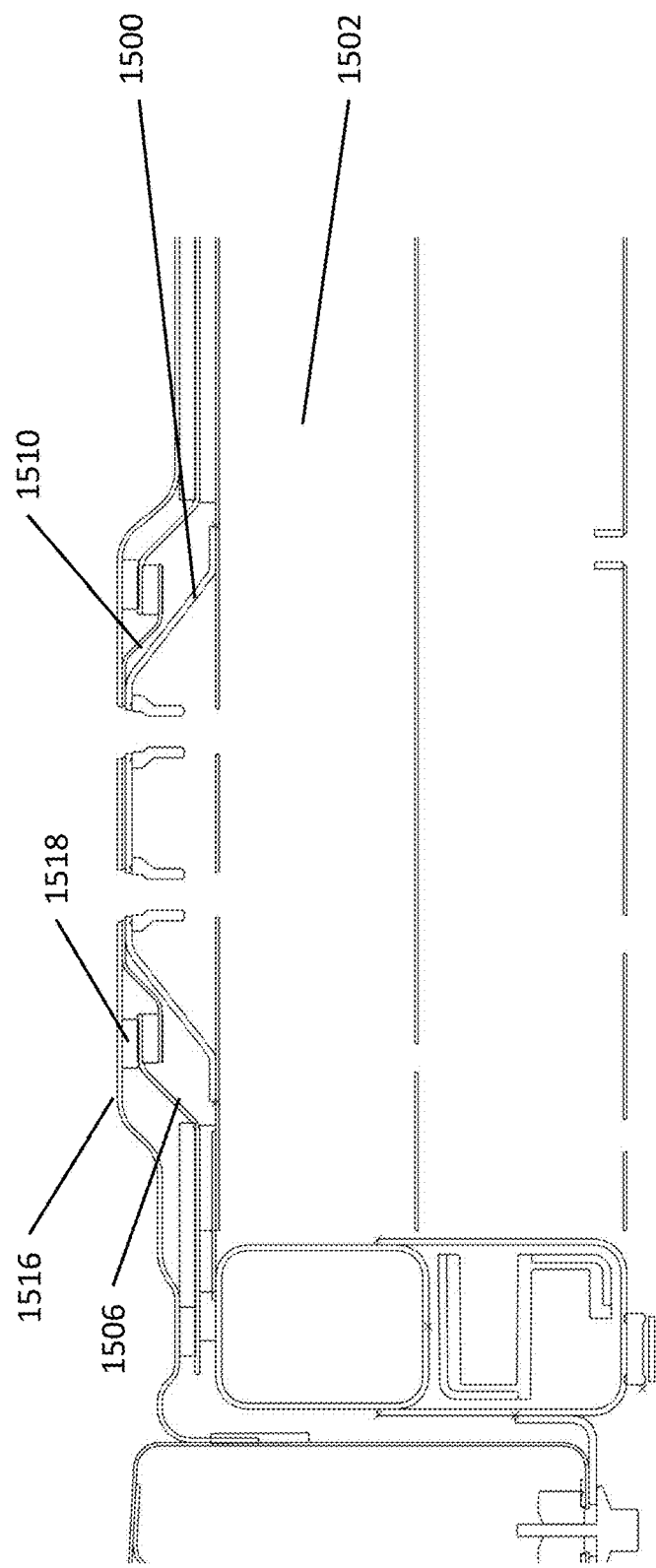

Turning now to FIGS. 15C and 15D, in some embodiments, the top plate 1506 may overlap the flanges 1514 of the sealing cap 1510. In other words, some embodiments may place the sealing cap 1510 over the attachment point 1500 before the top plate 1506 is positioned. Therefore, some embodiments enable the top plate 1506 to be a sealing plate that seals the battery compartment as well as the attachment points, thus preventing undesirable exposure to the battery compartment. This can be true for many embodiments to prevent exposure to the battery compartment during the removal and/or installation of the top hat component. Since many embodiments may be configured to adapt to one or more top hat configurations, it is reasonable to assume that any type of exchange of top hat or even simple maintenance would create potential exposure to the battery compartment. Therefore, many embodiments may employ one or more of the aforementioned attachment/sealing techniques to allow for useable attachment points and still maintain a sealed battery compartment. Additionally, many embodiments can add further sealing or protection when a bottom or floor of the body 1516 is placed on top of the vehicle framework. In many embodiments additional sealing elements 1518 may be used to seal the seams in and around the attachment points 1500. The sealing elements 1518 can be any number of materials such as adhesives or foams that provide a seal between different components.

Regardless of the number and type of connections to the vehicle body, it will be understood that in accordance with many embodiments the complementary connection components are configured to align with each other during manufacture without positional modification. In various embodiments some or all interconnections (e.g., mechanical, structural, electrical, etc.) may be movable such that slight misalignment of elements may be corrected. In addition, as the vehicle platform according to embodiments is configured to be used with multiple vehicle bodies, it will be understood that one or both the vehicle platform or vehicle body may have redundant or unused couplings or attachment points. Moreover, although many embodiments exhibit connection points for vehicle platforms and associated vehicle bodies, it will be understood that various combinations of vehicle connection points can be used in any number of vehicle platform designs and or any number of designs used to join multiple components.

Embodiments of the Suspension System

Figure 16B:
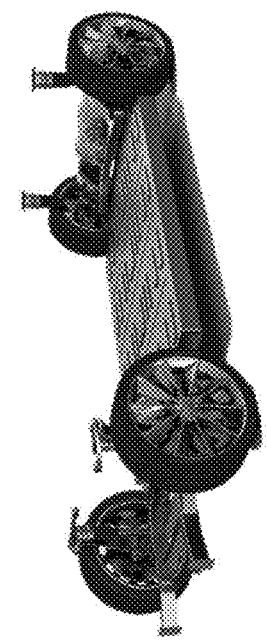
FIGS. 16A and 16B illustrate vehicle platforms in accordance with the prior art.

The suspension system of a vehicle can be a crucial to the overall function of the vehicle. Poor suspension systems can result in damage to other structures and features while properly tuned suspension systems can ensure the longevity of a vehicle. Electric vehicle manufacturers have approached how to package suspension systems with alternative fuel vehicles in a number of ways. Most rely on conventional suspension systems implementing struts, coils springs or bushings. The downside to these suspension designs is that they are difficult to package within the frame of the vehicle's underlying platform, as shown in the images of vehicle platforms from Volkswagen (FIG. 16A) and Tesla (FIG. 16B). Many embodiments of vehicle platforms according to the current disclosure increase the challenges in suspension design by implementing a hard mounted vehicle body atop the vehicle platform. While such hard mounting does remove the need for introducing bulk bushings between the vehicle platform and vehicle body (which would necessitate intrusion of such elements into the interior space of the vehicle body), the tradeoff is that the suspension is placed under enormous demands to address both ride and roll issues introduced by such a body/chassis interconnection.

Suspension systems in accordance with embodiments of vehicle platforms are configured to allow for packaging within the confines of the vehicle platform with a minimum of complexity. In accordance with various embodiments, the suspension systems of the skateboard structure may take on a variety of forms including independent suspension systems for each of the wheels or dependent or semi-independent suspension systems that operate collectively between two wheels in either the front or the rear of the vehicle. Many such embodiments implement a double wishbone independent suspension that incorporates a transverse mounted leaf spring that serves both as ride spring and anti-roll spring to avoid the need for additional coil springs or struts that would extend above the plane of the vehicle platform, and in some embodiments may eliminate the need for an additional anti-roll bar.

Figure 17A:
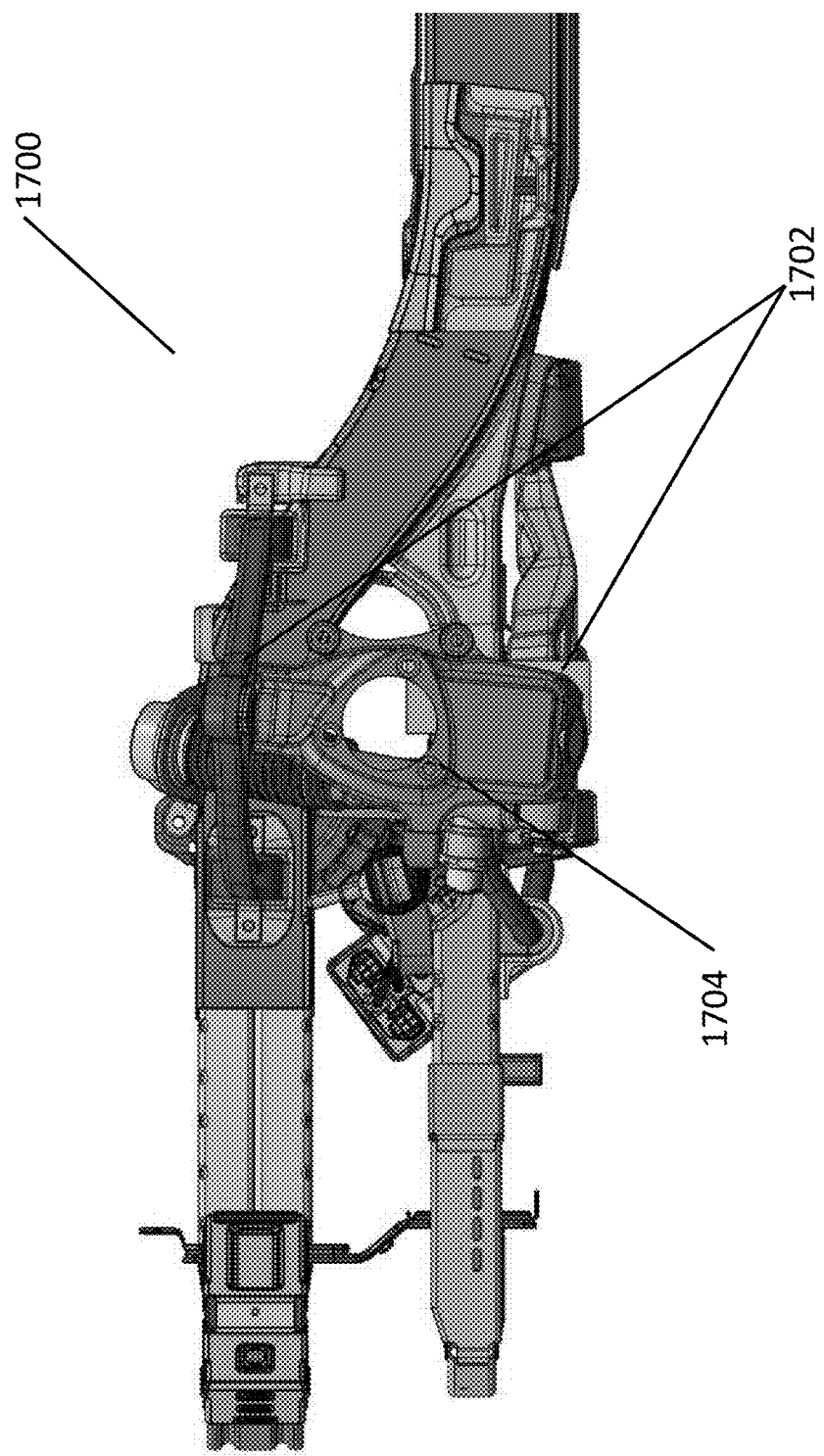
FIGS. 17A to 17G illustrate a vehicle platform front suspension system with a support arm structure in accordance with embodiments of the invention.
Figure 17B:
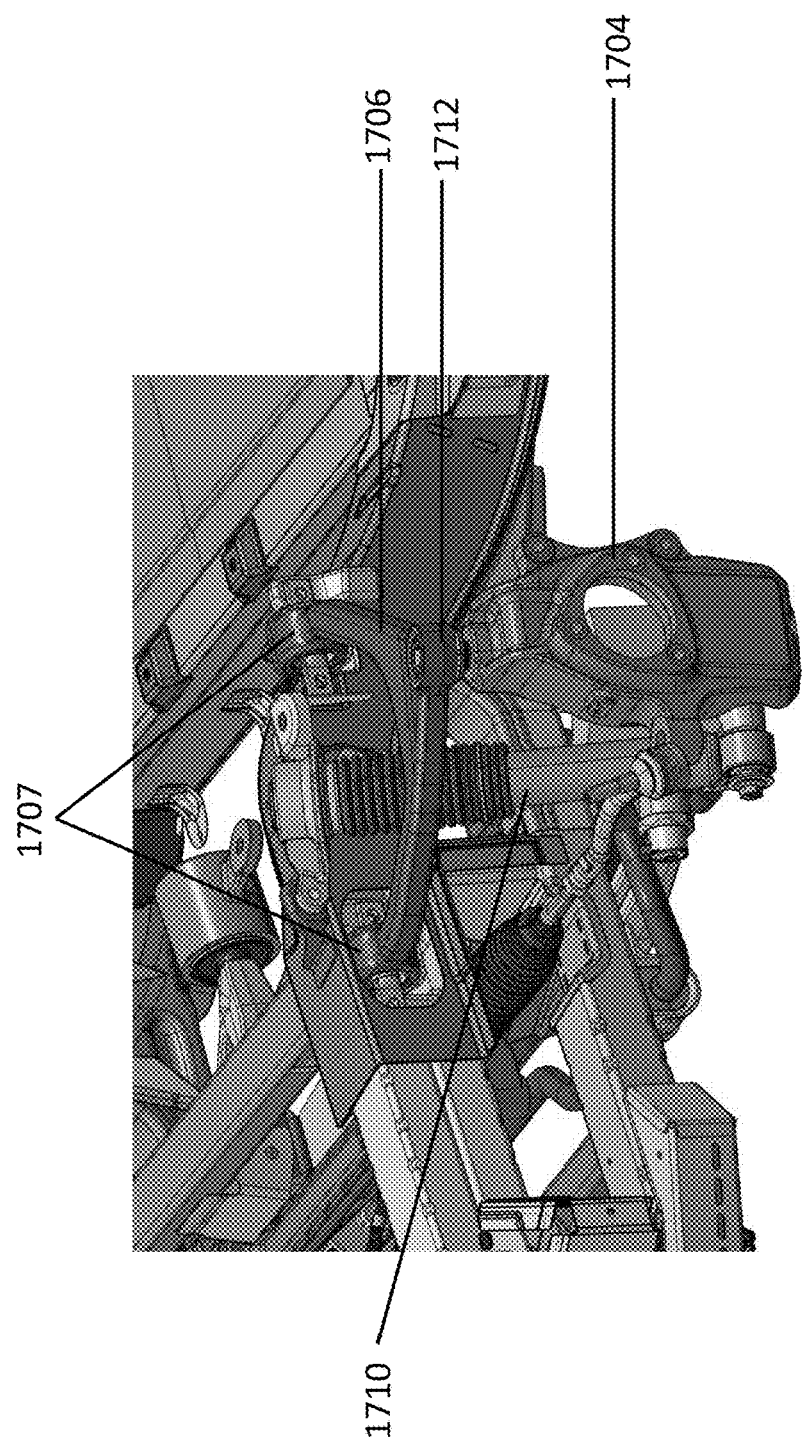
Figure 17C:
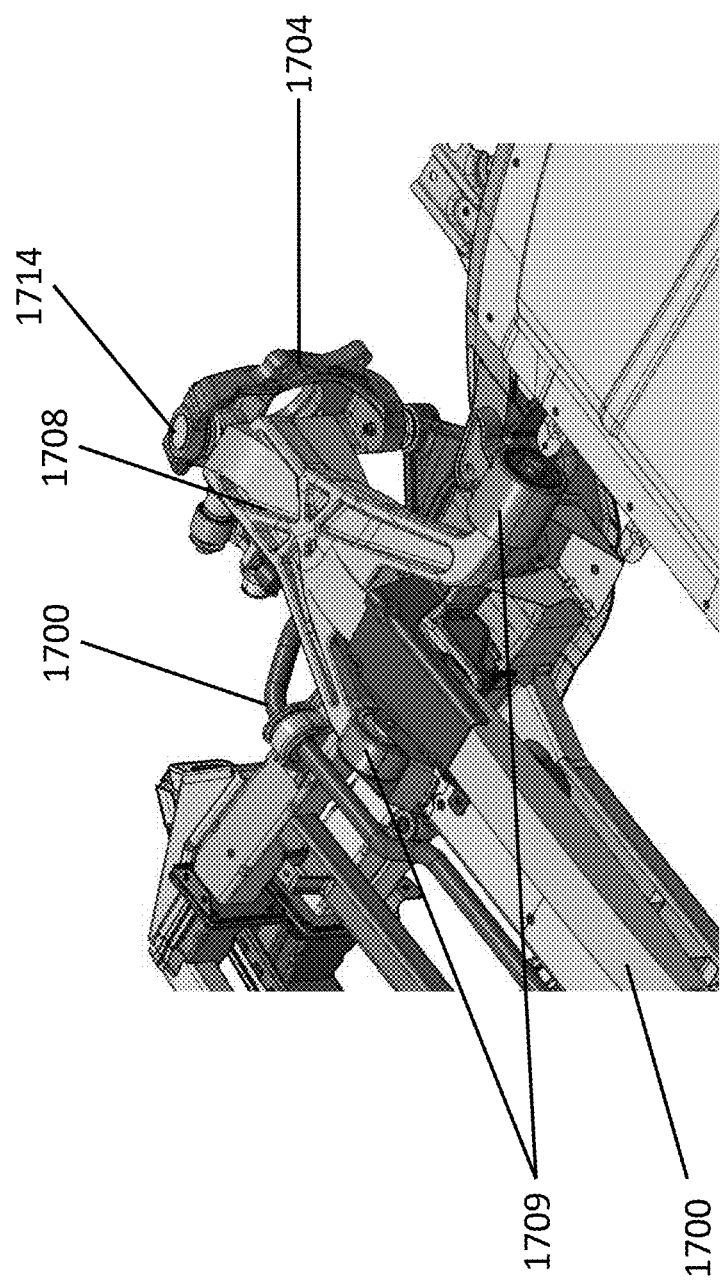

FIGS. 17A to 17C illustrate certain embodiments of such suspension systems. As shown, in various embodiments a front suspension control arm system of the vehicle platform 1700 comprises a double wishbone structure 1702 disposed around the wheel mount 1704. The double wishbone structure (as seen in FIG. 17B) generally comprises an upper wishbone support arm 1706 and a lower wishbone support arm (element 1708 in FIG. 17C) and a damper 1710 mounted between the two wishbones. As will be understood, the two wishbone arms 1706/1708 are secured and pivotably connected at one end to the platform frame 1700 through pairs of pivot connections 1707 (upper) and 1709 (lower) that allow relative vertical movement of the wishbone arms with respect to the frame. The wishbone arms are then further rotationally connected to the steering knuckle or wheel mount 1704 through rotational connectors 1712 and 1714 (upper and lower respectively) such that the steering knuckle may be rotated relative by suitable control elements to steer the vehicle. By combining these joints, the wheels may move independently of each other and provide guidance to the vehicle. In embodiments, at least one damper 1710 per wheel is disposed securely between the lower wishbone arm 1708 and the frame 1700 such that vertical movement of the steering knuckle is dampened to reduce road shock and vibration being transmitted through the wishbone arms to the vehicle.

Figure 17D:
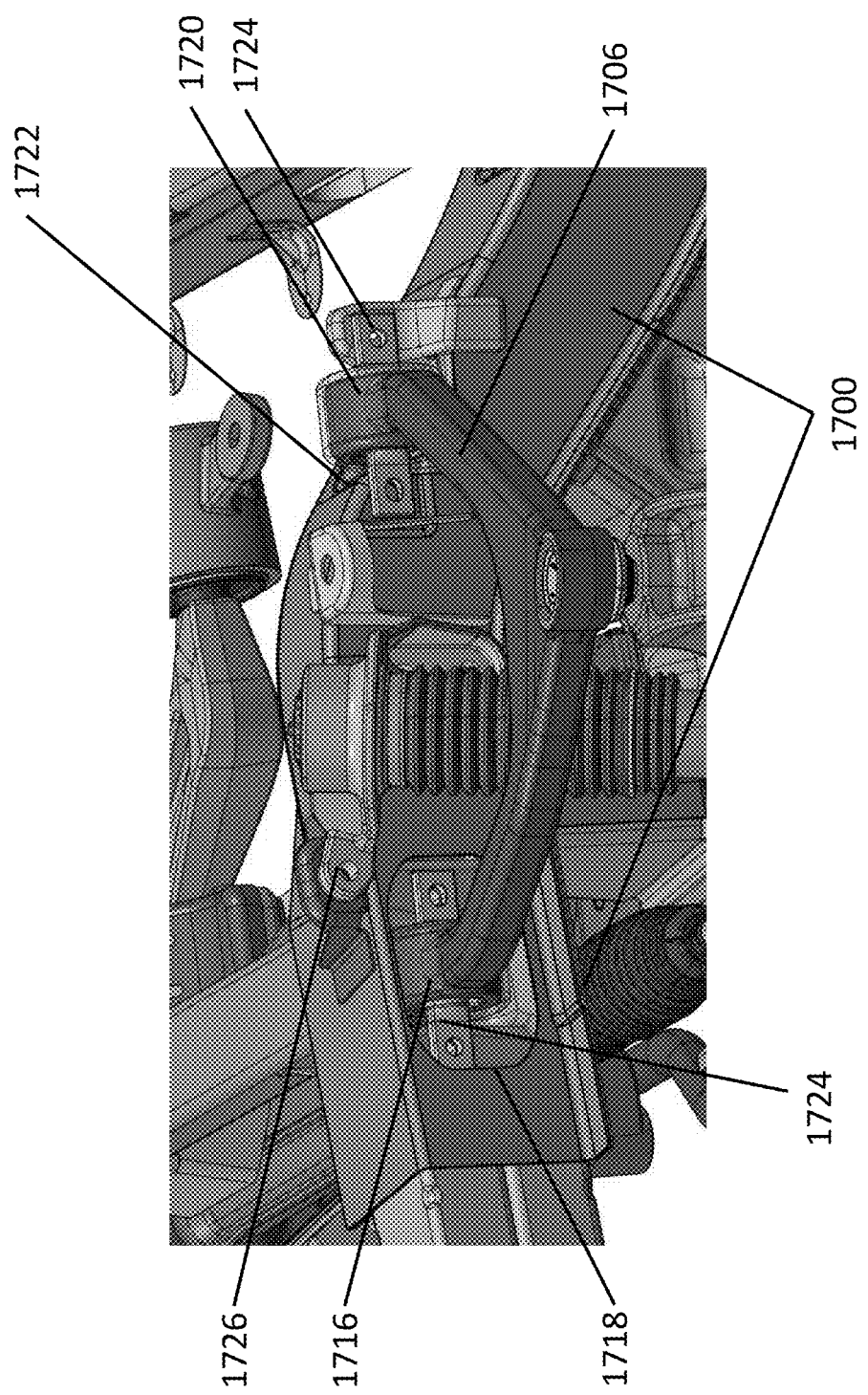
Figure 17E:
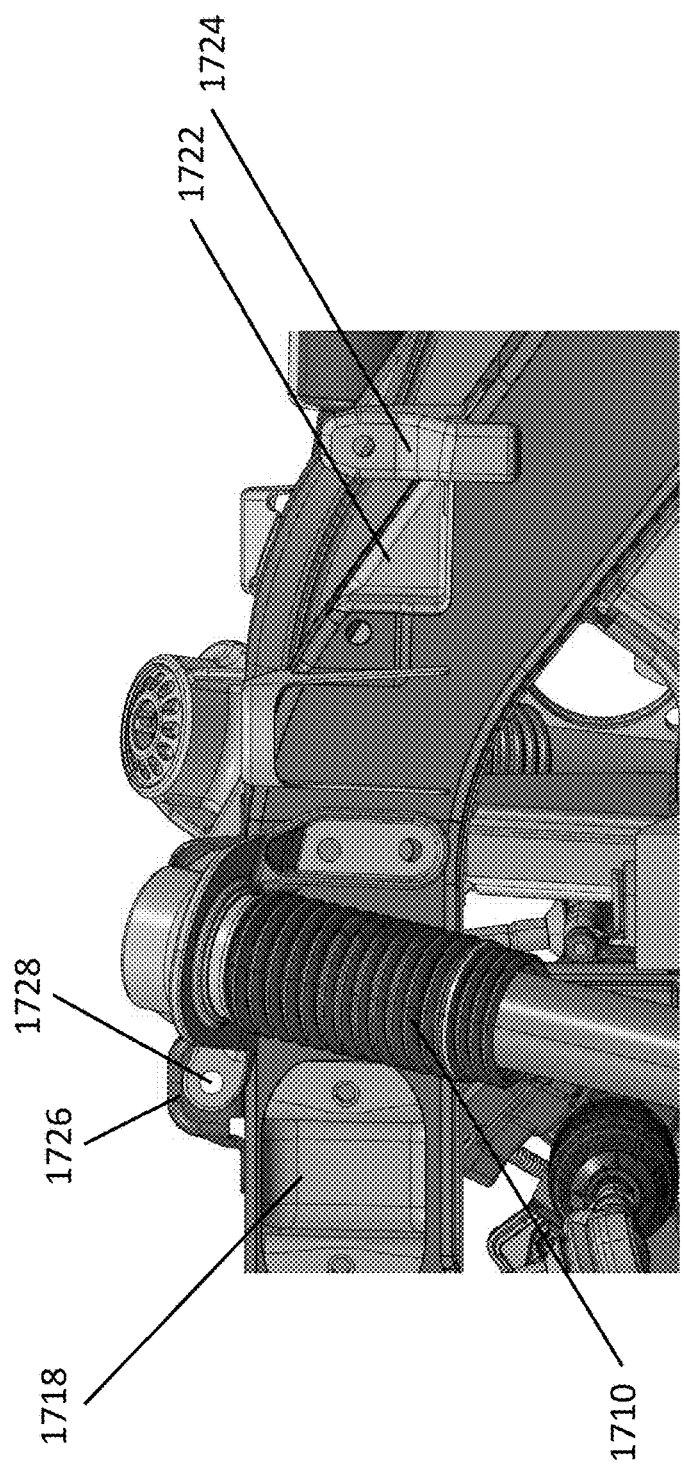

Although configurations of double wishbone suspensions are known in the art, integrating such suspension systems on a vehicle platform according to embodiments in such a way to minimize the location of suspension elements out of the plane of the vehicle platform have thus far not been described. According to many embodiments, as shown in FIGS. 17D and 17E, in order to package the upper wishbone support arm 1706 within the space allotted for the front suspension the pivot interconnections of the upper wishbone support arm are located within the vertical plane defined by the body of the associated frame rail. In one embodiment, as shown in FIG. 17D the frontward pivot interconnection 1716 of the upper wishbone support arm 1706 is disposed within a receiving opening 1718 formed in the frame rail 1700 of the vehicle platform, while the rearward pivot interconnection 1720 is disposed partially within a cutout 1722 in the frame rail body 1700. Accordingly, many embodiments configure the upper wishbone 1706 to be connected to brackets 1724 on both the front and rear portions of the wishbone. Some embodiments provide that such brackets 1724 that are positioned beyond the perimeter of frame rail body 1700. Moving the pivot points of the front upper wishbone support arm inboard within the body of the frame rail in accordance with embodiments allows for a more compact suspension system geometry than would otherwise be possible, thus allowing for the integration of the suspension system within the platform plane. FIG. 17E also illustrates the upper connection point for the front damper 1710. In accordance with many embodiments, the various attachment points/opening/brackets may be manufactured in any number of methods that are known in the art. Additionally, they may be affixed to the various points on the framework in any number of manners suitable.

Figure 17F:
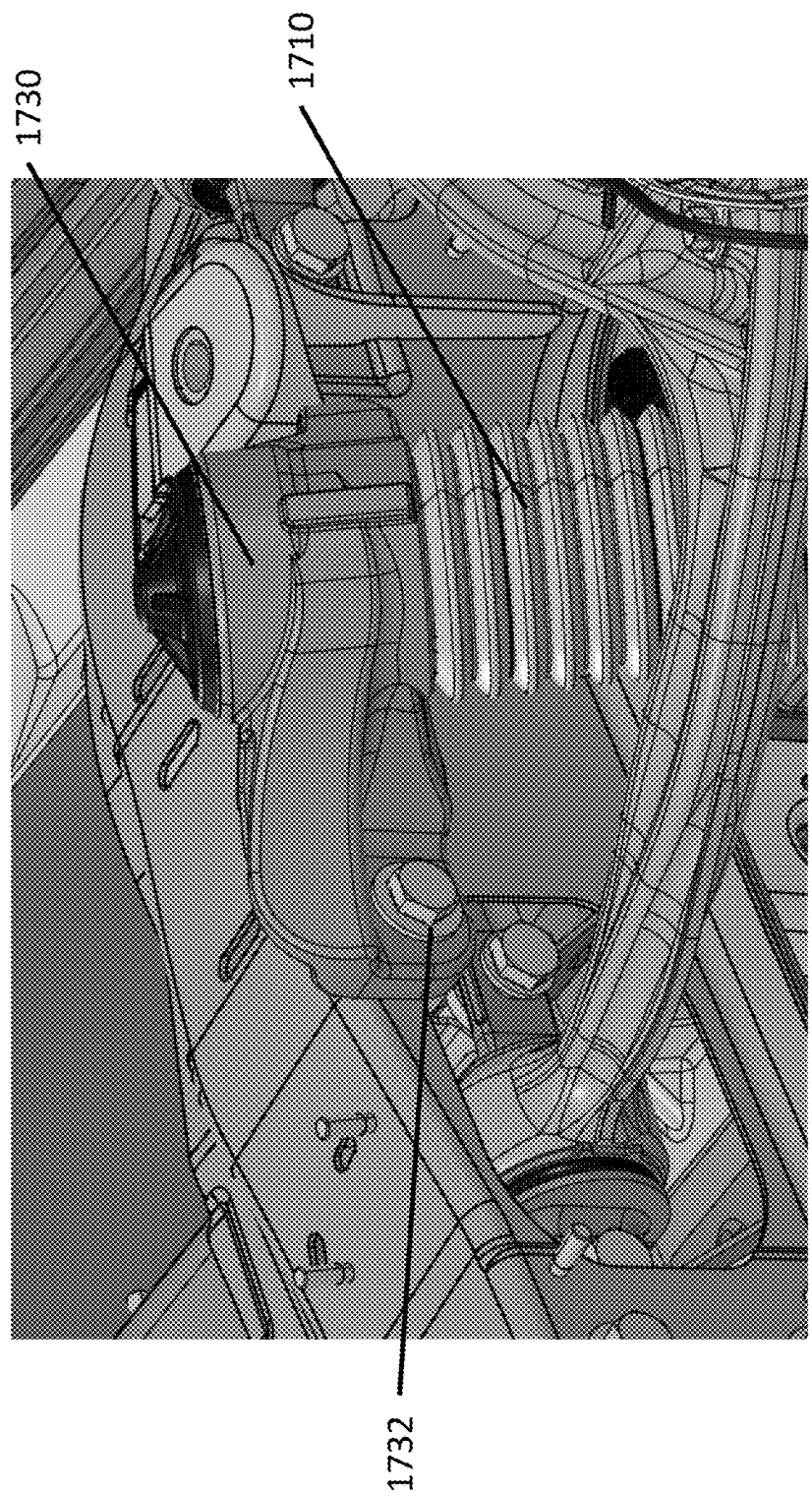
Figure 17G:
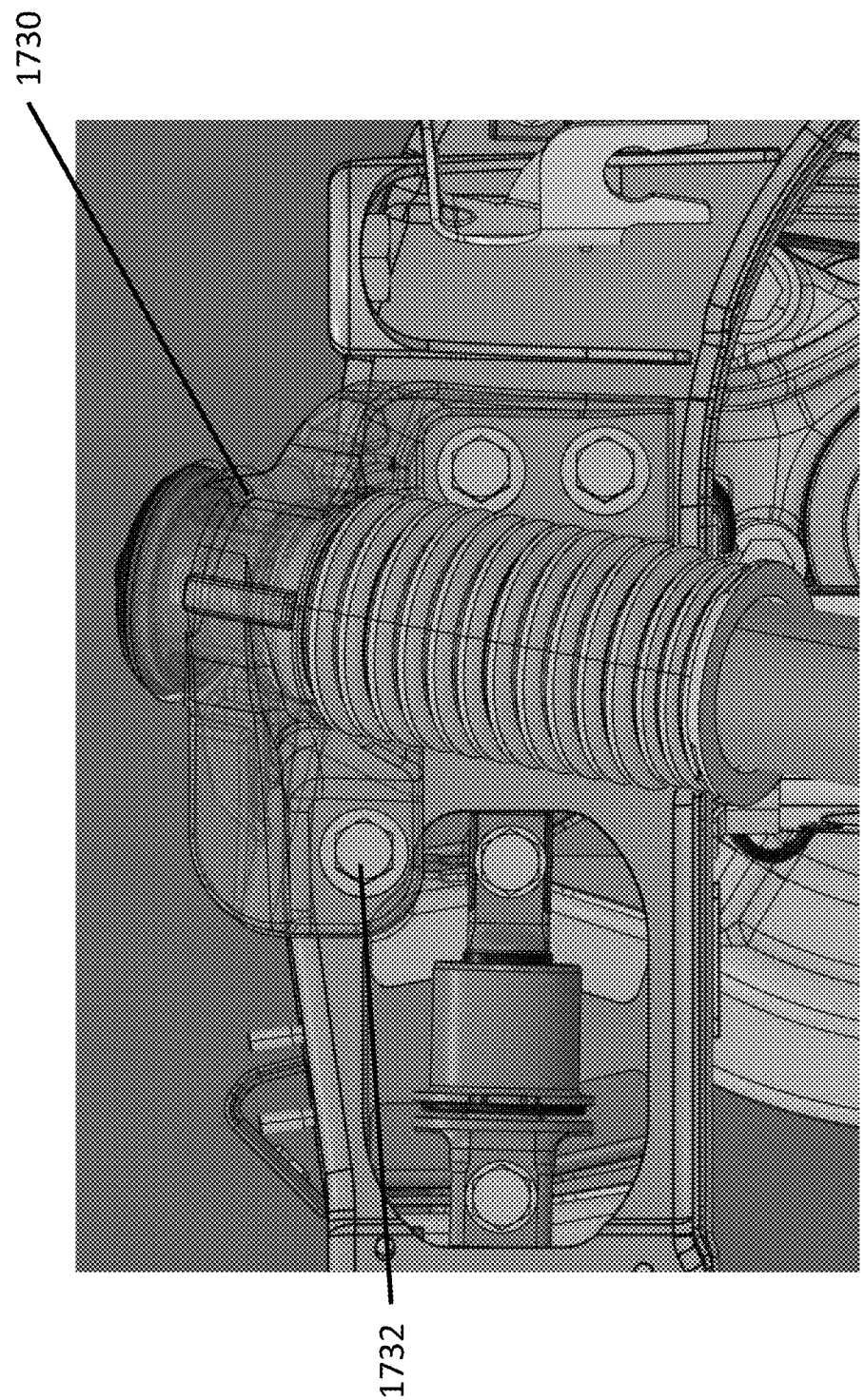

As shown, in embodiments, the damper 1710 may be attached to one or more brackets 1726 that extend slightly above the upper face of the vehicle platform and provide an attachment point 1728 above the upper face of the vehicle platform. Other embodiments may also have brackets with secondary attachment points 1730 that are below the upper surface of the frame or allow the bracket to attach to the side of the vehicle platform frame. Although some embodiments provide to brackets that extend beyond the upper surface of the frame, in compliance with many embodiments no portion of the suspension system extends beyond the upper perimeter of the vehicle wheel. Accordingly, the suspension system, according to embodiments, is significantly compacted compared to conventional systems. Other embodiments, such as those seen in FIGS. 17F and 17G, utilize a bracket 1730 that may allow for an attachment point 1732 that is on a lateral side of the vehicle framework. Such embodiments provide for a lower profile bracket 1730 such that the overall suspension system can still be configured within a low profile vehicle platform framework.

Figure 16A:
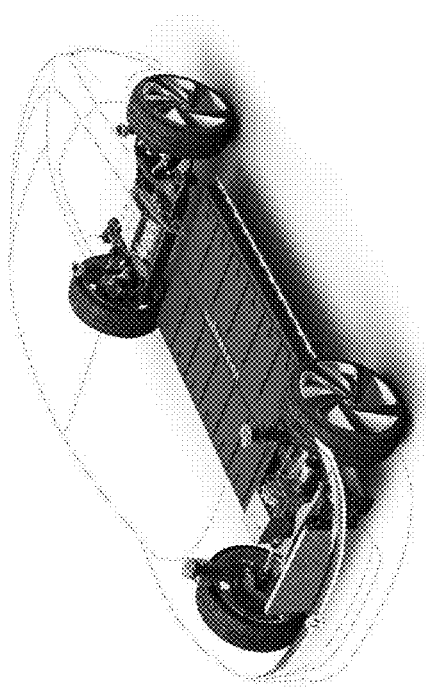
Figure 18A:
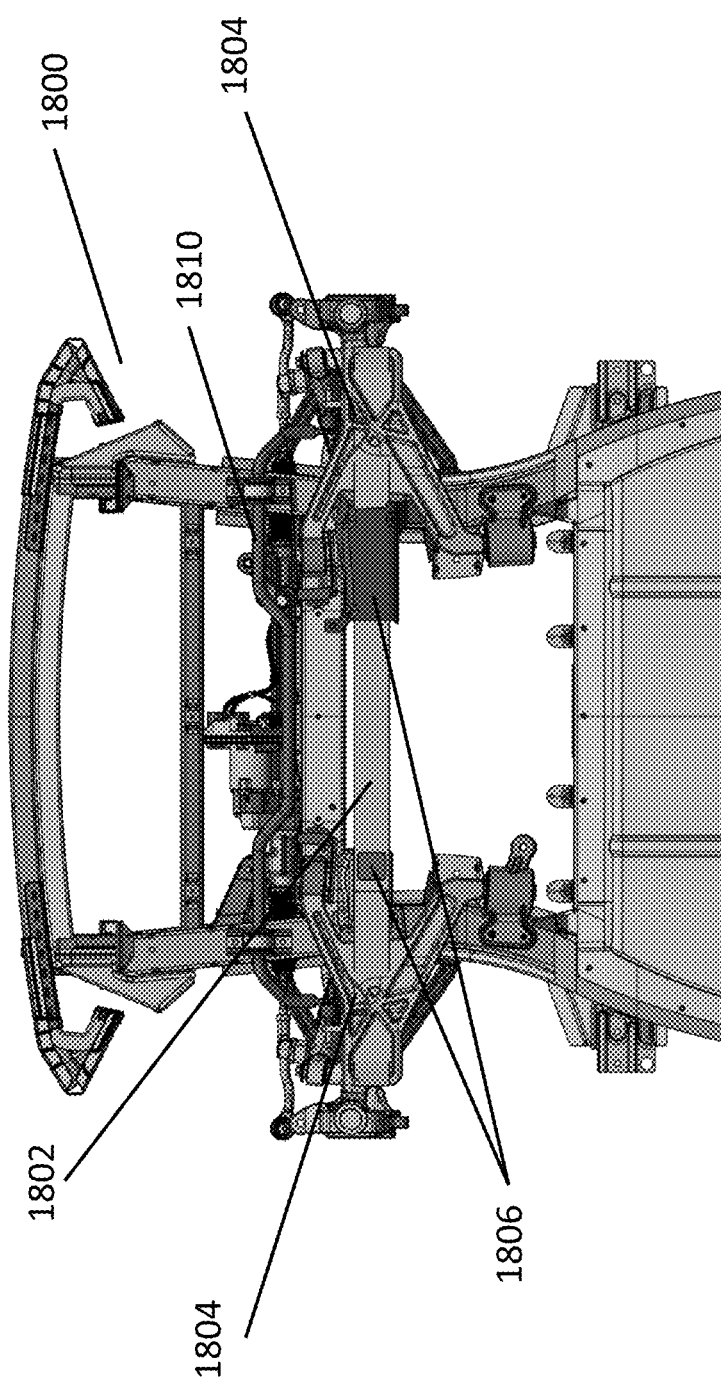
FIGS. 18A to 18D illustrate a vehicle platform suspension system with a leaf spring in accordance with embodiments of the invention.

To accomplish this compact geometry, it is also necessary to remove the need for a strut or coil spring as these bulk elements are typically disposed in geometries that would require extending parts of the suspension system well beyond the platform plane (as illustrated by the prior art systems depicted in FIGS. 16A and 16B). Accordingly, many embodiments incorporate additional suspension components that interconnect the independent suspension systems. For example, various embodiments implement a transverse leaf spring to interconnect the wheels and provide both ride spring and roll spring functionality, thereby simultaneously obviating the need for additional coil springs or struts and an anti-roll bar. FIG. 18A provides a view of an embodiment of the underside of the vehicle platform 1800 in which a transverse leaf spring 1802 is incorporated into the suspension system. As shown, the transverse leaf spring 1802 spans the right and left lower wishbone arms 1804 and interconnects therewith. The transverse leaf spring may also be interconnected with the frame of the vehicle platform at two or more pivot or attachment points 1806 disposed along the length of the leaf spring 1802. It should be noted that in the illustration provided in FIG. 18A one of the pivot points is shielded from view by a cover element 1808, which is further described in relation to FIGS. 18B and 18C. It should also be noted that while embodiments implementing transverse leaf springs may omit anti-roll bars, as shown in FIG. 18A anti-roll bars 1810 might also be included in accordance with embodiments where additional stability is desired.

Figure 18C:
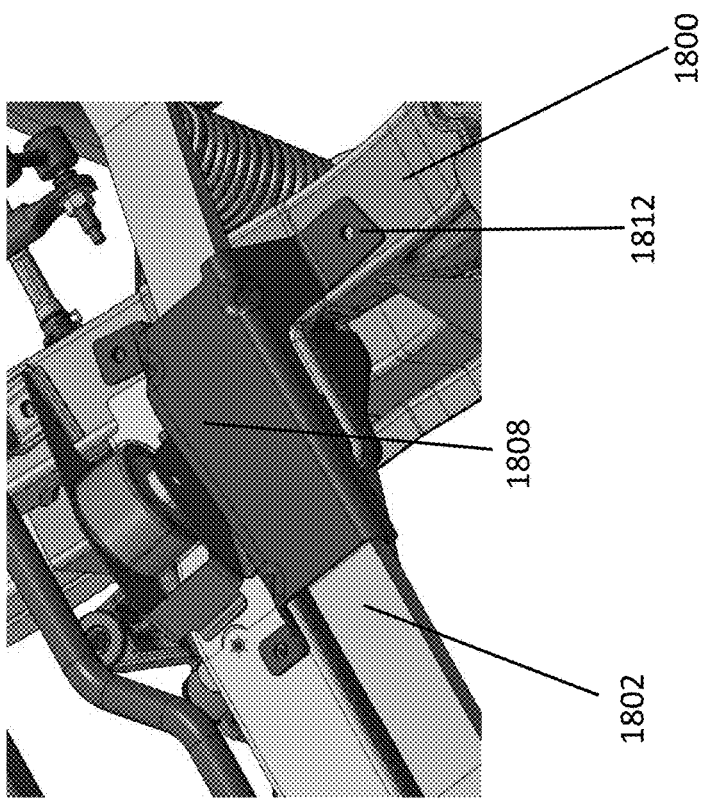
Figure 18B:
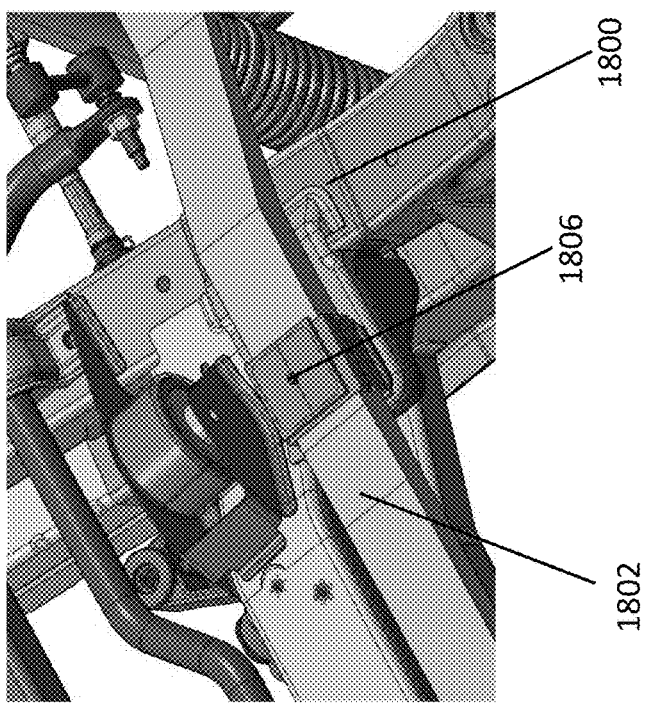
Figure 18D:
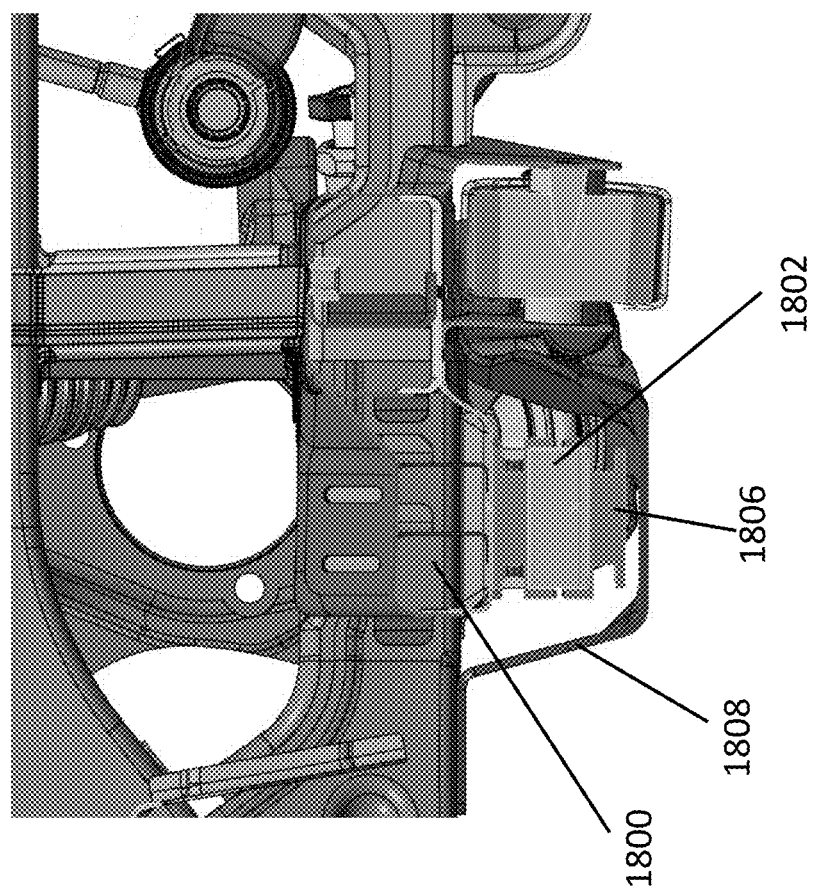

Moving now to FIGS. 18B and 18C leaf springs 1802, in accordance with many embodiments, can be attached to the frame of the vehicle platform 1800 at pivot points 1806. Various embodiments may use a cover plate 1808 to protect the pivot point from possible damage. In some embodiments, the cover plate 1808 is mounted onto the frame at several attachment points 1812. Although a specific embodiment of a cover plate 1808 is illustrated, it can be appreciated that any number of designs could be used. Additionally, it should also be understood that some embodiments may not utilize a separate cover plate but may have protection coverings integrated within the design of the leaf spring 1802 and pivot points 1806. For example, some embodiments may have coverings that serve as an installation tool to aid in installing the leaf spring 1802 to the vehicle frame while simultaneously serving as a covering to cover and protect the pivot point 1806. FIG. 18D illustrates a cross-sectional view of the interconnection of the leaf spring 1802 and associated pivot point 1806 and cover plate 1808 in accordance with some embodiments.

Figure 19A:
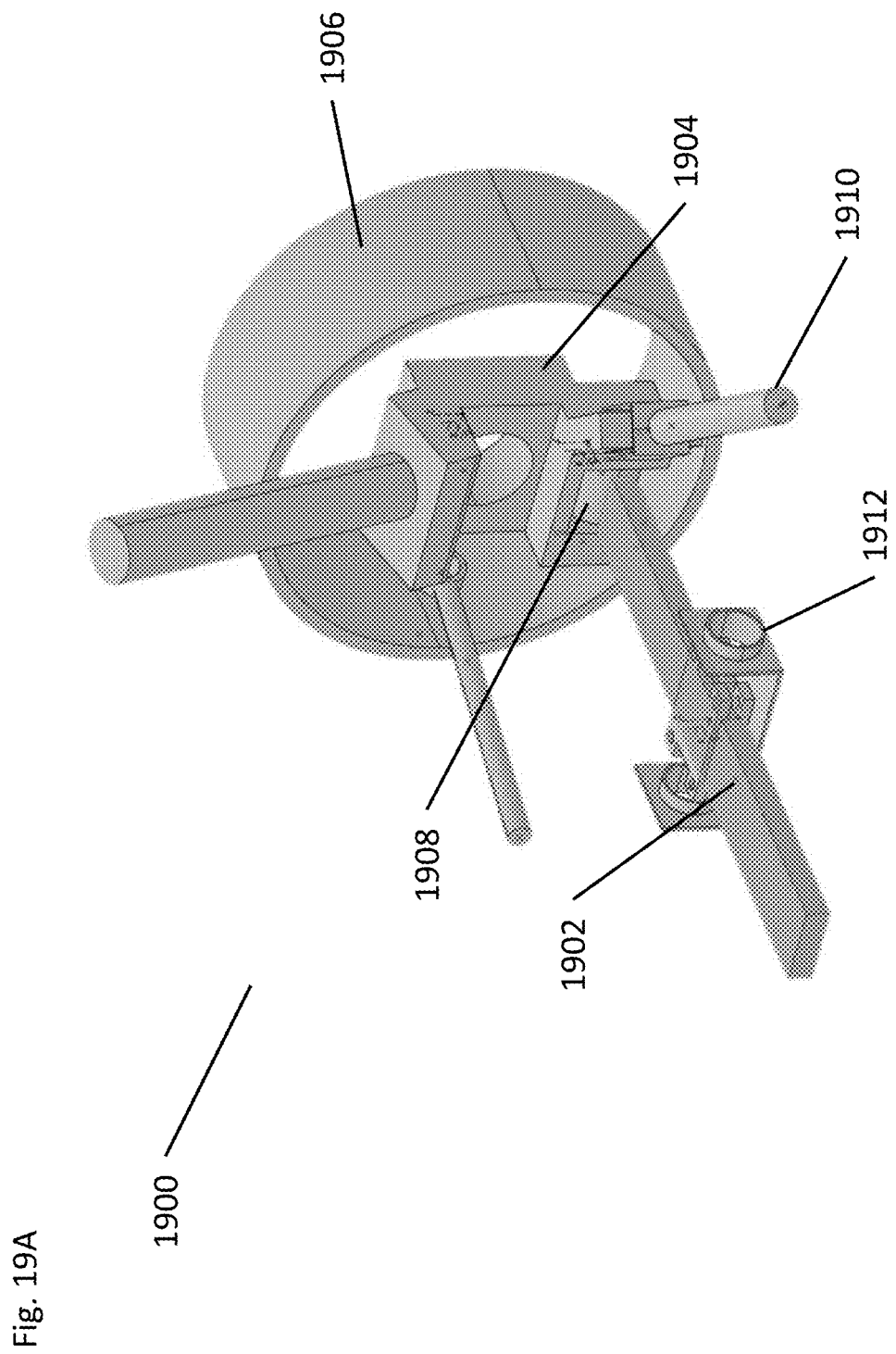
FIGS. 19A and 19B illustrate suspension attachment points in accordance with embodiments of the invention.

Turning now to FIGS. 19A through 20C, various embodiments of connecting a leaf spring type suspension system to other components and the vehicle platform frame can be further illustrated. For example, FIG. 19A illustrates an embodiment of a wheel assembly 1900 with a leaf spring 1902 connected to a wheel knuckle 1904 from which the wheel 1906 can be connected. In various embodiments, the leaf spring 1902 can connect to the knuckle 1904 by way of a connection mechanism 1908. In some embodiments, the connection mechanism may be a rubber bushing while others may use a ball joint. It can be appreciated that any number of connection mechanisms. Embodiments of such attachment methods and configurations can provide for a transverse leaf spring to act as a control arm, which can take over wheel guiding functionality. Accordingly, such embodiments can allow the leaf spring 1902 to counteract wheel forces and movements. In some embodiments, an additional control arm 1910 can be used in conjunction with the leaf spring. This can account for increased load requirements that may occur with the various embodiments of the overall vehicle platform and associated body or top hat. Additionally, many embodiments may incorporate modified pivot/attachment points 1912 for the leaf spring to attach to the vehicle platform framework.

Figure 19B:
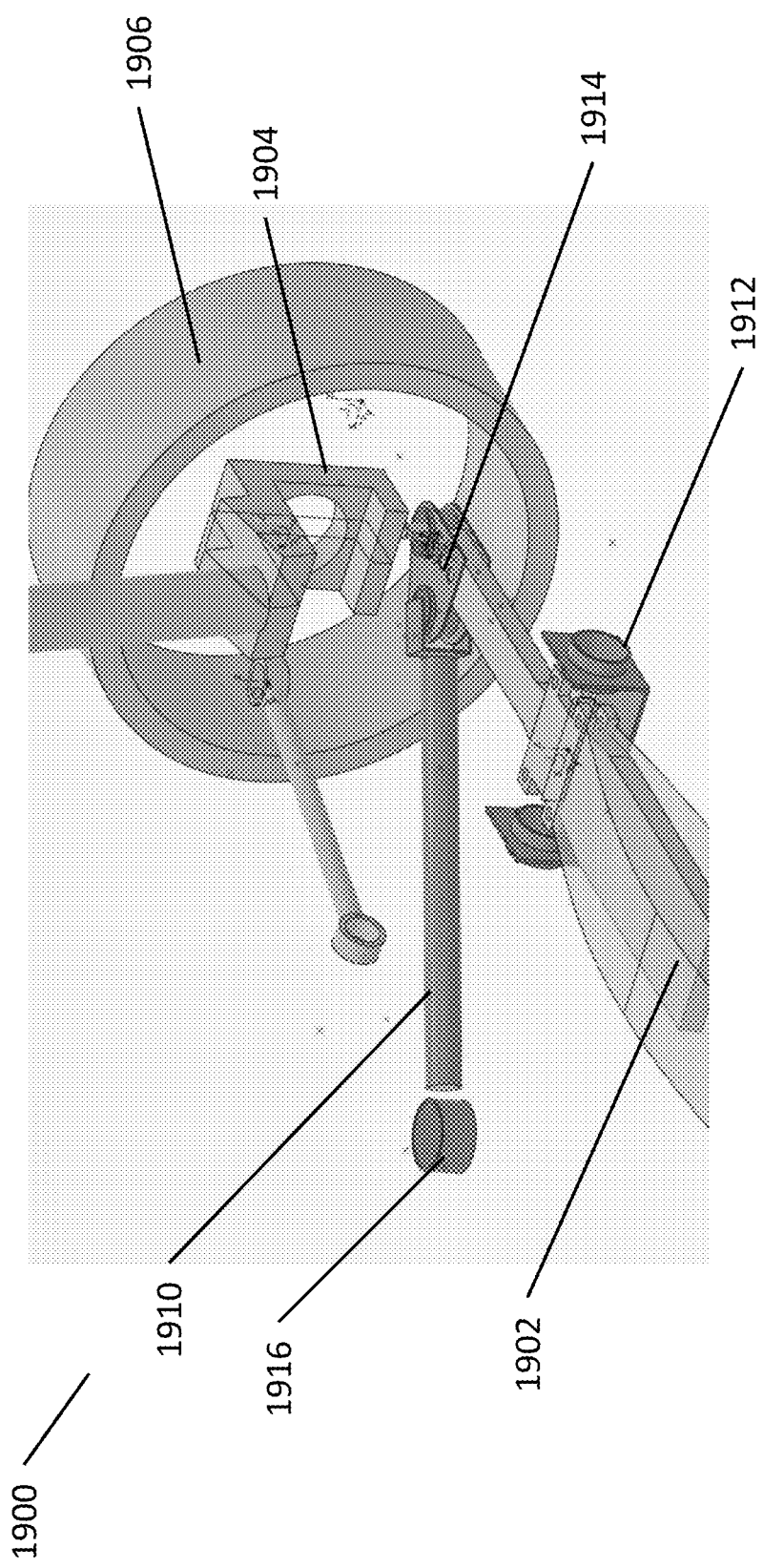

Adjustability and adaptability are well-integrated components in the many embodiments of the vehicle platform. Therefore, it can be appreciated that the connection of the suspension system can be adapted based on the variety of embodiments of the vehicle platform and associated body. FIG. 19B illustrates an embodiment of a wheel assembly similar to FIG. 19A but with improved control arm 1910 configurations. For example, the control arm 1910 may be connected to the leaf spring 1902 through a connector plate 1914. In many embodiments, the connector plate 1914 can provide connections to the leaf spring 1902 as well as the knuckle portion 1904 of the wheel assembly. In various embodiments, the connection between the different components can be bushings, ball joints, hinges, or any manner of connection that allows for adequate control over the wheel functionality. In addition to the connection with the wheel assembly 1900, the control arm 1910 can be connected to the vehicle framework (not shown) through an independent connection point 1916. In accordance with various embodiments, the independent connection point 1916 can be a bushing, ball joint, hinge, or any variety of suitable connection devices. It can be appreciated that with the improved adaptability of the many embodiments of the vehicle platform, the connections between the control arm 1910 and the other suspension components can be moveable as described above, but may also be rigid or semi-rigid based on the end functionality requirements of the vehicle platform and associated body.

FIGS. 20A through 20C illustrate various embodiments of connection mechanisms that can be used to connect the leaf spring components to the vehicle platform framework. Many such embodiments can be used in conjunction with covers or other elements previously discussed in relation to the pivot/attachment points in FIGS. 18A-18D. FIG. 20A illustrates a top and side view of mounting points 2000 that also serve as the pivot points about which the leaf spring 2002 can rotate or flex during use. In accordance with many embodiments, the mounting points 2000 may have cylindrical bushings 2004 placed on either side of the leaf spring 2002 such that the central axis 2006 of the bushings 2004 is perpendicular to the longitudinal axis of the leaf spring and perpendicular to the predominant motion plane of the leaf spring 2002. In various embodiments, the bushings 2004 can be supported by a bracket 2008 that is connected to the spring 2002. In some embodiments, the core of the bushing can be connected to the bracket by a clevis 2010 that can be fixed to the body of the bracket 2008.

In some embodiments, the leaf spring 2002 may have a trapezoidal section 2012 that interfaces with a corresponding mounting bracket 2014 as seen in FIGS. 20B and 20C. The trapezoidal section 2012, in many embodiments can be used to transfer lateral forces via the mounting bracket 2014. In various embodiments, the position of the mounting bracket 2014 can be further assured through the use of a clamping mechanism 2016. It should be understood that any number of clamping mechanisms 2016 can be used in the various embodiments to hold the attachment point 2000 in the desired location along the leaf spring 2002.

Figure 21:
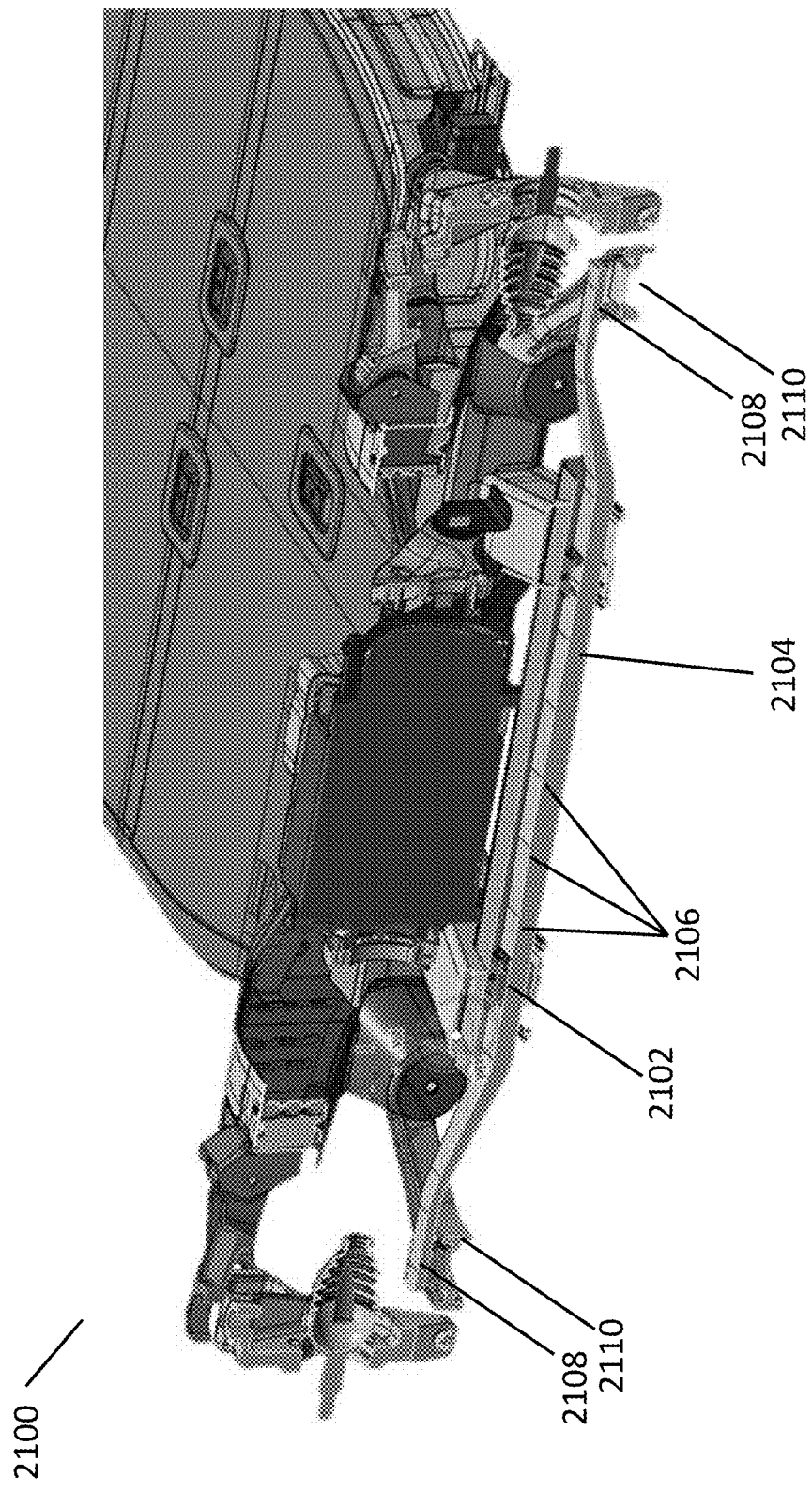
FIG. 21 illustrates a cross sectional view of a vehicle platform drive train and suspension system in accordance with embodiments of the invention.

One advantage of incorporating leaf springs into the suspension system according to embodiments is the ability to adapt the spring in various ways to provide the desired ride and roll stiffness of the vehicle platform and associated vehicle body. The adaptability can allow for a variety of embodiments of vehicle platforms to accommodate any number of vehicle body or top-hat designs. FIG. 21, for example, illustrates a cross sectional view of a suspension system on a vehicle platform 2100 where pivot points 2102 can be positioned at different locations along a leaf spring 2104 to adjust the flexibility and movement of the leaf spring. This adjustability can thereby act as a control measure to accommodate a number of different scenarios for which the vehicle may encounter. In some embodiments, the position of the pivot points 2102 may be accomplished by altering the distance between the pivot points of the leaf spring. For example, the pivot points 2102 could be positioned at various locations 2106 along the length of the leaf spring 2104. In many embodiments, altering the positions of the pivot points 2102 may increase or decrease ride and roll stiffness. Accordingly, this can be done within a desired range of space for each pivot point 2102 for which the desired performance can be achieved. Further adjustment may be made by altering the geometry of the attachment of the ends 2108 of the leaf spring 2104 to the lower wishbone arms 2110. Such adjustability according to embodiments could allow for the use of a common leaf spring across a wide range of different vehicle bodies having different weights and desired ride characteristics.

Figure 22:
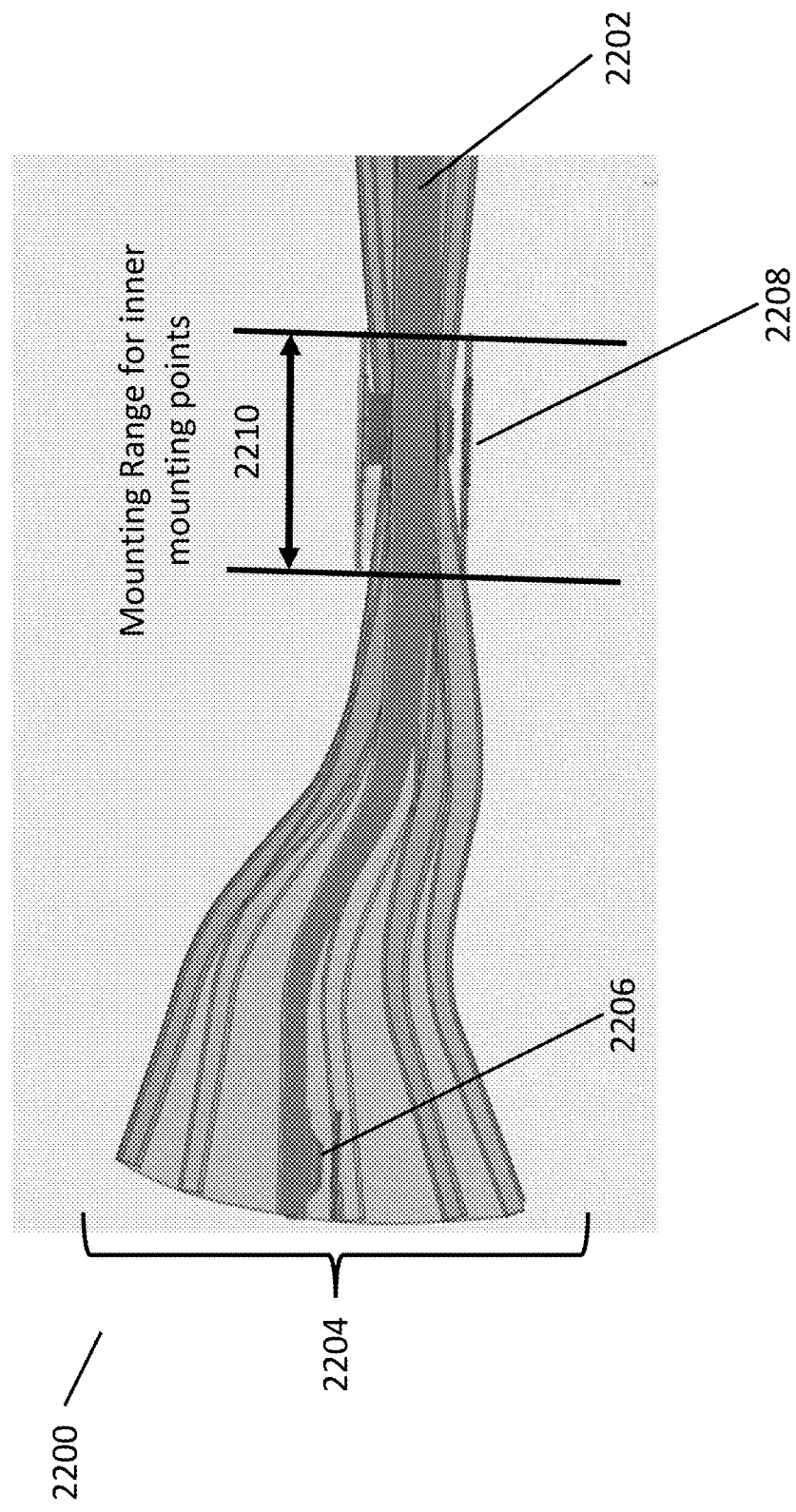
FIG. 22 illustrates a movement envelope of a suspension system in accordance with embodiments of the invention.

As has been discussed, the adjustability of the attachment points of the transverse leaf spring can have simple and yet dramatic effects on the overall response of the suspension system to be able to maintain the desired ride and roll stiffness of the vehicle. FIG. 22, for example, illustrates a cross sectional view of a leaf spring in accordance with embodiments of the invention. The leaf spring 2202, in many embodiments, may have a specified movement envelope 2204 of a leaf spring 2202. The movement envelope 2204 can be determined by any number of factors such as the material of the spring, the attachment positions at the ends 2206, as well as the attachment or pivot points 2208 along the length of the spring 2202. FIG. 22 also illustrates how the change in position of the mounting/pivot points 2208 within a mounting range 2210 can affect the movement envelope 2200 of the leaf spring 2202. Most inner mounting points 2208 will provide the lowest ride and roll stiffness, whereas most outer mounting points 2206 provide the highest roll and ride stiffness within the embodiments of the leaf spring. Keep in mind that the embodiments of the leaf spring are preferable to be a common design that allows for some adjustability in the mounting points to modify the ride and roll stiffness. Accordingly, the inner mounting points 2208 may be adjusted within a desired range 2210 longitudinally along the length of the leaf spring 2202 to adjust the overall ride and roll stiffness in accordance with the body derivative to be used.

Figure 23A:
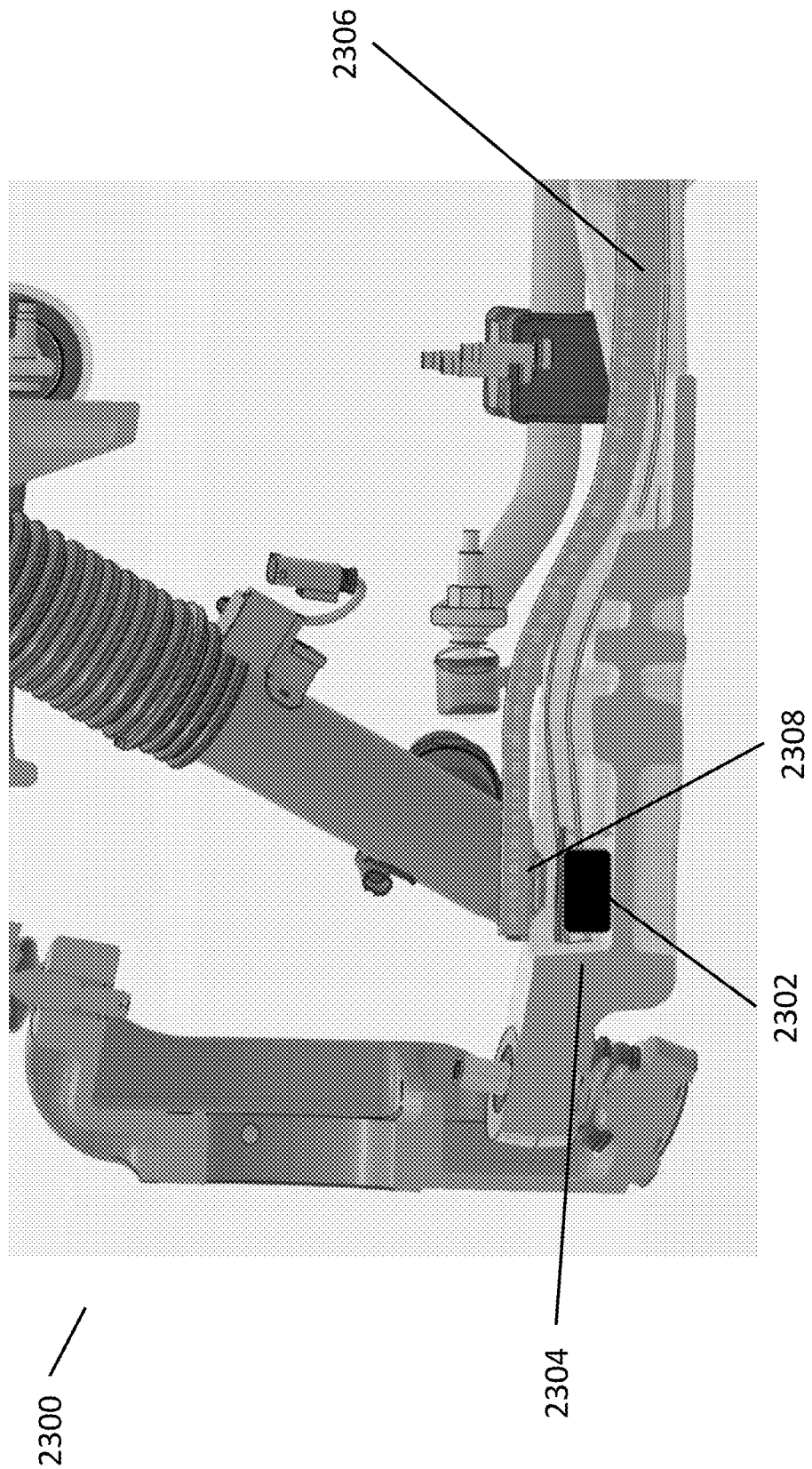
FIG. 23A illustrates a suspension system attachment in accordance with embodiments of the invention.

Since many body derivatives will carry with them a change in dimensions and weight, the overall height of the vehicle can be affected when one body is removed and the other body is installed on the vehicle platform. Hence the greater desire and need for an adjustable suspension system. However, if the vehicle height is simply left to vary according to the changing body then the overall efficiency of the vehicle can be dramatically affected. For example, ground clearance may be affected causing damage to the undercarriage of the vehicle. Additionally, the aerodynamics of the vehicle can be negatively influenced and would thus greatly reduce the range of an electric vehicle. Accordingly, many embodiments may incorporate additional features that can improve the suspension response with change. For example, FIG. 23A illustrates a cross sectional view of a suspension system wheel assembly 2300 that incorporates body or top hat specific spacers 2302. The body specific spacers 2302 can have a variety of heights according the body to be used. For example, a body that reaches the capacity in axle weight would require the largest spacer to bridge the distance between the control arm structure 2304 and the leaf spring 2306 at the outer most mounting point 2308 thus helping the leaf spring 2306 operate within the desired movement envelope. In contrast, a body that results in the minimum axel weight would require the smallest spacer. In some embodiments, the spacer 2302 may be sized up to 50 mm in height. Other embodiments may not require a spacer while others may be larger based on the overall vehicle configuration. For example, a heavier vehicle with a larger top hat like a pickup truck or van may require a larger spacer to accommodate for the added movement in the suspension system, while a vehicle configuration similar to a smaller sport sedan may not require the use of a spacer at all. In many embodiments, the spacer can act as a connection between the outer mounting point and the control arm assembly 2304 and in many embodiments; the spacer can help to maintain the required/desired tension on the suspension system to provide the best overall ride for the vehicle.

Figure 23B:
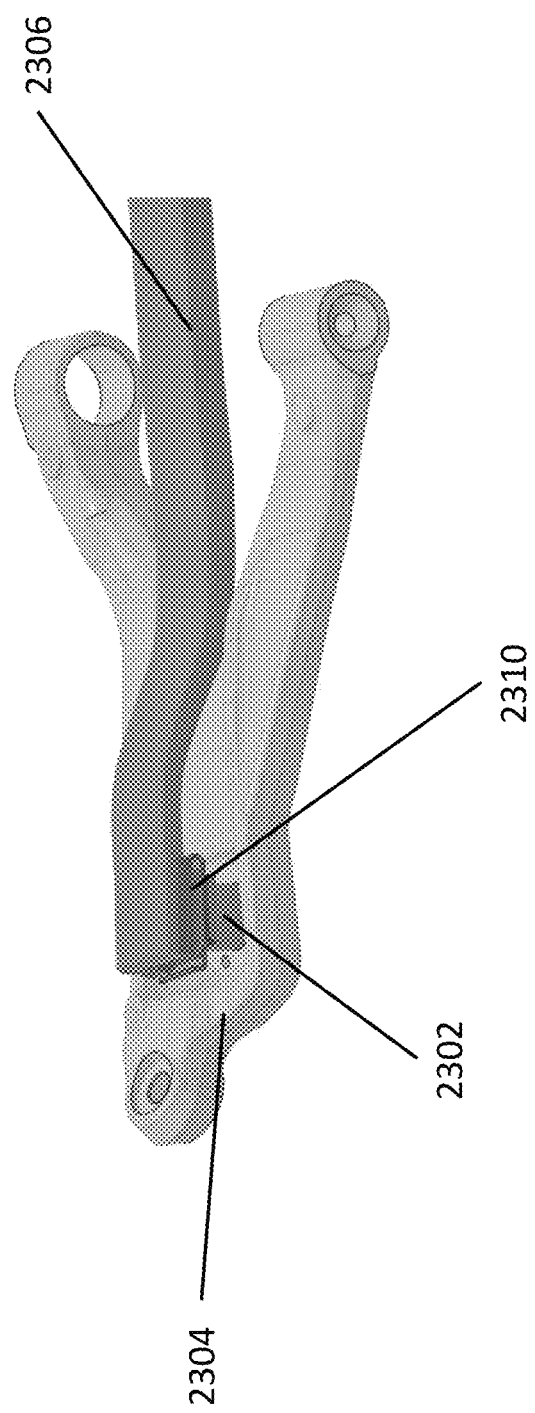

Moving now to FIGS. 23B through 23G, embodiments of a spacer and spacer system for adjusting the height of the suspension system can be seen. FIG. 23B illustrates an embodiment of a portion of a suspension system with a leaf spring 2306 that is connected to a control arm structure 2304. In various embodiments, the spring 2306 may be connected by a bushing 2310 and a spacer 2302 as discussed previously. The spacer 2302 in accordance with many embodiments the spacer can be adjustable to account for the various types of overall vehicle configurations. For example, FIGS. 23C and 23D illustrate a spacer 2302 that can be adjusted in height through a mechanical adjustment mechanism. The spacer 2302 in some embodiments may have an outer tube 2312 and an inner tube 2314 that are designed to cooperatively engage with each other along a longitudinal axis 2316. The outer tube 2312 may be connected to the bushing 2310 and surrounds the outer portion of the inner tube, as shown in FIG. 23D. Additionally, said embodiments may have a screw 2318 disposed between the outer 2312 and inner tubes 2314.

In many embodiments, the inner tube 2314 may be connected to a rotational device 2320 such as a nut or other device that is connected to the screw. The rotational device 2320 may have a hexagon type profile or other profile that is suitable for the function of adjusting the height of the spacer. In accordance with various embodiments, the rotation of the rotational device 2320 can drive an extension or separation of the inner and outer tubes along the longitudinal axis and thereby increase the overall height of the spacer 2302. In accordance with various embodiments, the height of the spacer can be blocked or limited by the configuration of the spring and the bushing. Such embodiments enable the easy adjustment of a spacer height in accordance with the many embodiments of vehicle bodies that can be used. Additionally, it allows for easy service of the spacers that can occur over time as other components of the suspension system wear with use.

Figure 23F:
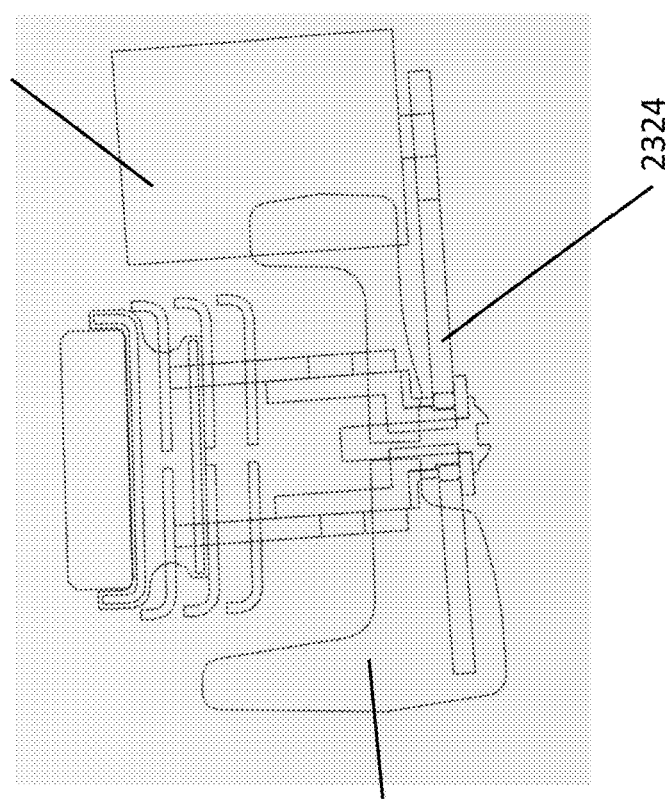
Figure 23E:
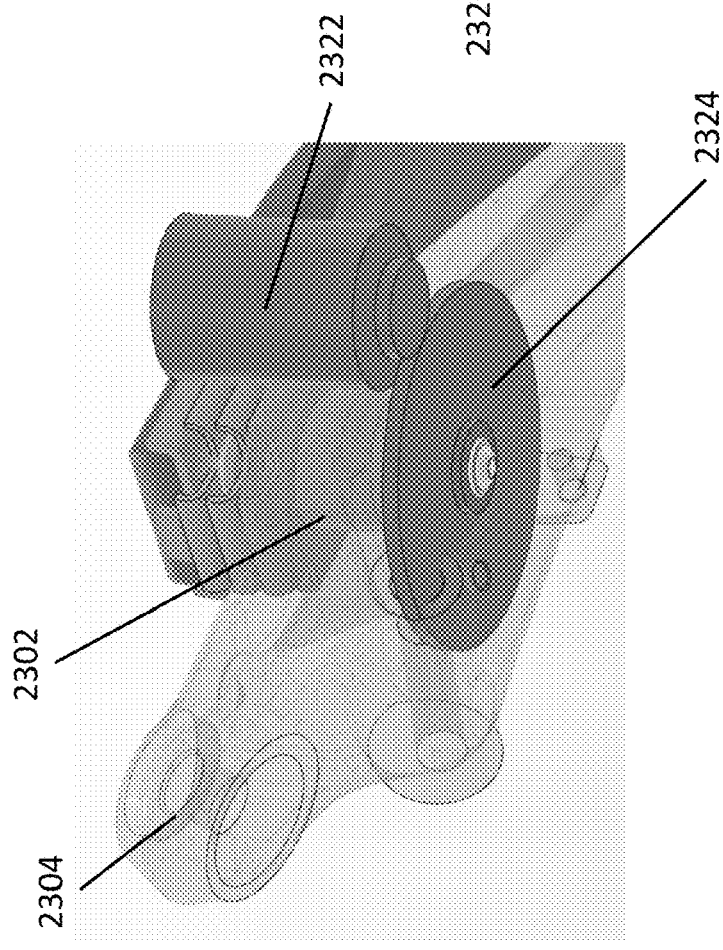

Turning now to FIGS. 23E and 23F, other embodiments of an adjustable spacer can be seen. For example, some embodiments may incorporate a motor 2322 that is connected to a gear drive 2324. In many embodiments, the gear drive 2324 takes the place of or is equivalent to the rotational device as illustrated in FIGS. 23C and 23D. In various embodiments, the gear drive 2324 may be one or more gears. In some embodiments, the motor 2322 can be configured to turn or rotate the gear 2324 such that the rotation thereof rotates the screw and drives the separation of the inner and outer tubes. In some embodiments, the motor may be connected to the control arm 2304 and can rest either above or below the control arm 2304. In some embodiments, the motor has a mounting bracket 2326 designed to support the motor 2322 near the adjustable spacer. In many embodiments, the motor 2322 can be controlled by a number of methods and/or external devices including direct control from the vehicle information system or a mobile device application. This can allow a user to adjust the height of the spacer as needed or, in many embodiments, can allow a service technician to adjust the height as required for regular maintenance or adjustment of the vehicle body.

Figure 24C:
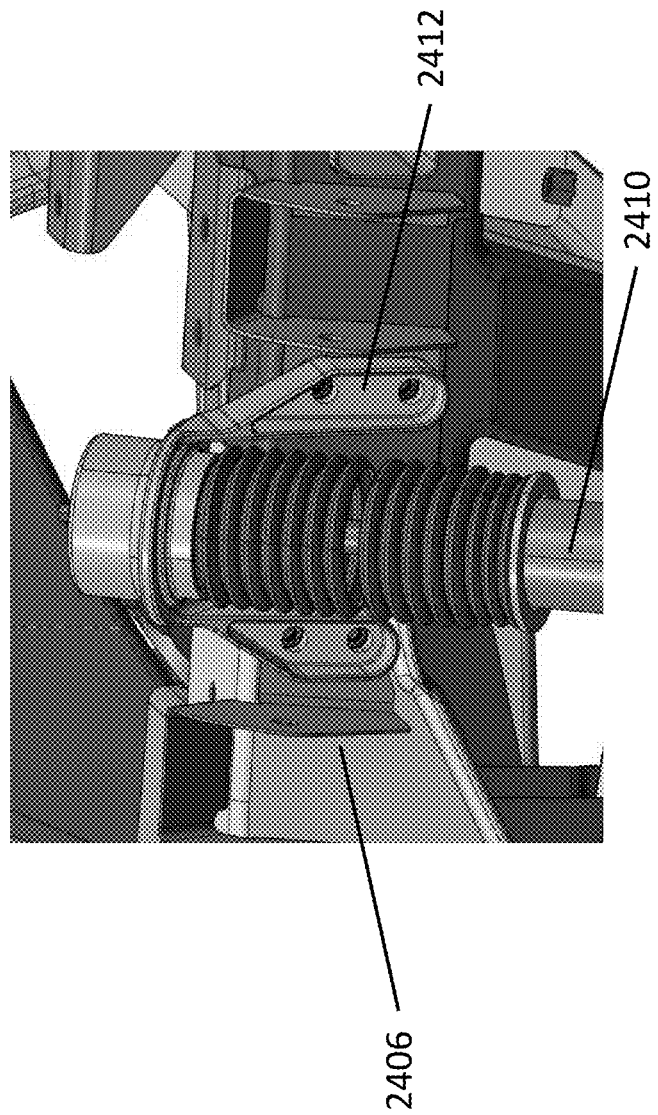

Although the above discussion has focused on the design and configuration of the front suspension system, it will be understood that similar suspension systems incorporating transverse leaf springs may be implemented on the rear wheels, as shown in FIGS. 24A to 24C. Specifically, as shown in FIGS. 24A and 24B, the rear suspension systems 2400 may also incorporate multiple supports arms 2402, 2403, and 2404 pivotably interconnected between the frame 2406 and rear wheel mount 2408. Note, instead of two arms, several embodiments may incorporate three separate pivoting arms (as shown in FIGS. 24A and 24B). Such suspension systems further incorporate dampers 2410 similar to those used in a front-end suspension. The dampers 2410 may be interconnected between the lower suspension arm 2404 and the frame 2406 via a suitable attachment element 2412, such as, for example, a cooperative bracket, as shown in FIG. 24C. Embodiments of rear suspension systems can also incorporate transverse leaf springs 2414 as shown in FIGS. 24A and 24B. Accordingly, embodiments of vehicle platforms may be outfitted with independent suspensions incorporating a transverse leaf spring in both the front and the rear suspensions. Additionally, many embodiments of rear suspension systems 2400 may be adaptable with a spacer and a number of different pivot/attachment points along the length of the leaf spring to improve the overall ride and roll stiffness and control of the vehicle. Moreover, although many embodiments exhibit vehicle suspension systems in association with various embodiments of vehicle platforms, it should be understood that any combination of the various structural and functional elements of such suspension systems can be included and/or omitted in any number of vehicle designs.

Embodiments of the Transverse Leaf Spring

With all the adjustability that is factored into the embodiments of the suspension system and more specifically the transverse leaf spring, it should be considered that the transverse leaf spring itself might have variety embodiments that help to improve the ride and roll stiffness to ensure a comfortable and stable ride. In order to achieve the desired roll and ride stiffness the transverse leaf spring must be able to provide the same or similar ride and roll stiffness that would be seen on traditional coil spring system like the MacPherson strut. Furthermore, the ratio between roll and ride stiffness depends on both the type of vehicle (car, truck, SUV, etc.) and the desired driving performance. Typical values for a rear suspension system are 1 to 1.5 whereas the front suspension has values between 2.5 and 3.5 due to the larger loads typically seen. In many embodiments, the leaf spring may maintain a roll stiffness that is 2.5 to 3.5 times greater than that of the ride stiffness.

FIGS. 25A and 25B illustrate the traditional load diagrams that a transverse leaf spring might see for the given ride (25A) and roll (25B) of a vehicle. The forces applied at both ends of the leaf spring determine the ride rate or load. Such loads create a bending moment or force on the leaf spring 2502. The roll rate or load is more equivalent to a torsional force on the spring as a force is applied at one end causing a rotational moment about the opposite end. The deflections and therefore the stiffness of a traverse leaf spring are predominantly dependent on locally appearing bending moment (see distribution curves in FIGS. 25A and 25B) as well as on the real moment of inertia of the cross section involved. The moment of inertia in a rectangular cross section depends on height and width of the cross section. Many embodiments of the leaf spring may maintain a predominantly rectangular cross section when viewed from the ends. However, many embodiments may incorporate a variable width cross section of the leaf spring in order to ensure the ride and roll stiffness are maintained.

Figure 26A:
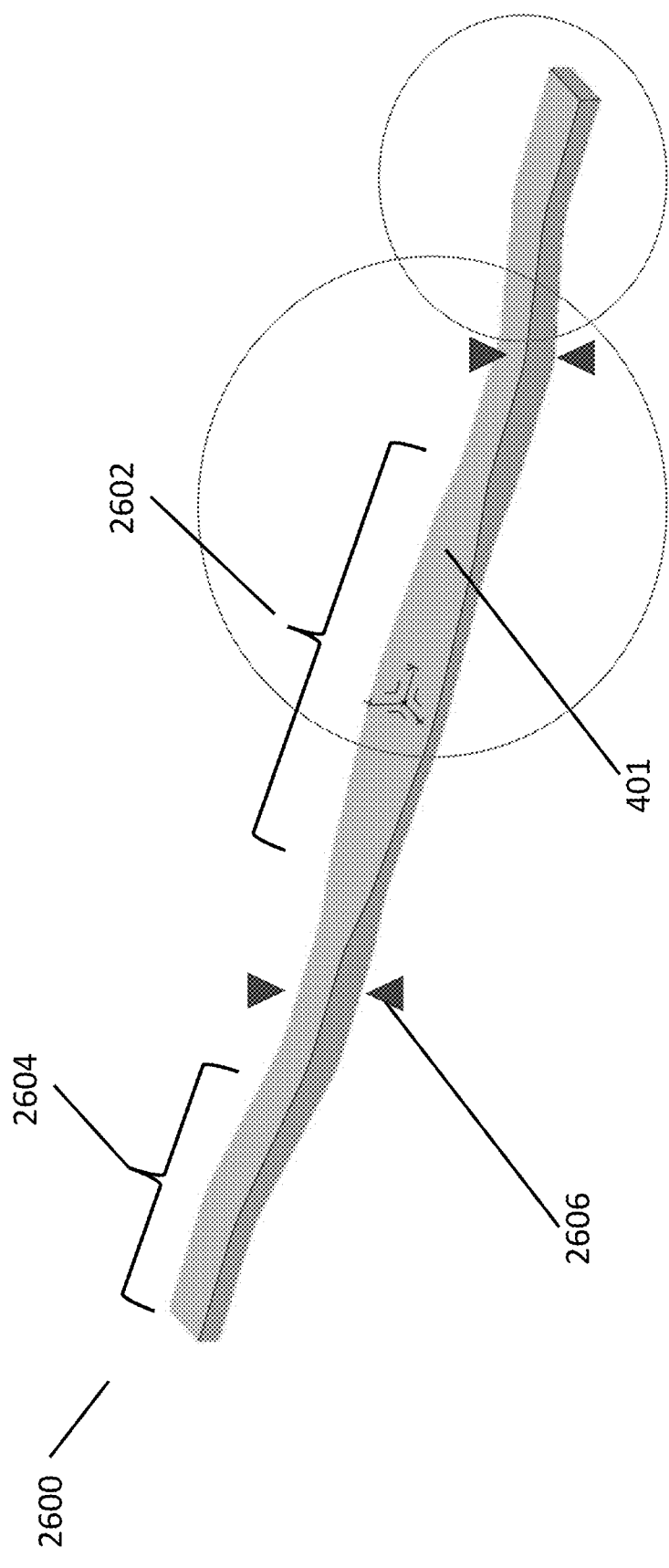
FIGS. 26A through 26C illustrate a variable cross section leaf spring in accordance with embodiments of the invention.
Figure 26C:
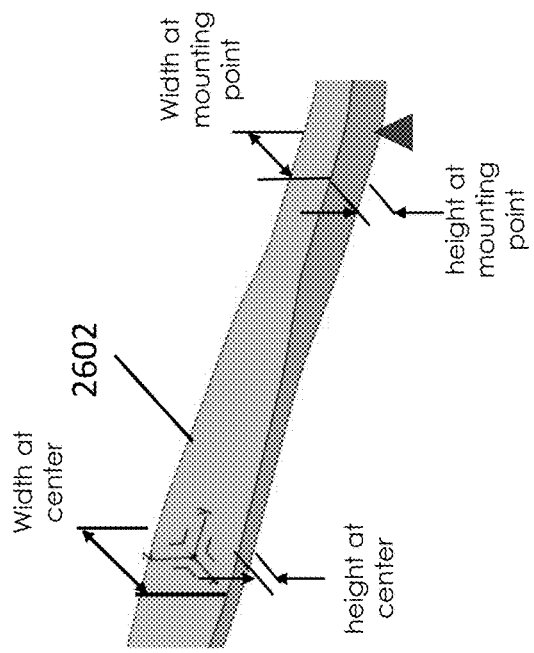
Figure 26B:
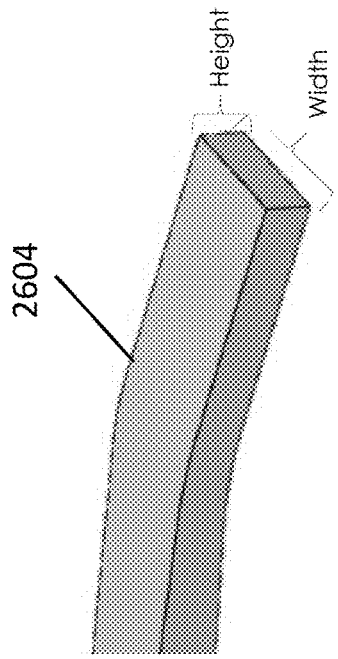

For example, FIGS. 26A to 26C illustrate embodiments of a transverse leaf spring 2600 with a variable width cross section. It can be seen that the middle section 2602 is wider than the outer sections 2604 and is wider than the location of the mounting points 2606. FIGS. 26B and 26C illustrate a zoomed in view of the leaf spring 2600 at both the center 2602 an outer portions 2604 to better illustrate the various embodiment of a leaf spring.

It can be seen in FIG. 26B that some embodiments have a specified height and width of the cross section of the ends of the leaf spring. Although some embodiments may incorporate a specific cross sectional height and width at the ends it should be understood that, other embodiments may vary the height and width of the cross section depending on the desired functionality of the leaf spring.

FIG. 26C illustrates one such change in cross sectional width and height of the leaf spring at various points along the length of the spring. An embodiment like those illustrated in FIGS. 26A to 26C may vary the height and width of the cross section depending on the section and purpose of the spring. For example, in some embodiments, the height of the cross section of the spring at the mounting points may be at least 1.7 times the height of the cross section at the center of the leaf spring. In contrast, some embodiments may have the width of the cross section at the center section to be at least 1.5 times the width of the cross section at the mounting positions. Accordingly, these design variations aim to ultimately maintain the overall ride and roll stiffness of the vehicle. However, the variations may not be limitless. In some embodiments, it may be provided that the cross sectional area along the length of the leaf spring does not exceed a ratio of 1.5 from the smallest to biggest sections. Again, such ratios may be important in maintaining the desired roll and ride stiffness according to the body derivative that is ultimately used. Although a specific configuration of the variable cross sectional leaf spring is shown, it should be understood that the embodiments shown are not meant to be binding but only illustrate an embodiment. Furthermore, in some embodiments, the cross sectional leaf spring may be manufactured from any number of materials including steel, composite, carbon fiber, aluminum, any number of alloys, etc. such that the desired strengths and characteristics are illustrated in the leaf spring according to the desired ride and roll stiffness. Moreover, although many embodiments exhibit transverse leaf spring designs in relation to vehicle suspension systems, it should be understood that various combinations of structural and functional elements of a transverse leaf spring can be included or omitted as required by the specific vehicle or suspension system design.

Motor Position with Respect to the Suspension System

Figure 27A:
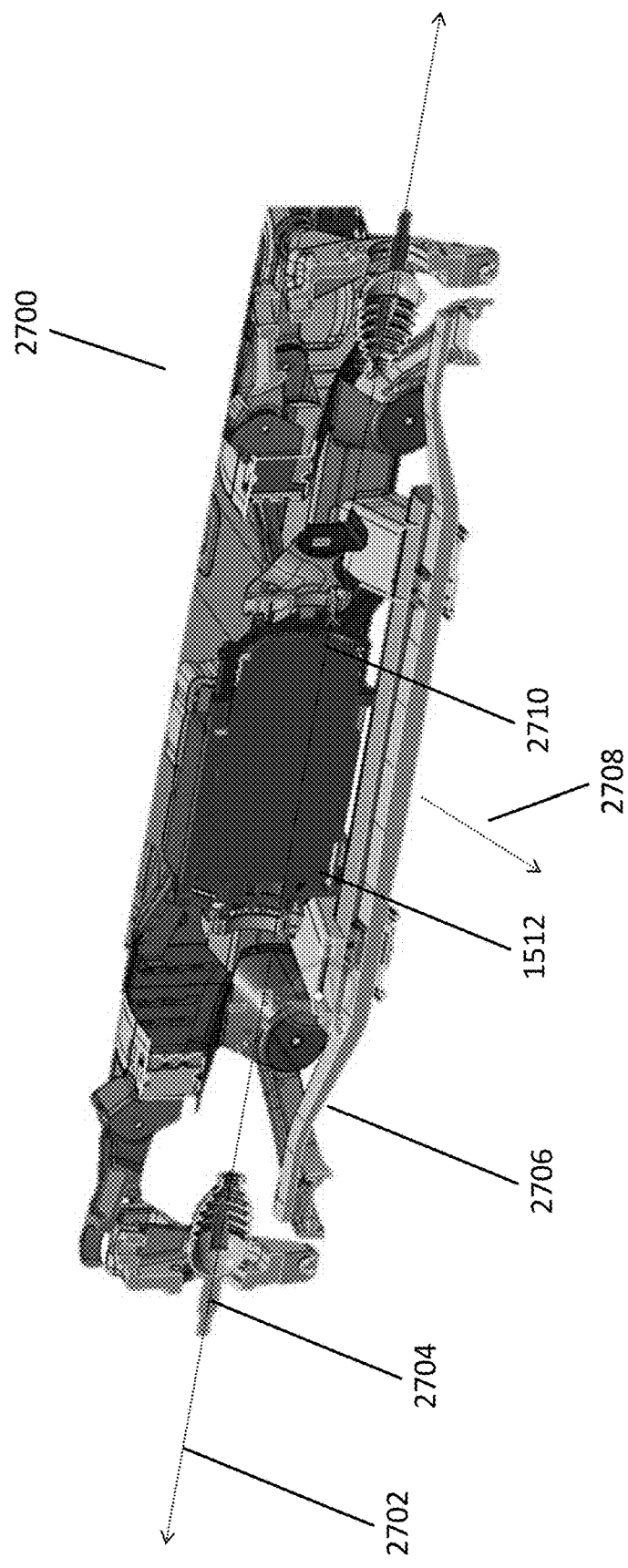
FIGS. 27A to 27C illustrate a vehicle platform suspension system in association with drive train components in accordance with embodiments of the invention.
Figure 27B:
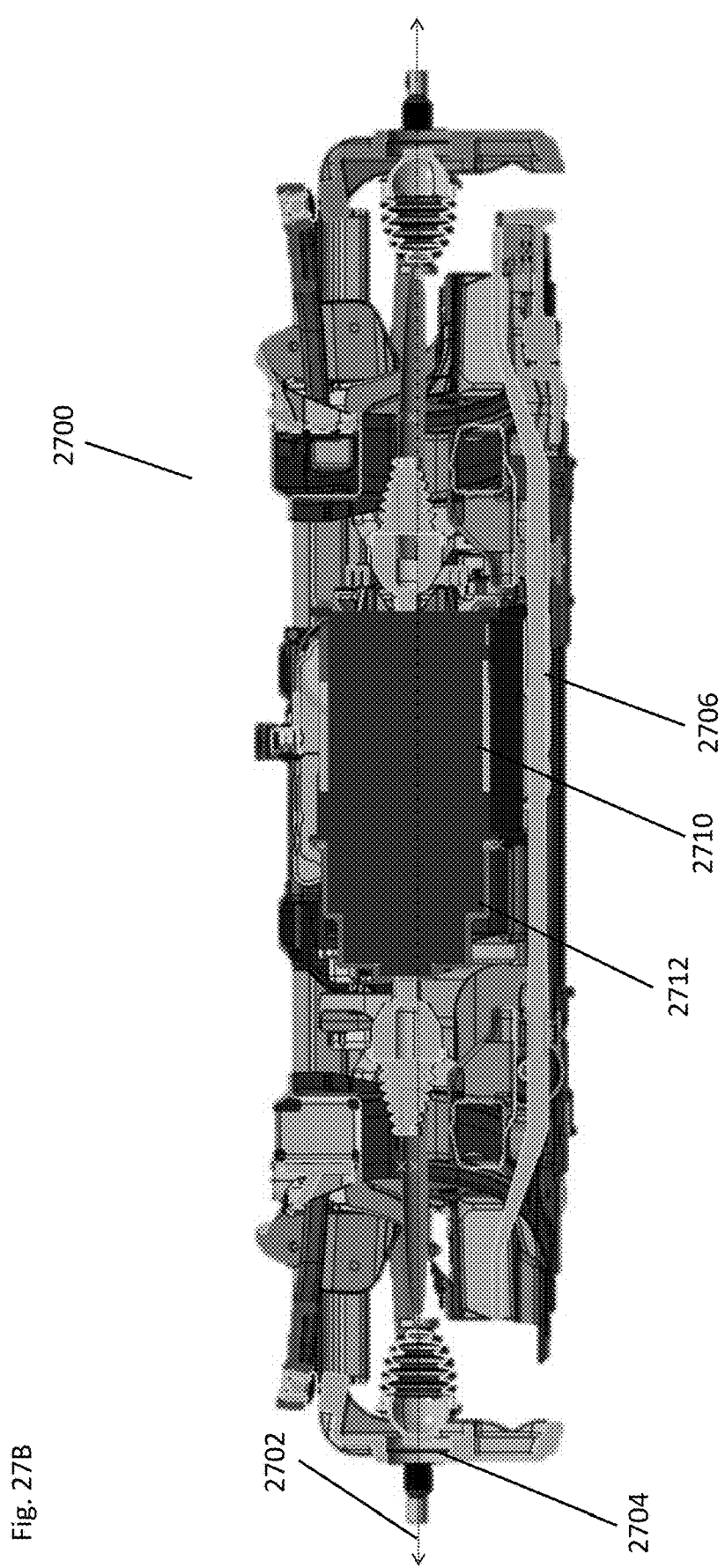

Despite the potential advantages of incorporating transverse leaf springs in vehicles with electric drives, a number of complications arise in implementing such suspension systems in vehicle platforms in accordance with embodiments. One is the spatial relationship between drive train elements (e.g., motor/transmission) and the leaf spring. As shown in FIG. 27A, in order to avoid expensive and heavy gear arrangements, embodiments of drive trains 2700 are configured such that the motor output axis 2702 is in line with the wheel centers 2704. Accordingly, many embodiments implement a co-axial drive train configuration. In implementing a transverse leaf spring 2706 suspension to maintain the flat packaging of the vehicle platform, as previously described, the leaf spring must be positioned as close to the wheel centers 2704 as possible to provide ride comfort and roll stability. Specifically, any longitudinal offset 2708 would result in a loss of efficiency and deterioration in ride and handling performance of the vehicle platform. In many embodiments, this positions the leaf spring 2706 directly beneath and in-line with numerous drive train elements including the motor 2710 and transmission components 2712.

Figure 27C:
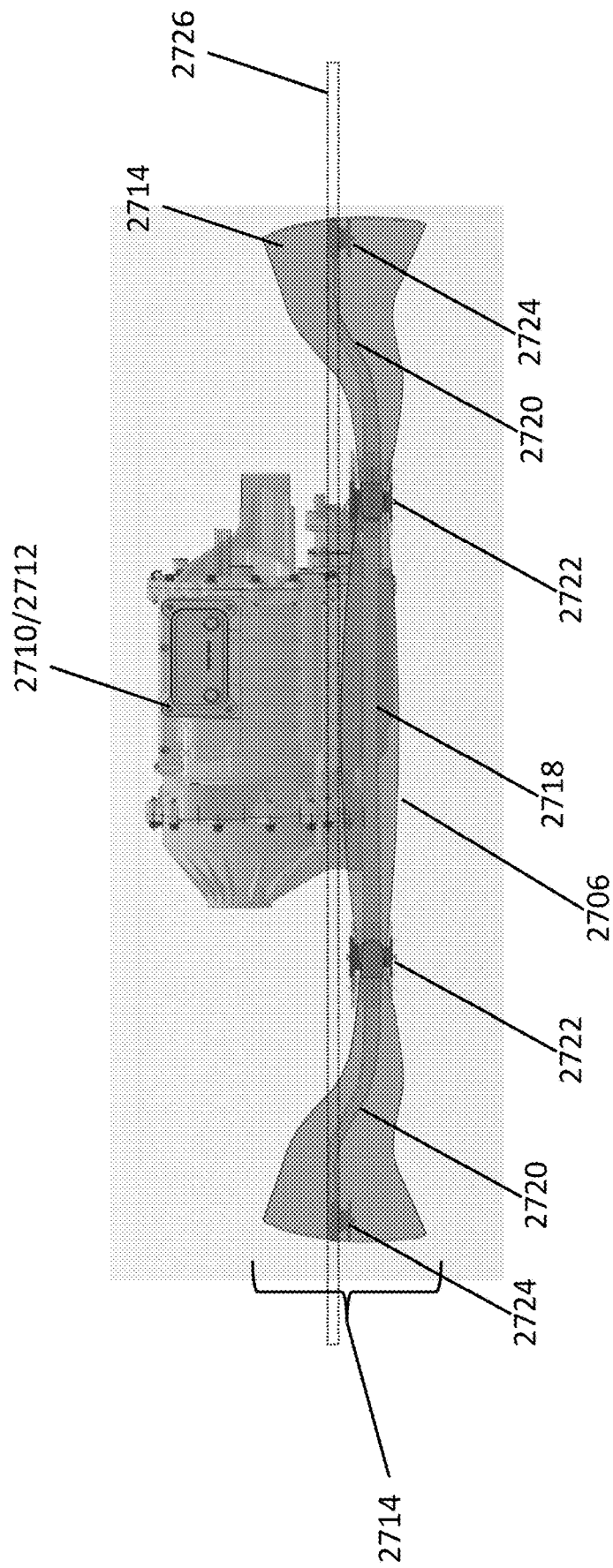

Conventional leaf springs are configured to be vertically planar. However, if a conventional leaf spring were to be implemented in the various embodiments of a vehicle platform described herein, the various drive train elements may require substantial vertical adjustment, pushing the drive train elements further into the cabin space. This solution would be unsuitable for the design goals of vehicle platforms according to embodiments, namely, to create maximum vehicle cabin space for passengers by designing a vehicle platform to be as flat as possible. Therefore, FIG. 27C illustrates an embodiment of a leaf spring and associated movement envelope 2714 as it relates to various drive train components 2710/2712. During operation, as shown by the movement envelope 2714, the leaf spring 2706 undergoes deflection further increasing the amount of clearance required between the leaf spring and the drive train elements 2710/2712.

As shown in FIG. 27C, the leaf spring 2706 may be described in relation to three different sections: a middle section 2718 disposed directly beneath the drive train elements 2710/2712, and left and right outer ends 2720 disposed outboard of the pivot points 2722 and terminating in lower support arm coupling 2724. As shown, in various embodiments the leaf spring 2706 deviates from a straight line to create additional clearance for the drive train elements and allow for deflection of the spring during wheel travel (see motion envelope 2714). More specifically, the outer ends 2720 between the lower support arm coupling 2724 and the pivot point 2722 are configured with a downward bend such that at least the middle section of the leaf spring is disposed vertically lower relative to the outer sections of the leaf spring. In various embodiments, the downward deflection from the straight line 2726, defined by the position of the outer ends 2424 of the leaf spring, is sufficient to provide a gap between the leaf spring and the drive train elements during a full rebound condition (e.g., when the vehicle platform is raised sufficiently above the ground to allow the wheel hang freely) where the center 2718 of the leaf spring 2706 come closest to the drive train elements 2710/2712.

Figure 28:
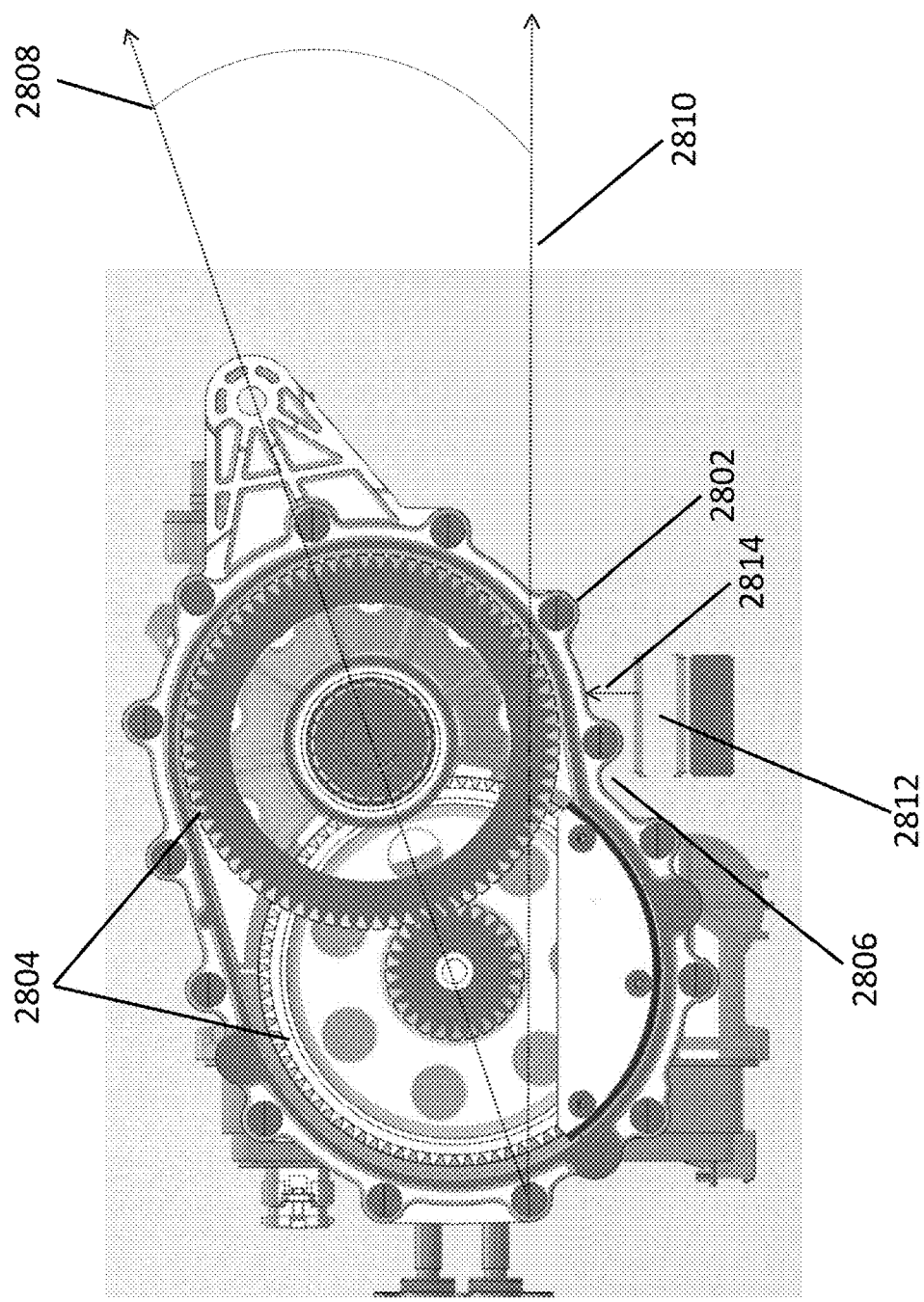
FIG. 28 illustrates a cross sectional view of a vehicle platform motor system in relation to various components of a suspension system in accordance with embodiments of the invention.

In various embodiments, the drive train elements are also configured such that additional clearance between leaf spring and motor/transmission components is created. In such embodiments, the configuration of the motor/transmission can be a function of the desired peak torque characteristics of the overall vehicle. FIG. 28 illustrates a cross sectional view of a positional arrangement between various motor components and suspension components. As shown in FIG. 28, the motor housing 2802 must conform to the size and shape of the gears 2804 of the transmission, which are determined by the desired driving characteristics of the vehicle (e.g., gear ratio is determined by vehicle requirements). As shown in the embodiment of FIG. 28, the combination of gears, 2804 required by the transmission creates a figure-eight shape. Embodiments of drive trains form motor housings having at least one side that conforms to the contours of the gears (e.g., the "figure eight" shape) creating a indented portion 2806 of the motor housing 2802. In various embodiments, the motor housing in configured such that a maximum clearance of from 3 to 7 mm is formed between the gears 2804 and the housing 2802. In accordance with many embodiments, a careful angular positioning of the motor housing (e.g., tiling the motor housing such that the elongated axis 2808 of the figure eight is elevated relative to a horizontal axis 2810) can allow for positioning a leaf spring 2812 beneath the casing 2802 while achieving a maximum clearance 2814 between the leaf spring 2812 and the motor housing 2802 during spring movement. Accordingly, the leaf spring 2812 does not contact the motor housing throughout its entire range of motion. In addition, as the maximum deflection of the leaf spring 2812 occurs in the center of the spring under full rebound condition. Many embodiments position the motor housing 2802 such that the lowest point is spatially separated from this center portion of the spring 2812. In various embodiments, the spatial separation of the motor housing from the center plane of the leaf spring is greater than 100 mm. In other embodiments, the spatial separation may be as small as 50 mm. In some embodiments, the center plane of the leaf spring is identical to that of the vehicle.

Figure 29A:
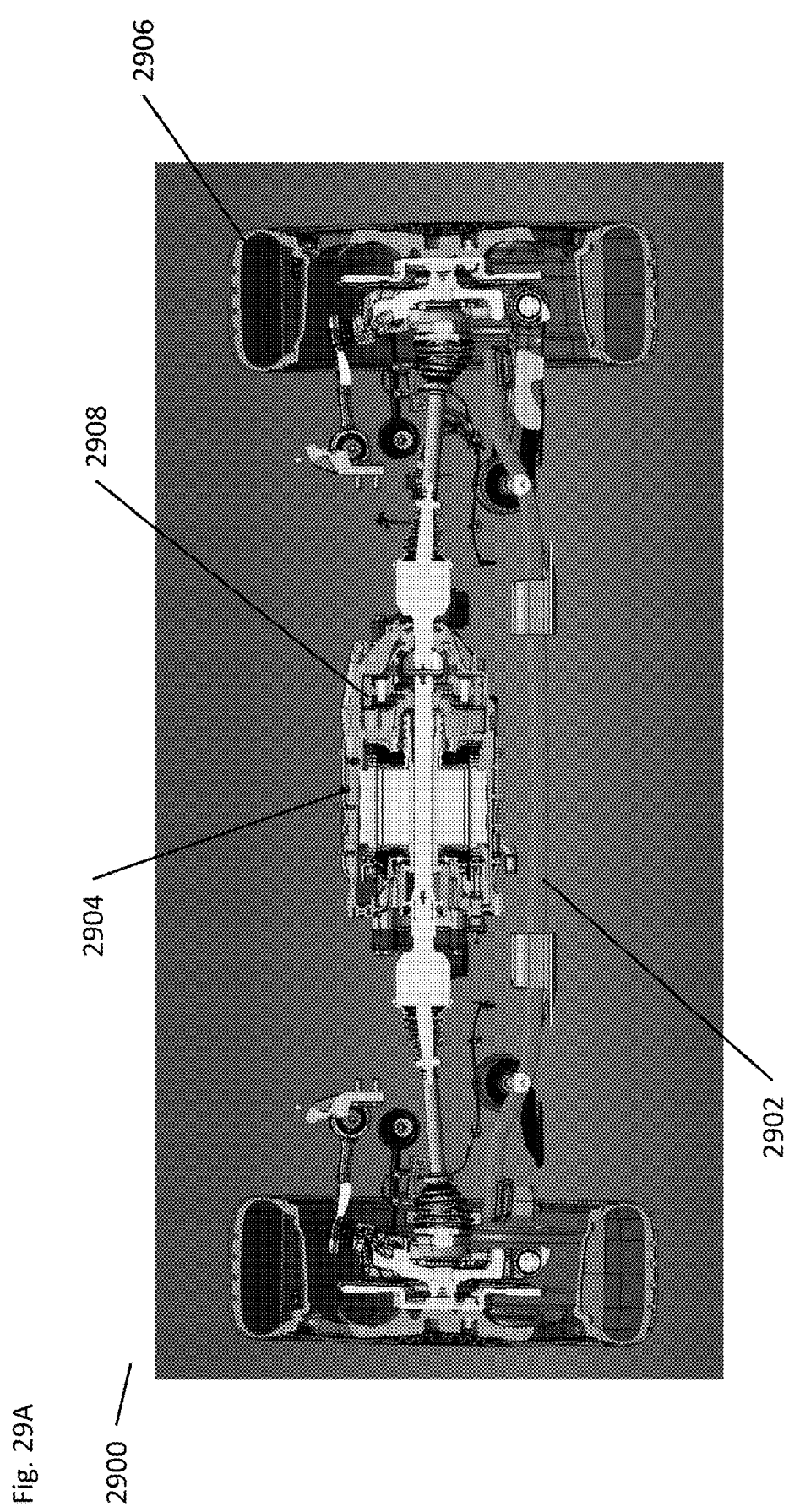
FIGS. 29A through 29C illustrate various views of a vehicle platform drive system in relation to a suspension system in accordance with embodiments of the invention.
Figure 29B:
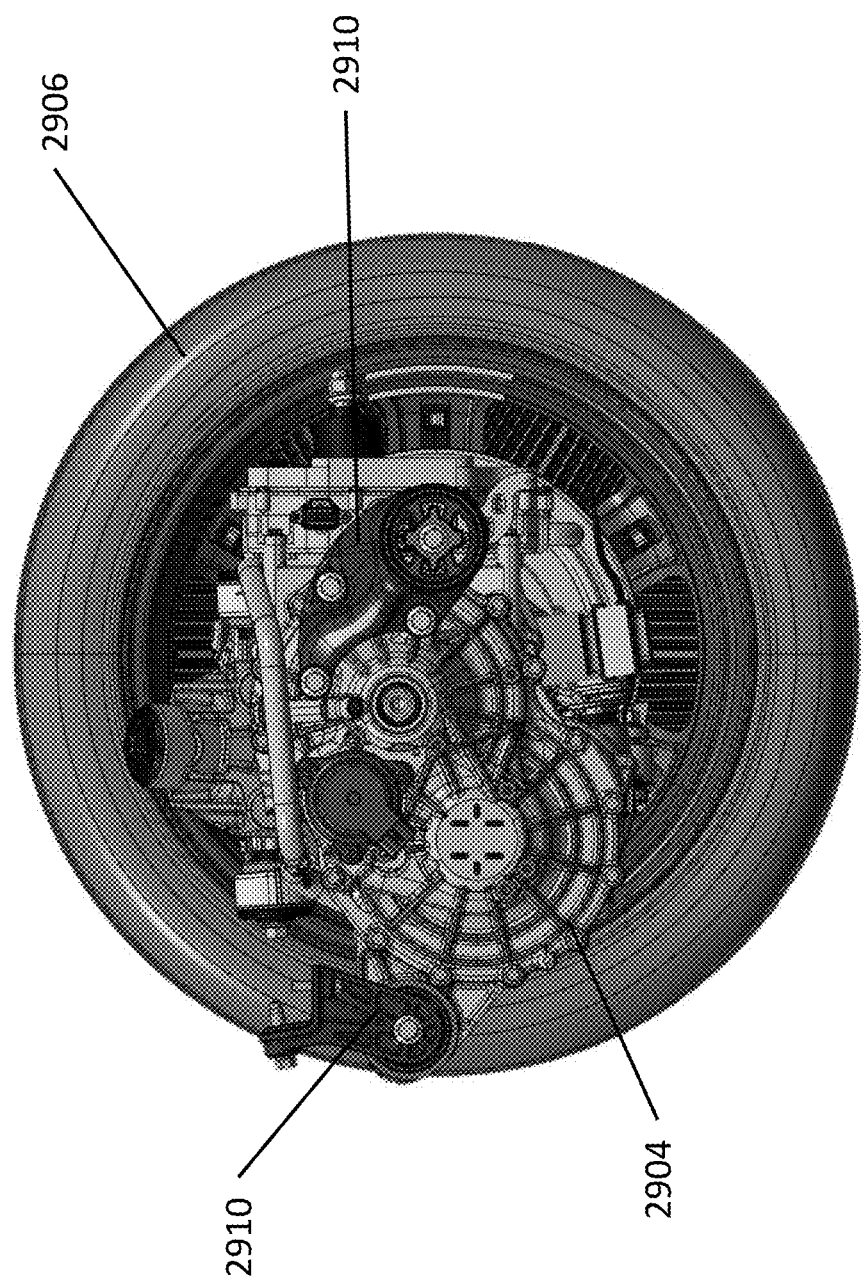
Figure 29C:
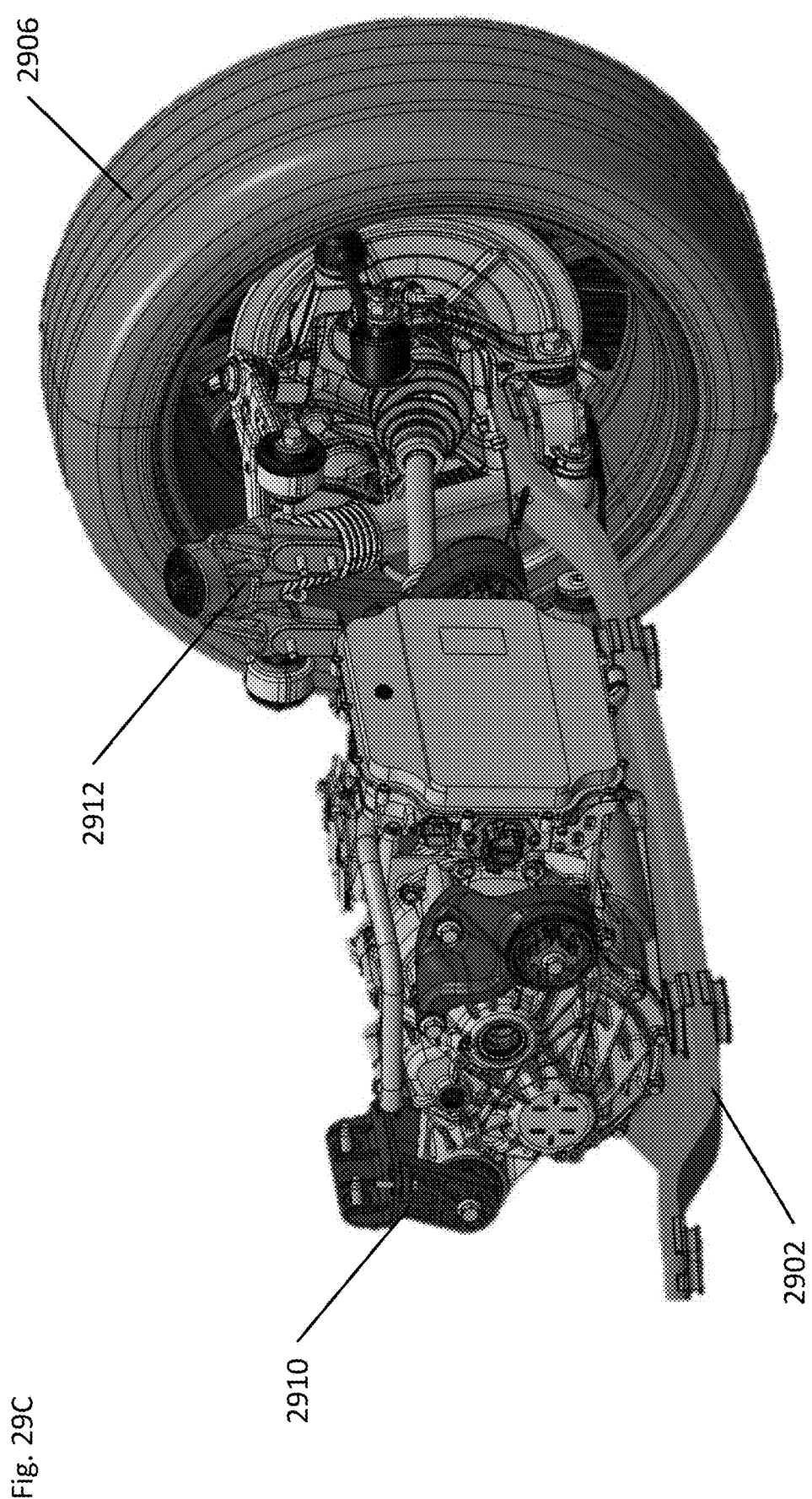

FIGS. 29A through 29C further illustrate embodiments of the placement of various drive train elements and configurations of the gears in relation to the suspension system. For example, FIG. 29A illustrates a cross sectional view of a wheel base portion 2900 of a vehicle platform. It can be appreciated that such embodiments can be implemented in either a front or rear or both front and rear portions of a vehicle platform. In many embodiments a leaf spring, 2902 is positioned to transverse the underside of the motor 2904 and other drive train elements and interconnect the wheels 2906. Additionally, some embodiments utilize a motor system 2904 with gears 2908 where the motor and output rings are of an equivalent diameter to fit within the motor housing. Such embodiments can enable motor systems 2904 to be easily adaptable within the many embodiments of a planar vehicle platform. Additionally, they can allow for adequate clearance between the motor 2904 and the leaf spring suspension 2902 during movement of the spring.

A cross section of a wheelbase 2900 looking down the longitudinal axis of the leaf spring 2902 can be illustrated in FIG. 29B. Here it can be appreciated that the motor system 2904 is configured to sit directly above the leaf spring 2902. In accordance with various embodiments, the motor systems 2904 can be outfitted with one or more mounting brackets 2910 that can allow the motor to be mounted to one or more locations on the vehicle platform framework (not shown). Similar mounting brackets 2910 can be seen in FIG. 29C in further relation to the wheels 2906 as well as other suspension components 2912.

In accordance with many embodiments, the electric vehicle platform as disclosed throughout may be configured with one or more electric drive systems. Accordingly, the drive systems of many embodiments may be positioned at the front and/or the rear of the vehicle platform; similar the embodiment illustrated throughout. Accordingly, some embodiments may utilize each of the front and/or rear drive motors to power one or more wheels. For example, some embodiments may only have a front drive motor that powers the front wheels while the rear wheels are relatively passive. Other embodiments may have only a rear drive system that only powers the rear wheels, leaving the front wheels to be passive. Other embodiments may utilize both a front and a rear motor to drive the vehicle. The drive motors, in accordance with various embodiments, may be designed such that they fit within the generally planar profile of the electric vehicle platform. Additionally, it can be appreciated that many drive train elements not specifically illustrated in the figures can be utilized in the many embodiments of a vehicle platform. For example, some embodiments may incorporate lock mechanisms that are designed to lock out the transmission systems at certain times. The transmission lock can take on any number of configurations but may be configured to prevent the vehicle from moving when the vehicle is in a stopped or parked configuration. This can be especially appreciated with respect to electric motors that are essentially always on and can engage at any time. Many transmission lock systems can prevent the engagement of the various gears with other portions of the drive train to prevent vehicle motion. Moreover, although many embodiments exhibit positioning of vehicle propulsion systems and suspension systems, it will be understood that various combinations of the functional and structural characteristics of such systems can be used or omitted as required by the vehicle design.

SUMMARY & DOCTRINE OF EQUIVALENTS

As can be inferred from the above discussion, the above-mentioned concepts can be implemented in a variety of arrangements in accordance with embodiments of the invention. Specifically, electric vehicles in accordance with embodiments are based on the idea of separating the lower structure of the vehicle (e.g., vehicle platform or skateboard) from the vehicle body (e.g., passenger cabin) to create a modular vehicle platform. The separation of vehicle platform and body allows multiple vehicle types to be derived from a single vehicle platform. Accordingly, the vehicle body can be varied from vehicle to vehicle, whereas the vehicle platform stays mostly common over all vehicle derivatives. Therefore, the vehicle platform according to embodiments can be understood as a driving chassis containing essentially all the components which enable the vehicle to drive (powertrain, battery, spring damper arrangement, chassis control arms, steering, brakes, wheels and tires, etc.) In various embodiments in order to create maximum space for the passengers, the vehicle platform is configured to be as flat as possible. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A self-contained vehicle platform comprising:
a plurality of interconnected structural components, each of the interconnected structural components comprising a body with a top element, a bottom element, and side elements, wherein the interconnected structural components when interconnected form a generally flat planar frame structure having a front portion, a rear portion, and a center portion, and wherein the frame structure further comprises a top portion and a bottom portion corresponding to the top elements and the bottom elements, respectively;
a propulsion system comprising a drive motor disposed in at least one of the front and rear portions of the frame structure, the drive motor connected to at least one of the interconnected structural components and to a transmission system that is connected to at least one set of drive wheels;
a plurality of suspension systems disposed within the front and rear portions of the frame structure, each of the suspension systems having a set of control arm assemblies, each of the control arm assemblies having proximal and distal ends where the proximal end is connected to the frame structure and the distal end is connected to a wheel in the at least one set of drive wheels;
an energy storage system disposed within the center portion of the frame structure and comprising a plurality of independent battery modules electronically connected to an inverter system that is electronically connected to the propulsion system, wherein the independent battery modules are enclosed within a sealed space by a top seal plate and a bottom seal plate connected to the frame structure; and
a plurality of attachment points configured to be connected to a vehicle body, the plurality of attachment points including sealable attachment points connected to or forming a part of the frame structure and extending upward through the top seal plate, the sealable attachment points configured to seal the sealed space;
wherein the propulsion system, the suspension systems, and the energy storage system are disposed within boundaries of the frame structure of the vehicle platform such that the propulsion system, the suspension systems, and the energy storage system do not extend above the drive wheels.

2. The vehicle platform of claim 1, further comprising a transverse leaf spring, the transverse leaf spring connected to multiple ones of the control arm assemblies and to the frame structure through a plurality of connection points.

3. The vehicle platform of claim 2, wherein the transverse leaf spring is disposed beneath the drive motor and is contoured in a vertically downward direction relative to the drive motor such that deformation of the transverse leaf spring does not interfere with the propulsion system.

4. The vehicle platform of claim 3, further comprising one or more spacers disposed between the transverse leaf spring and the frame structure.

5. The vehicle platform of claim 3, wherein:
the drive motor is disposed within a motor housing,
the motor housing has a contoured outer perimeter,
at least a portion of a lower face of the contoured outer perimeter is configured to correspond to at least one portion of an outer perimeter of a plurality of gears of the transmission system such that an indented portion of the motor housing is defined, and
the transverse leaf spring is disposed such that the transverse leaf spring is positioned beneath and in-line with the indented portion of the motor housing.

6. The vehicle platform of claim 5, wherein:
the outer perimeter of the plurality of gears defines a figure eight,
the motor housing is arranged such that the figure eight is tilted relative to a vertical axis, and
a center portion of the transverse leaf spring is disposed beneath a portion of the motor housing corresponding to an uppermost portion of the tilted figure eight.

7. The vehicle platform of claim 1, wherein:
the center portion of the frame structure is subdivided by one or more structural support elements into a plurality of isolated compartments, and
the independent battery modules comprise a plurality of modular elements distributed in a multiplicity of the isolated compartments.

8. The vehicle platform of claim 7, wherein the one or more structural support elements are connected to the independent battery modules.

9. The vehicle platform of claim 7, wherein the one or more structural support elements comprise a plurality of lateral and/or longitudinal structural support elements disposed in the center portion of the frame structure, each of the lateral and/or longitudinal structural support elements having an elongated body with (i) an upper portion and a lower portion being planar with the top and bottom portions of the frame structure, respectively, and (ii) a first end and a second end.

10. The vehicle platform of claim 7, wherein at least some of the sealable attachment points are disposed on the top portion of the frame structure in association with the one or more structural support elements, the sealable attachment points corresponding to cooperating mounting apertures on the vehicle body.

11. The vehicle platform of claim 10, wherein the top seal plate comprises a plurality of holes corresponding to the sealable attachment points, and wherein each of the holes surrounds the corresponding sealable attachment point.

12. The vehicle platform of claim 11, further comprising a plurality of seal caps, each of the seal caps having a contoured body with an outside surface and an inside surface such that the inside surface cooperatively engages with a corresponding sealable attachment point, wherein the contoured body further comprises a flange portion extending outward from the contoured body near a bottom portion of the contoured body by a dimension such that the dimension of the flange portion exceeds a dimension of the corresponding hole.

13. The vehicle platform of claim 1, further comprising a front crumple zone and a rear crumple zone, wherein the interconnected structural components associated with the front and rear portions of the frame structure are configured to absorb energy from a directional impact and prevent transmission of the energy to additional portions of the frame structure.

14. The vehicle platform of claim 1, further comprising a plurality of lateral energy absorbers, wherein the lateral energy absorbers are disposed along outer sides of the center portion of the frame structure and are configured to absorb energy from a lateral impact and reduce damage to the center portion of the frame structure.

15. The vehicle platform of claim 14, wherein the lateral energy absorbers are disposed to reduce damage to the independent battery modules disposed within the central portion of the frame structure.

16. The vehicle platform of claim 1, further comprising a plurality of rigid planar heating and cooling elements disposed in association with the independent battery modules.

17. The vehicle platform of claim 16, wherein the independent battery modules are arranged within the center portion of the frame structure such that the rigid planar heating and cooling elements are arranged both laterally and longitudinally relative to the frame structure.

18. The vehicle platform of claim 1, wherein the front and rear portions of the frame structure are vertically elevated relative to the center portion of the frame structure such that the frame structure has an undulating contour.

19. The vehicle platform of claim 1, wherein the attachment points represent a plurality of anchor points disposed on the frame structure and configured to hard mount the vehicle body thereto.

20. The vehicle platform of claim 1, wherein the independent battery modules and the inverter system are enclosed within the top and bottom portions of the frame structure by the top seal plate and the bottom seal plate connected to the frame structure.

* * * * *